(12) United States Patent
Ruschke

(10) Patent No.: US 7,997,293 B2
(45) Date of Patent: Aug. 16, 2011

(54) VALVE APPARATUS, COMBINATION FILTER VALVE ASSEMBLIES AND DEVICES, SYSTEMS, AND METHODS INCLUDING THE SAME

(75) Inventor: Ricky R. Ruschke, Woodstock, IL (US)

(73) Assignee: Filtertek, Inc., Hebron, IL (US)

( * ) Notice: Subject to any disclaimer, the term of this patent is extended or adjusted under 35 U.S.C. 154(b) by 399 days.

(21) Appl. No.: 11/777,570

(22) Filed: Jul. 13, 2007

(65) Prior Publication Data

US 2008/0011667 A1 Jan. 17, 2008

Related U.S. Application Data

(60) Provisional application No. 60/830,725, filed on Jul. 13, 2006.

(51) Int. Cl.
  *B60K 15/035* (2006.01)
  *F16K 31/12* (2006.01)
  *B01D 35/02* (2006.01)
  *B60K 15/00* (2006.01)
  *B01D 35/00* (2006.01)

(52) U.S. Cl. ............ 137/43; 137/44; 137/498; 210/420; 210/418; 210/419; 210/390; 210/430

(58) Field of Classification Search .................... 137/43, 137/498
  See application file for complete search history.

(56) References Cited

U.S. PATENT DOCUMENTS

| | | | |
|---|---|---|---|
| 2,258,019 A | 10/1941 | Kramer et al. | |
| 3,726,274 A | 4/1973 | Bird et al. | |
| 3,938,513 A | 2/1976 | Hargest | |
| 4,011,848 A | 3/1977 | Coddington | |
| 4,141,379 A | 2/1979 | Manske | |
| 4,696,409 A | 9/1987 | Vize | |
| 5,049,271 A | 9/1991 | Cain | |
| 5,127,318 A | 7/1992 | Selby, III | |
| 5,490,929 A | 2/1996 | Yamamoto | |
| 5,522,417 A | 6/1996 | Tomioka et al. | |
| 5,647,328 A | 7/1997 | Fornier et al. | |
| 6,003,197 A | 12/1999 | Collen | |
| 6,089,272 A | 7/2000 | Brand et al. | |
| 6,450,722 B1 | 9/2002 | Ruschke et al. | |
| 6,890,119 B2 | 5/2005 | Ruschke et al. | |
| 6,974,539 B1 | 12/2005 | McKenzie | |
| 2003/0132147 A1 | 7/2003 | Rosendahl et al. | |

(Continued)

FOREIGN PATENT DOCUMENTS

DE  43 22 450  1/1994
EP  1 508 353  2/2005

*Primary Examiner* — Benjamin Kurtz
(74) *Attorney, Agent, or Firm* — Boyle Fredrickson, S.C.

(57) ABSTRACT

According to various aspects, exemplary embodiments are provided of valve apparatus and combination filter valve assemblies. One exemplary embodiment provides a combination filter valve apparatus suitable for filtering objectionable particulate matter from a fluid and for selectively occluding a fluid flow opening. In this exemplary embodiment, the apparatus generally includes an outer member, a sealing member, and filtration media disposed generally between the outer member and the sealing member. The filtration media may be configured to generally support the sealing member for resilient movement relative to a fluid flow opening between open and closed positions. In the open position, the sealing member may be spaced apart from the fluid flow opening. In the closed position, the sealing member may be in sealing engagement with and substantially blocking the fluid flow opening, thereby inhibiting the ingress of fluid into or egress of fluid out of the fluid flow opening.

15 Claims, 48 Drawing Sheets

U.S. PATENT DOCUMENTS

| | | |
|---|---|---|
| 2003/0132156 A1 | 7/2003 | Rickle |
| 2004/0164009 A1* | 8/2004 | Smith .......................... 210/132 |
| 2004/0173626 A1 | 9/2004 | Jeor |
| 2005/0087481 A1* | 4/2005 | Boast et al. ................... 210/130 |

* cited by examiner

VALVE APPARATUS, COMBINATION FILTER VALVE ASSEMBLIES AND DEVICES, SYSTEMS, AND METHODS INCLUDING THE SAME

CROSS-REFERENCE TO RELATED APPLICATION

This application claims the benefit of U.S. Provisional Application No. 60/830,725 filed Jul. 13, 2006. The disclosure of the above application is incorporated herein by reference.

FIELD

The present disclosure relates generally to valve apparatus and combination filter valve assemblies.

BACKGROUND

The statements in this background section merely provide background information related to the present disclosure and may not constitute prior art.

Fluid delivery systems typically include filtration components for filtering unwanted contaminants or particles from the fluid flow. Some systems also include valves for controlling fluid flow rates and/or for controlling fluid flow direction. In such systems, however, the filtration components (e.g., filtration media, supporting structure, etc.) are usually separate from the valve components (e.g., sealing member, supporting structure, etc.).

SUMMARY

According to various aspects, exemplary embodiments are provided of valve apparatus and combination filter valve assemblies. One exemplary embodiment provides a combination filter valve apparatus suitable for filtering objectionable particulate matter from a fluid and for selectively occluding a fluid flow opening. In this exemplary embodiment, the apparatus generally includes an outer member, a sealing member, and filtration media disposed generally between the outer member and the sealing member. The filtration media may be configured to generally support the sealing member for resilient movement relative to a fluid flow opening between an open position and a closed position. In the open position, the sealing member may be spaced apart from the fluid flow opening. But in the closed position, the sealing member may be in sealing engagement with and substantially blocking the fluid flow opening, thereby inhibiting the ingress of fluid into or egress of fluid out of the fluid flow opening.

Another exemplary embodiment provides a valve apparatus suitable for selectively occluding a fluid flow opening. In this exemplary embodiment, the apparatus generally includes an outer member, a sealing member, and a membrane portion having fluid flow openings therethrough. The membrane portion is disposed generally between the outer member and the sealing member. The membrane portion may be configured to generally support the sealing member for resilient movement relative to a fluid flow opening between an open position and a closed position. In the open position, the sealing member may be spaced apart from the fluid flow opening. But in the closed position, the sealing member may be in sealing engagement with and substantially blocking the fluid flow opening, thereby inhibiting the ingress of fluid into or egress of fluid out of the fluid flow opening.

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
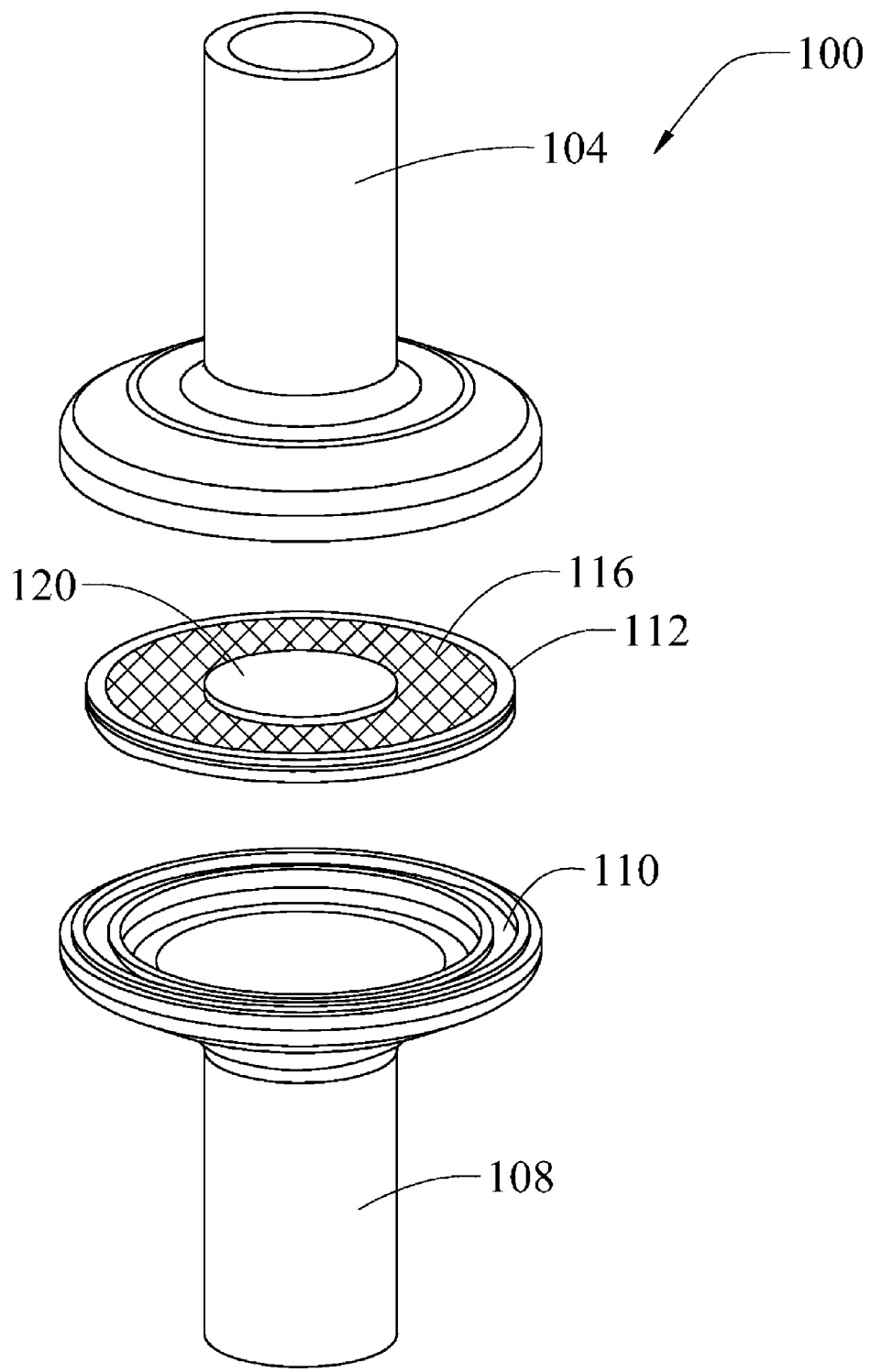
FIG. 1 is an exploded perspective view illustrating an exemplary environment in which a combination filter valve apparatus can be used as a rollover filter valve between fluid inlet/outlet ports according to exemplary embodiments.

The following description is merely exemplary in nature and is in no way intended to limit the present disclosure, application, or uses. It should be understood that throughout the drawings, corresponding reference numerals indicate like or corresponding parts and features.

When developing ventilation systems for gasoline tanks, the inventor hereof recognized that standard filtration media normally does not prevent liquid gasoline from passing through the vent's filter, for example, when the gasoline tank is upended or rolled over. This is due, at least in part, to the pressure exhibited onto the vent by the liquid gasoline being too high for standard filtration media to prevent the passage of liquid gasoline therethrough. While gasoline with a very low surface tension may pass through standard hydrophobic filtration media, the added pressure during a rollover condition will usually cause the gasoline to leak and cause a hazardous condition. Plus, some specially treated media may be able to block gasoline from passing through, but such specially treated media do not allow vapor venting after contact will the gasoline.

The inventor hereof has developed various embodiments of combination filter valve assemblies for use with containers, where the combination filter valve assemblies are configured to close and prevent (or at least inhibit) liquid gasoline (or other liquids) from spilling out of the container when the container is upended or rolled over. The combination filter valve assemblies may preferably allow ventilation of air, fumes, vapor, etc. when opened, such as when the container is in the upright or normal position.

In addition, the inventor's novel technologies relating to combining valve structures with membranes or filtration media may be applied and used with many devices, systems, and applications. In some existing applications, filtration media are used to separate air from liquid by selecting a particular filtration media that not only prevents (or at least inhibits) liquid flow therethrough, but also still allows an airflow therethrough. This is dependent (at least in part) on the function of the hydrophilic or hydrophobic material and pore size of the filtration media being used. In these exemplary applications, however, the filtration media usually has a very small pore size, which may significantly limit the liquid flow rates therethrough. Advantageously, the inventor hereof has developed various embodiments that allow the filtration media to have a fairly large pore size. This, in turn, may advantageously allow higher flow rates to be achieved through the filtration media in combination with the filter valve apparatus having the ability to hold or withstand relatively high back pressures without blocking or leaking (or at least with relatively little blocking or leaking).

According to various aspects, dissimilar materials may be molded together, which may provide a relatively soft filter structure over a more rigid support structure. This, in turn, may allow the valve to move from an open position to a closed position, or vice versa. By way of example only, various embodiments include filtration media formed from one or more soft elastic materials like polypropylene, nylon, TPE, silicone, etc., such that the filtration media may act as a spring feature to allow the sealing member to move from an open position to a closed position. In some embodiments, an outer member (e.g., ring, etc.) is configured to act as a spring feature that allows the sealing member to move from an open position to a closed position, or vice versa. In some embodiments, the filtration media comprises a membrane having fluid flow openings for restricting (and not necessarily filtering) flow and for closing under high flow conditions.

Various exemplary embodiments include filter support structure configured to close the valve feature due to a certain pressure drop across the filter. The valve feature may be configured to restrict air/gas passage and prevent (or at least prevent) high flow/high pressure passage. The filter valve apparatus may be configured in a normally closed position with the flow differential pressure forcing the filter valve apparatus to an open position.

Various exemplary embodiments include a membrane having fluid flow openings that are configured to restrict flow and close under high flow conditions. By way of example, the membrane may be configured to restrict flow and open the valve during high flow conditions. In such embodiments, this can allow larger openings to prevent contaminate blockage. Other embodiments can include a membrane configured for restricting flow for helping close the valve apparatus with high viscosity fluids. A wide range of materials may be used for the membrane in these embodiments, including elastomeric membranes with fluid flow openings, filtration media, etc.

Some embodiments include a valve or sealing member formed by compacting and/or crushing a portion (e.g., center portion, etc.) of filtration media, thereby making that crushed/compacted portion sufficiently solid to function as a sealing member. By way of further example, some embodiments include extruded Polypro Plastic having strands thick enough for forming a sufficiently solid portion for operating as a sealing member.

Various exemplary embodiments may be integrally molded so as to have a one-piece or monolithic construction. Alternative embodiments can be molded with a two-piece or multi-piece construction, such as by insert molding with different materials being used for different components (e.g., filtration media, sealing member, support or outer ring, etc.). By way of example only, one exemplary embodiment includes a combination filter valve apparatus formed via insert molding with a different material being used for the filtration/flow restrictor media than the material used for the sealing member and support.

In various exemplary embodiments, the valve feature may be configured as a flow control device to keep a constant air/gas vapor flow rate, such as for differential pressure or restriction due to contaminates. Or, for example, the valve feature can be configured as a flow control device to keep a constant fluid flow rate, such as for differential pressure or restriction due to contaminates.

A wide range of materials may be used for any of the various components of a combination filter valve apparatus. Exemplary materials include plastic materials, non-plastic material, stainless steel, brass, cotton fiber, cellulous, among others. In some embodiments, depth filtration media is used, which may increase air/gas or fluid flow and achieve finer filtration. In such embodiments, the depth filtration media can be insert molded to the valve and spring member features. In addition, the spring feature can be made from a different material than the valve/sealing member and/or than the depth filtration media. Depth filtration media can be configured to prevent (or at least inhibit) bacteria and particles from passing. The valve may be configured to close when the media is blocked with contamination and/or to close with back flow or reverse flow of fluid or high flow of air/gas.

In various exemplary embodiments, casting or gluing can be used for attaching the filtration media to the valve/sealing member and the outer member/spring member. By way of example, RTV or silicone sealant may be used in some embodiments.

Various exemplary embodiments include a filter mesh configured (e.g., shaped, sized, formed of certain material, etc.) such that the filter mesh is operable as a spring for allowing the valve/sealing member to move towards an open position or closed position. The filter mesh can also operate as a flow restrictor or filter.

Other aspects relate to devices and systems including one or more of the valve apparatus or combination filter valve apparatus disclosed herein. Examples include rollover fuel valves, vapor filters, suction canister valves with filters for blocking contamination, high flow valves with filter support structure, one-way filters with safety valve for inhibiting air aspiration, fluid control valves, two-way flow filters, one-way flow filters, bypass valves, two-way flow with pressure feature, one-way flow filter with pressure feature, one-way fluid flow with two-way gas/air flow, two way fluid flow with high flow shut off feature, differential pressure shut off, overflow block feature, two-way filtration with gas/air one-way fluid filtration, two way fluid filtration with high flow shut off feature, bypass fluid feature with differential pressure opening, bypass fluid filtration with differential pressure opening feature due to cold high viscosity fluid, rollover valve with vapor filtration and gas fluid blocking, rollover valve with vapor air/gas passing with fluid blocking, among others. These specific examples, however, are provided for illustrative purposes only, as any one or more of the valve apparatus and combination filter valve apparatus disclosed herein can be implemented in a wide range of other devices or systems in various industries (automotive, medical, etc.) besides the specific examples provided herein.

Referring now to FIGS. 1 through 7, there is shown an exemplary environment for a combination filter valve apparatus 100 embodying one or more aspects of the present disclosure. As shown, the combination filter valve apparatus 100 generally includes an outer member 112, filtration media 116, and an inner valve or sealing member 120 positioned generally between two fluid inlet/outlet ports or conduits 104 and 108. The valve or sealing member 120 is operable for opening and closing/blocking the opening 128 of the fluid conduit 108. Accordingly, the combination filter valve apparatus 100 can be operable as a "rollover" filter valve for a container (e.g., inverted small engine gas tanks, a portable gasoline can, etc.).

The filtration media 116 extends generally between the outer member 112 and the sealing member 120. In various embodiments, the filtration media 116 has sufficient rigidity for helping to maintain the relative positioning of the sealing member 120 and outer member 112. The filtration media 116 also has sufficient flexibility to allow the sealing member 120 to move between the open and closed positions.

Figure 2:
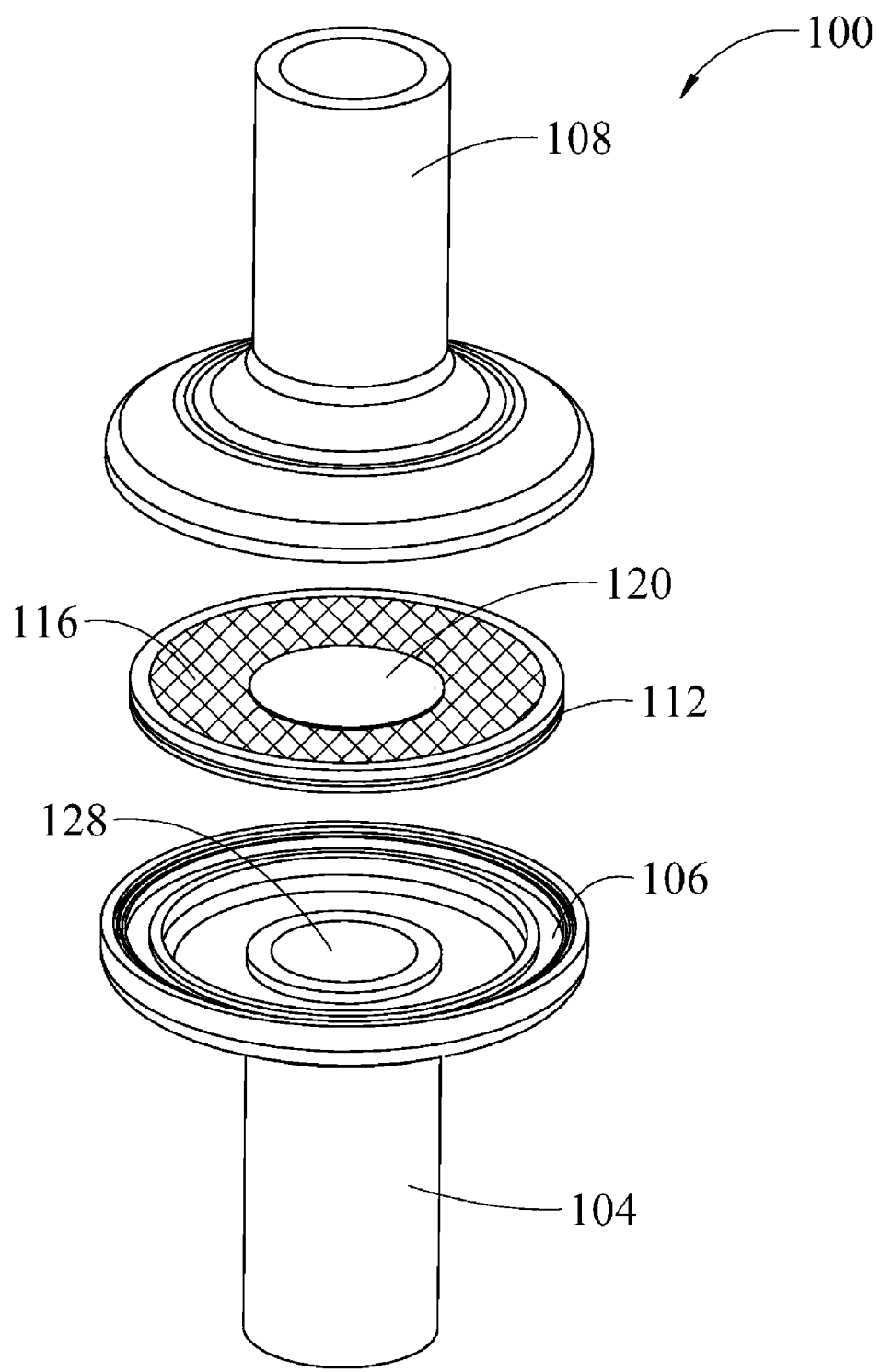
FIG. 2 is an exploded perspective view of the combination filter valve apparatus and fluid inlet/outlet ports shown in FIG. 1 rotated one hundred eighty degrees.
Figure 3:
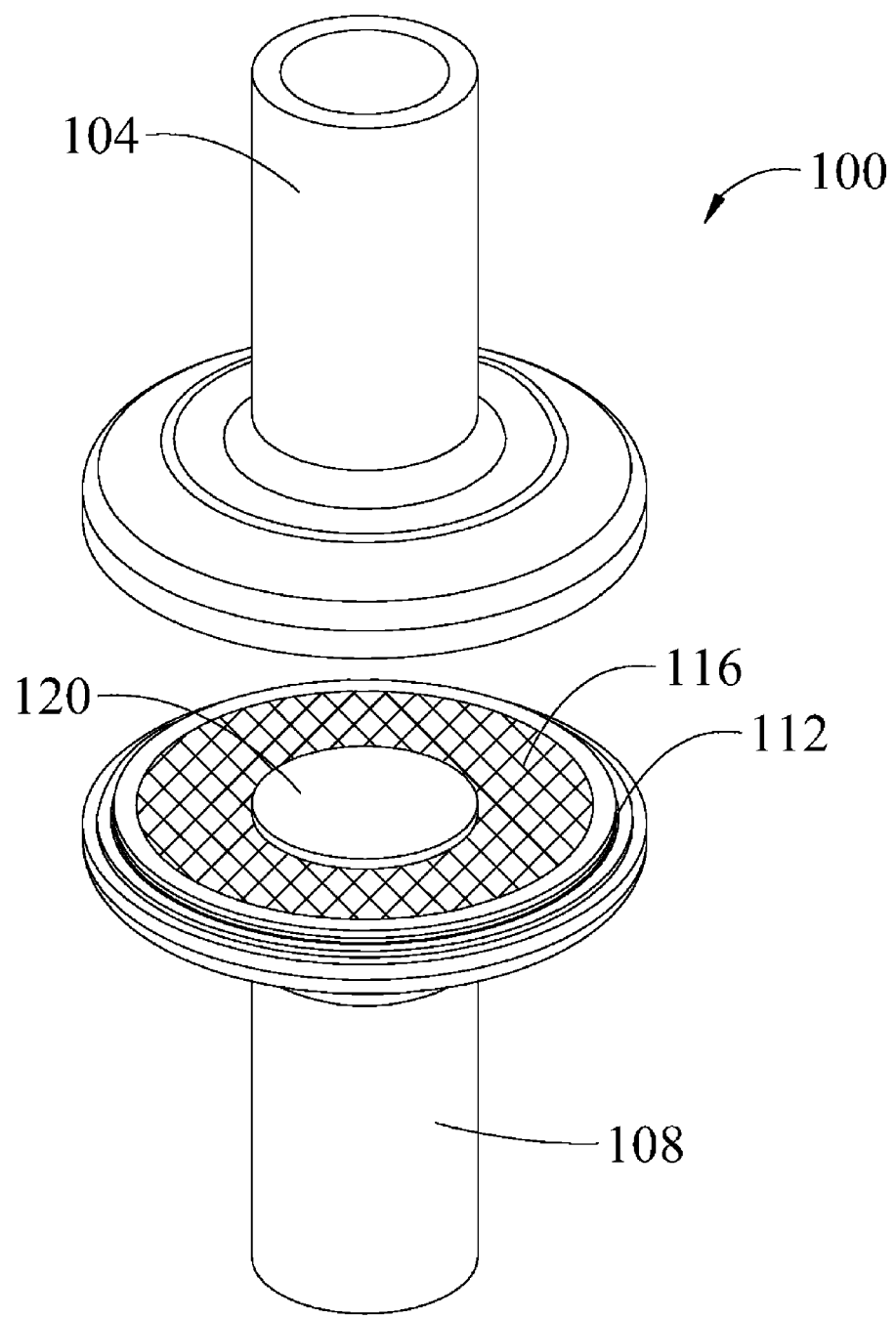
FIG. 3 is a perspective view illustrating the combination filter valve apparatus engaged with the lower one of the fluid inlet/outlet ports shown in FIG. 1.
Figure 4:
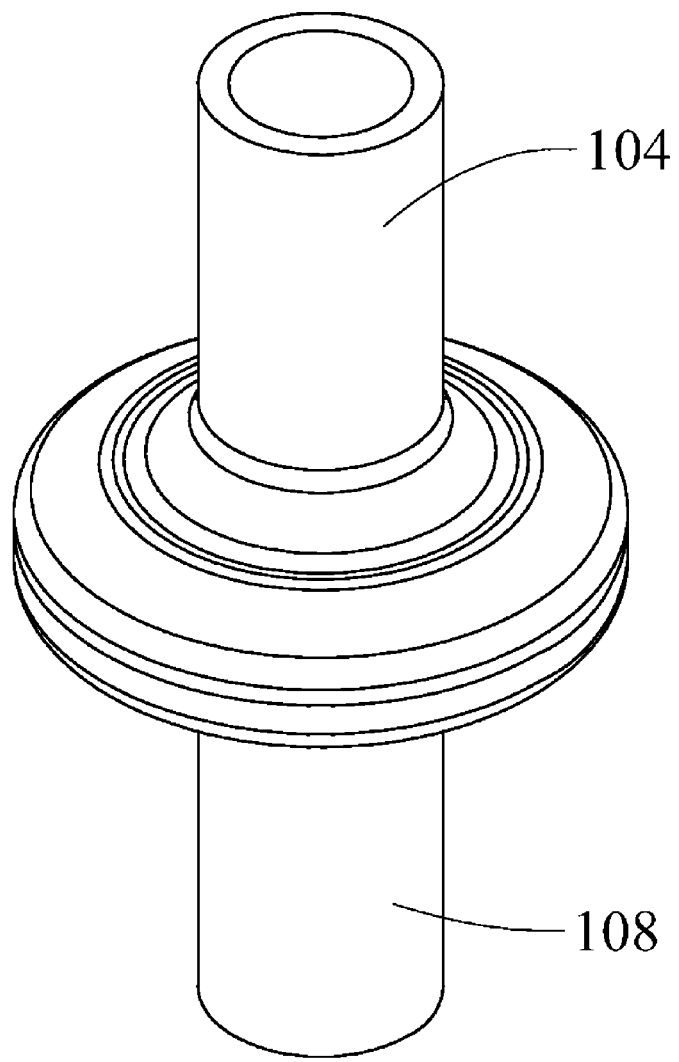
FIG. 4 is a perspective view illustrating the fluid inlet/outlet ports shown in FIG. 3 with the combination filter valve apparatus disposed therebetween.
Figure 5:
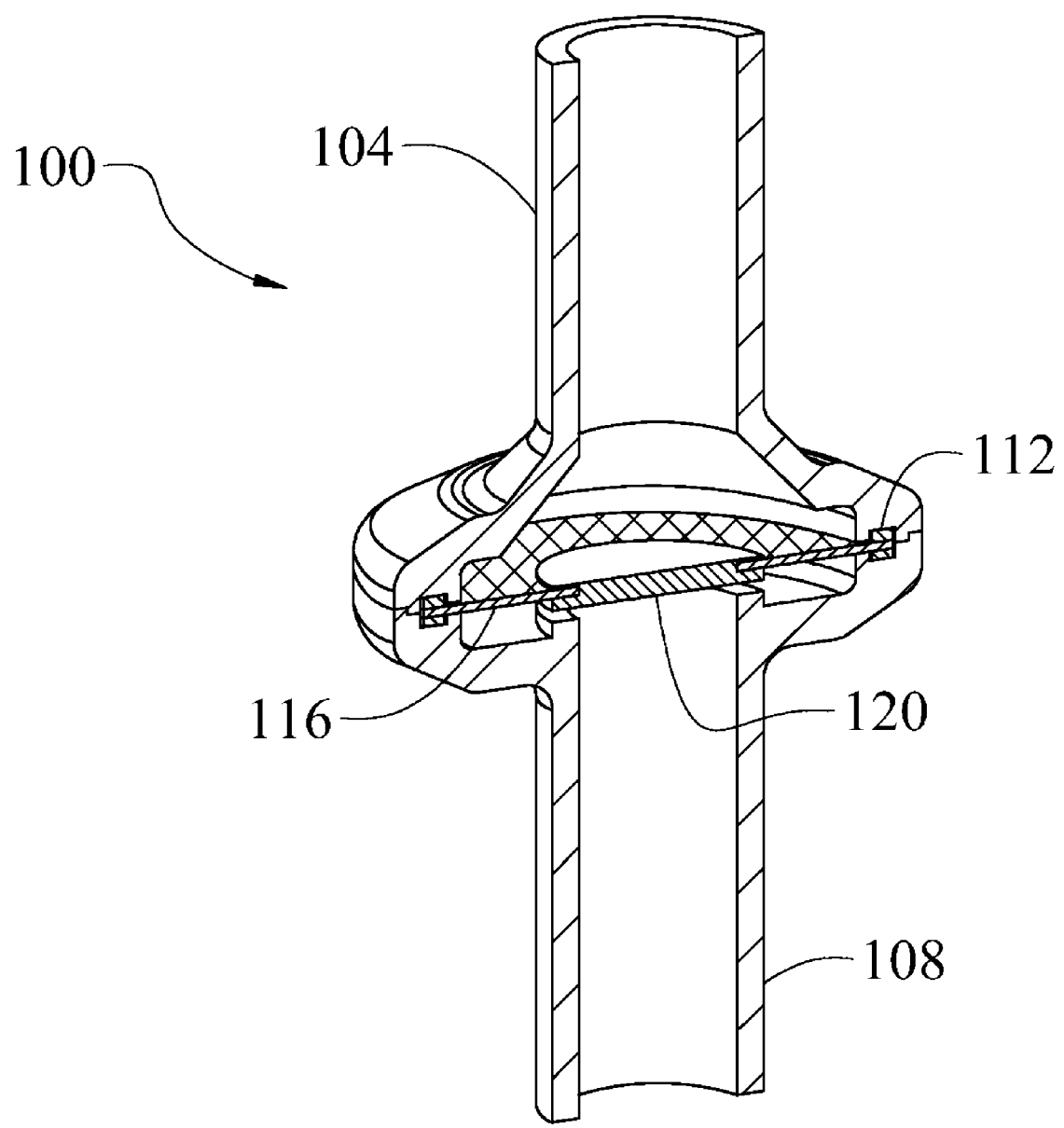
FIG. 5 is a cross-sectional perspective view illustrating the combination filter valve apparatus disposed between the fluid inlet/outlet ports shown in FIG. 4.
Figure 8:
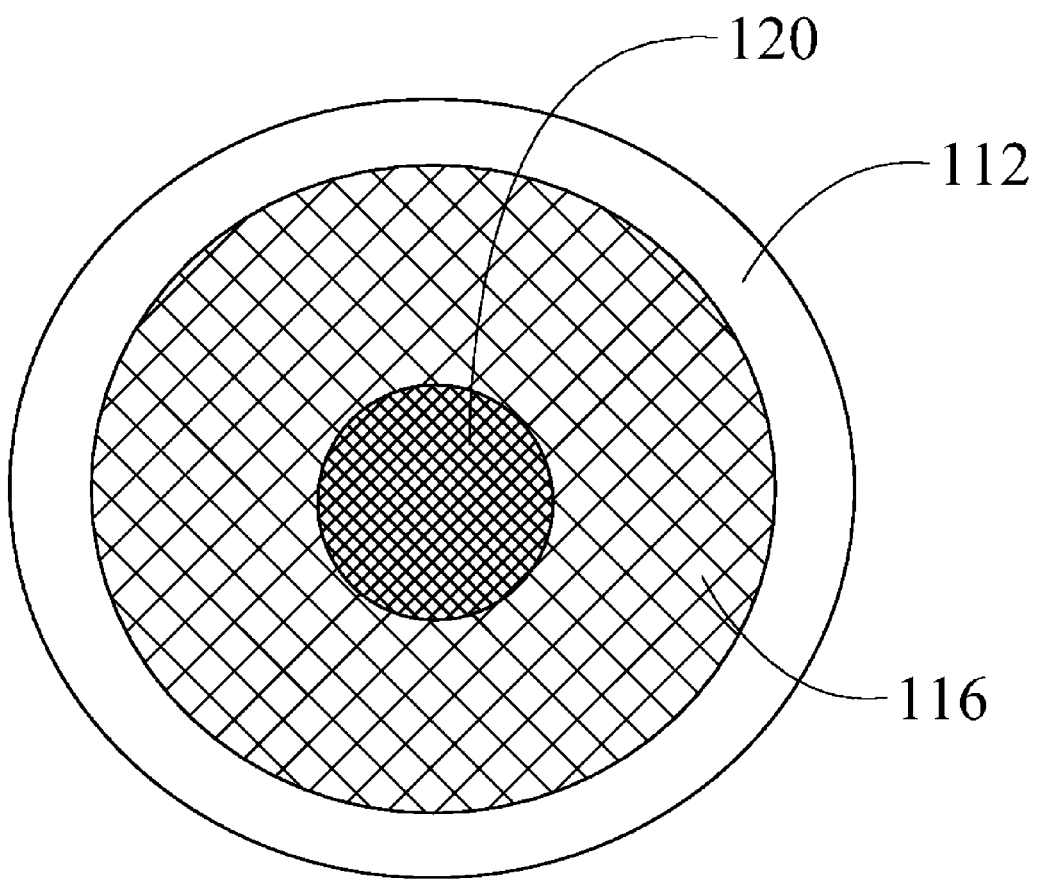
FIG. 8 is a plan view of an exemplary configuration for the combination filter valve apparatus shown in FIGS. 1 through 7 according to exemplary embodiments.

As shown in FIGS. 1, 2, and 8, the outer member 112 comprises a generally circular ring or annular member. Alternative embodiments, however, can include an outer member in other configurations, including rectangular and non-rectangular configurations (e.g., triangular, hexagonal, ovular, other polygonal shapes, etc.) depending, for example, on the particular environment in which the combination filter valve apparatus 100 will be used.

The outer member 112 is generally configured (e.g., shaped, sized, etc.) to be engagingly received in the grooves or pockets 106 and 110 of the respective conduits 104 and 108, as shown in FIGS. 1, 2, 5, 6, and 7. In various embodiments, the outer member 112 and pockets 106, 110 are preferably configured to allow the outer member 112 to act as a spring to support the filtration media 116 and allow the filtration media 116 (and valve or sealing member 120) to move relative to the outer member 112.

When the outer member 112 is engagingly received within the pockets 106, 110 and thus assembled between the conduits 104 and 108, a substantially fluid-tight seal is preferably formed between the outer member 112 and conduits 104, 108, thereby substantially sealing the interface between the outer member 112 and the conduits 104, 108. Accordingly, substantially sealing the interface in this exemplary manner can thus inhibit the egress of fluid through the interface and also inhibits the ingress of foreign objects and debris through the interface.

With continued reference to FIGS. 1, 2, and 8, the valve or sealing member 120 comprises a generally circular disc. Alternative embodiments, however, can include a valve or sealing member in other configurations, including rectangular and non-rectangular configurations (e.g., triangular, hexagonal, ovular, other polygonal shapes, etc.) depending, for example, on the particular environment in which the combination filter valve apparatus 100 will be used, and on the particular configuration (e.g., shape, size, etc.) of the opening to be closed by the sealing member 120.

A wide range of materials and manufacturing methods can be used for components of the combination filter valve apparatus 100 and the conduits 104, 108. For example, various embodiments include the outer member 112 being formed from one or more relatively soft or resilient materials, such as plastic, thermoplastic elastomer, silicone, etc. In such embodiments, the resiliency of the outer member 112 allows the member 112 to act as a spring to allow the valve 120 to move under pressure and return to its initial or normal position when the pressure is relieved. Additionally, in those embodiments in which the combination filter valve apparatus 100 will be used with a fuel, the outer member 112 is preferably formed from one or more materials that are fuel tolerant. In some embodiments, a filter mesh or a membrane portion having fluid flow openings may be used that is made of one or more materials that allow movement of the valve. The filter mesh or membrane portion (as the case may be) may preferably be designed in a shape that will move essentially as a spring, also function as a restrictor and/or act as a filter media.

A wide range of manufacturing methods can also be employed for making the outer member 112 depending for example, on the particular material(s) selected for the outer member 112. In various embodiments, the outer member 112 can be formed by injection molding. Alternatively, other manufacturing methods can also be used for making the outer member 112.

A wide range of materials and manufacturing methods can also be used for making the valve or sealing member 120. By way of example only, exemplary materials for the valve 120 include relatively soft or resilient materials, fuel tolerant materials, plastic, thermoplastic elastomer, silicone, combinations thereof, etc. In one exemplary embodiment, the valve or sealing member 120 is formed from a Geolast® oil-resistant thermoplastic elastomer available from the Monsanto Company.

In some embodiments, the valve 120 and outer member 112 are formed from the one or more materials. In other embodiments, the valve 120 and outer member 112 are formed from different materials. In those embodiments in which the valve 120 is formed from the same material(s) as the outer member 112, the valve 120 may be formed via insert molding. As another example, two-shot molding may be employed in embodiments in which the valve 120 is formed from a different material than the outer member 112. Alternatively, other manufacturing methods can also be used for making the valve 120 depending for example, on the particular material(s) selected for the valve or sealing member 120.

As noted above, the filtration media 116 extends generally between the outer member 112 and the sealing member 120. In various embodiments, the filtration media 116 preferably has sufficient rigidity for helping to maintain the positioning of the valve 120 relative to the outer member 112 when pressure is not being applied for closing the valve 120. By way of example only, the filtration media 116 may comprise a screen, membrane, and/or depth media. For example, the filtration media 116 may be formed from a hydrophobic membrane that is non-wetting or blocking to gasoline (or other liquids), such as in those embodiments in which the combination filter valve apparatus 100 is being used as a rollover valve for a gasoline tank or other fuel ventilation system.

In various preferred embodiments, the filtration media 116 is configured (e.g., formed from one or more materials having sufficiently small pores, etc.) for restricting or inhibiting liquid flow therethrough. In such embodiments, liquid contact with the filtration media 116 can create a pressure differential for at least helping to move the sealing member 120 from its normally open position (FIG. 6) to the closed position (FIG. 7). Or, for example, a sufficiently high fluid flow rate of fumes venting through the filtration media 116 may also create a pressure differential for at least helping to move the sealing member 120 from its normally open position (FIG. 6) to the closed position (FIG. 7), thereby helping to control flow.

In various embodiments, the filtration media 116 may be formed from a relatively coarse and fuel tolerant material, such as nylon, polyester, acetal, Teflon, combinations thereof, etc. In other embodiments, the filtration media 116 may be formed from a membrane having fluid flow openings. By way of example only, various embodiments include the filtration media 116 being formed from a woven screen of polyester or nylon. In other embodiments, the filtration media 116 may comprise a relatively coarse extruded mesh formed from any of a wide range of suitable fuel tolerant materials, such as acetal, polyester, nylon, Teflon, combinations thereof, etc.

In still further embodiments, the filtration media 116 may comprise more than one layer where the different layers have different pore sizes, for example, with a decreasing gradient density (more open upstream and denser downstream) for achieving depth filtration. By way of example only, the filtration media 116 may include two outer layers and an inner layer sandwiched therebetween, where the inner layer includes smaller pores than the outer layers. In such exemplary embodiments, the outer layers of the filtration media 116 may be configured for providing a suitably durable protective coating for the more fragile and less durable inner layer. The protection afforded by the outer layers can also help protect the inner layer(s) from abrasion, etc. The outer layers can also be configured to provide support and reinforce the inner layer(s) during filtration.

Figure 6:
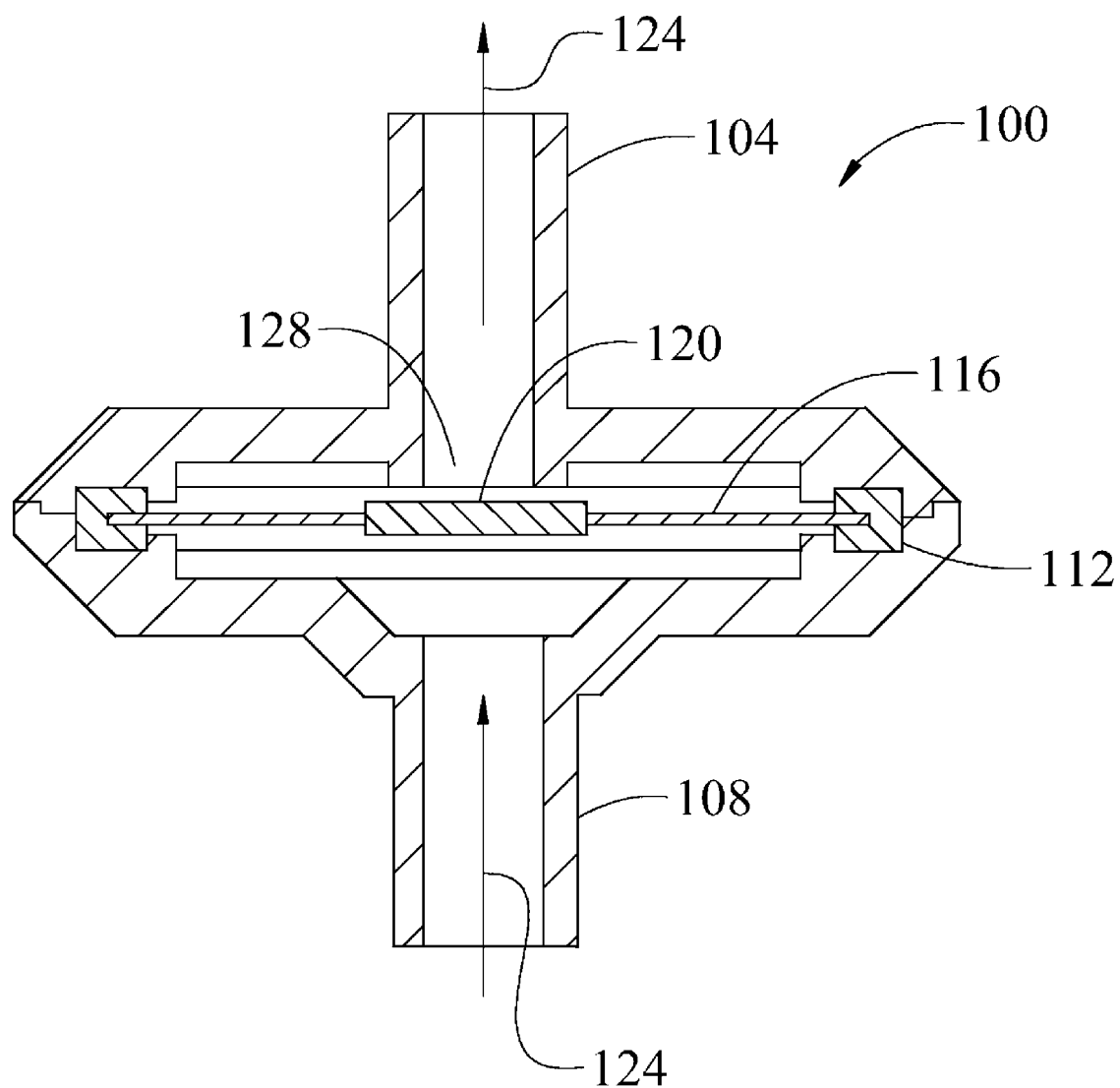
FIG. 6 is a cross-sectional view illustrating the combination filter valve apparatus (shown in an open position) disposed between the fluid inlet/outlet ports shown in FIG. 5.
Figure 7:
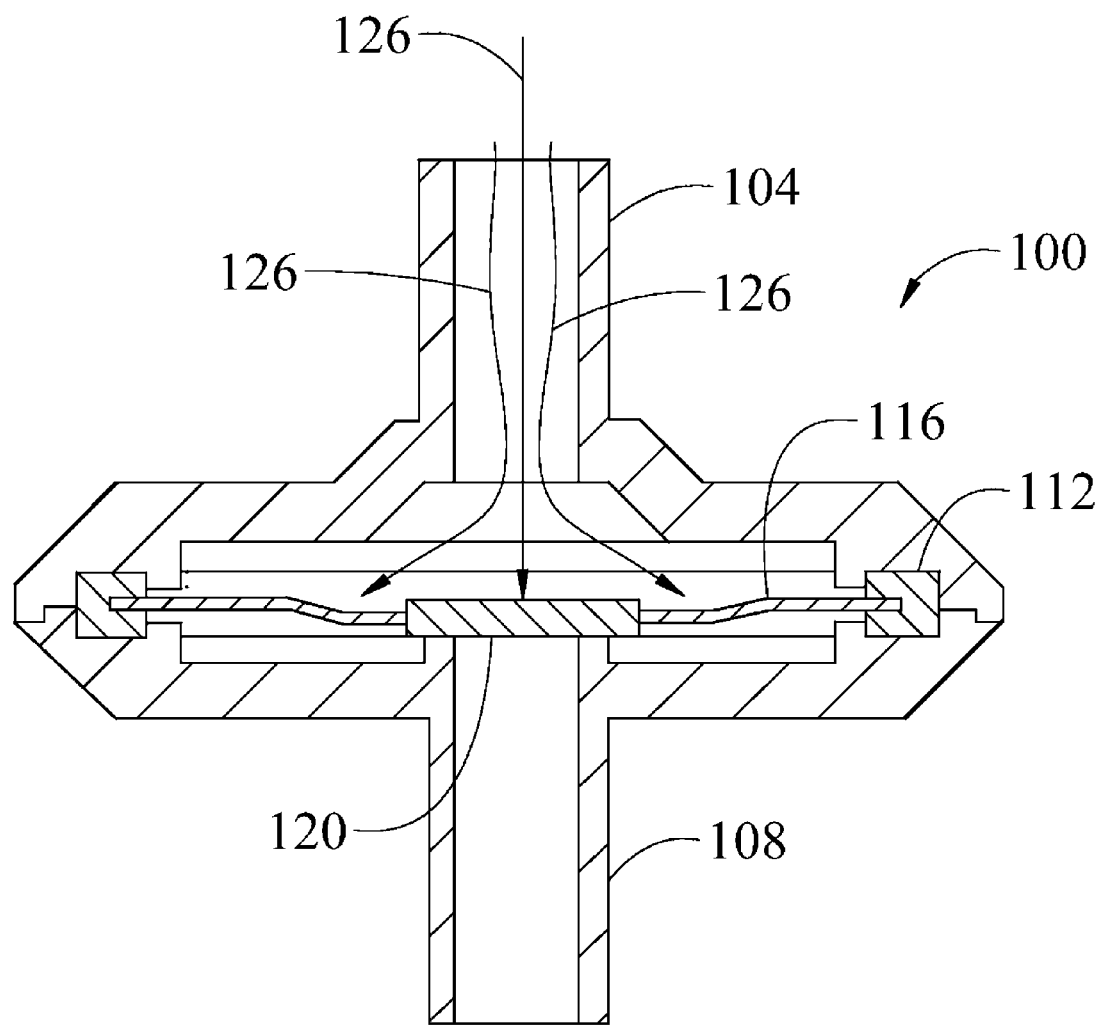
FIG. 7 is another cross-sectional view illustrating the combination filter valve apparatus and fluid inlet/outlet ports shown in FIG. 6 but showing the combination filter valve apparatus in a closed position.

FIG. 6 illustrates the combination filter valve apparatus 100 in a normally open position which allows vapor flow in either direction. For example, the arrows 124 generally represent vapor (e.g., gasoline fumes, gases, etc.) venting out through the apparatus 100. As indicated by the arrows 124, the vapors may vent or travel upwardly through the conduit 104, pass through filtration media 116 of the apparatus 100, and then travel upwardly out through the conduit 108.

In FIG. 7, the combination filter valve apparatus 100 is shown in a closed position. The apparatus 100 may be closed when sufficient pressure (as generally represented by arrows 126) has been applied to the apparatus 100 for causing the sealing member 120 to seal the opening 128 into the conduit 108. This pressure may occur, for example, when the container (having the conduits 104, 108 and combination filter valve apparatus 100) is upended or rolled over such that the liquid within the container contacts the sealing member 120 and/or filtration media 116 with sufficient pressure for causing the sealing member 120 to move from its normally open position (FIG. 6) to the closed position (FIG. 7). When in the closed position, the sealing member 120 substantially seals the opening 128 into the conduit 108. In which case, the closed filter valve apparatus 100 inhibits the egress of liquids (e.g., spilling of liquid, etc.) out of the container, and also inhibits the ingress of vapor and/or contamination back into the container. The apparatus 100 may be re-opened when the sealing member 120 moves back to its open position (FIG. 6) upon removal of the pressure against the sealing member 120 and/or filtration media 116. For example, removing of that pressure may occur by placing the container in its upright position such that the liquid within the container no longer contacts and applies pressure against the sealing member 120 and/or filtration media 116.

Figure 9:
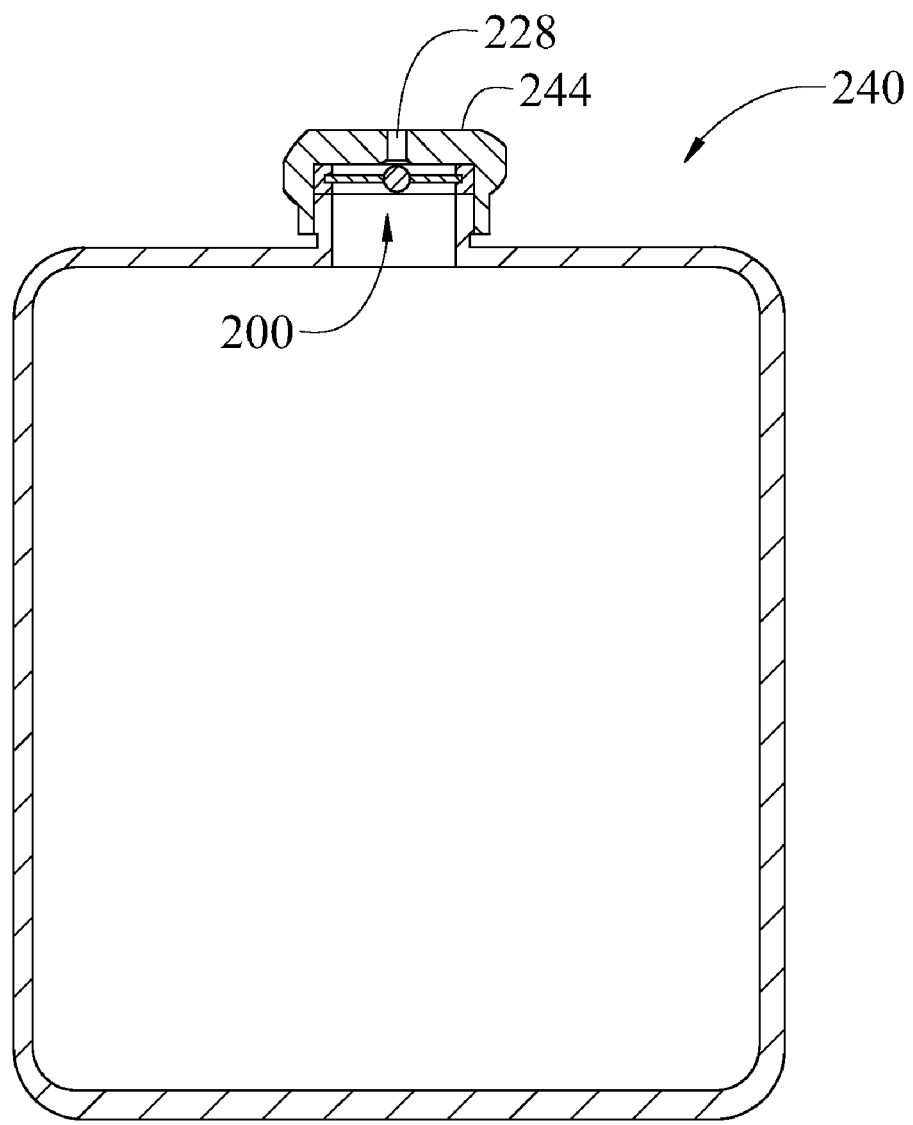
FIG. 9 is a cross-sectional view of an exemplary container having a cap with a combination filter valve apparatus according to exemplary embodiments.
Figure 10A:
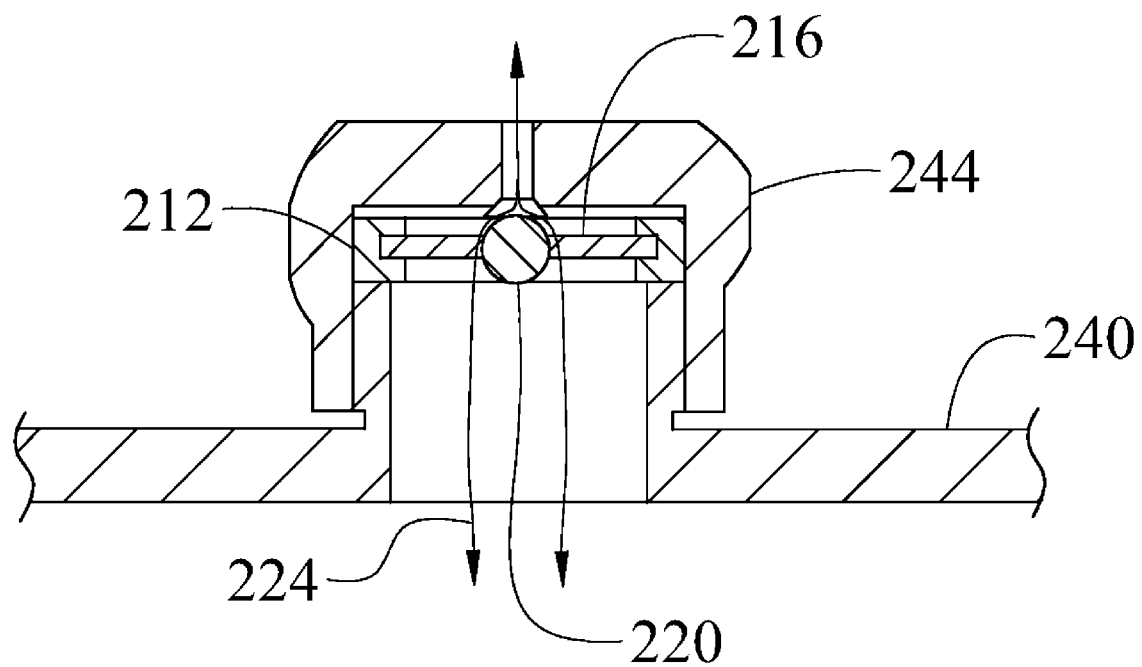
FIG. 10A is a partial cross-sectional view of the container shown in FIG. 9 and illustrating the combination filter valve apparatus in an open position.
Figure 10B:
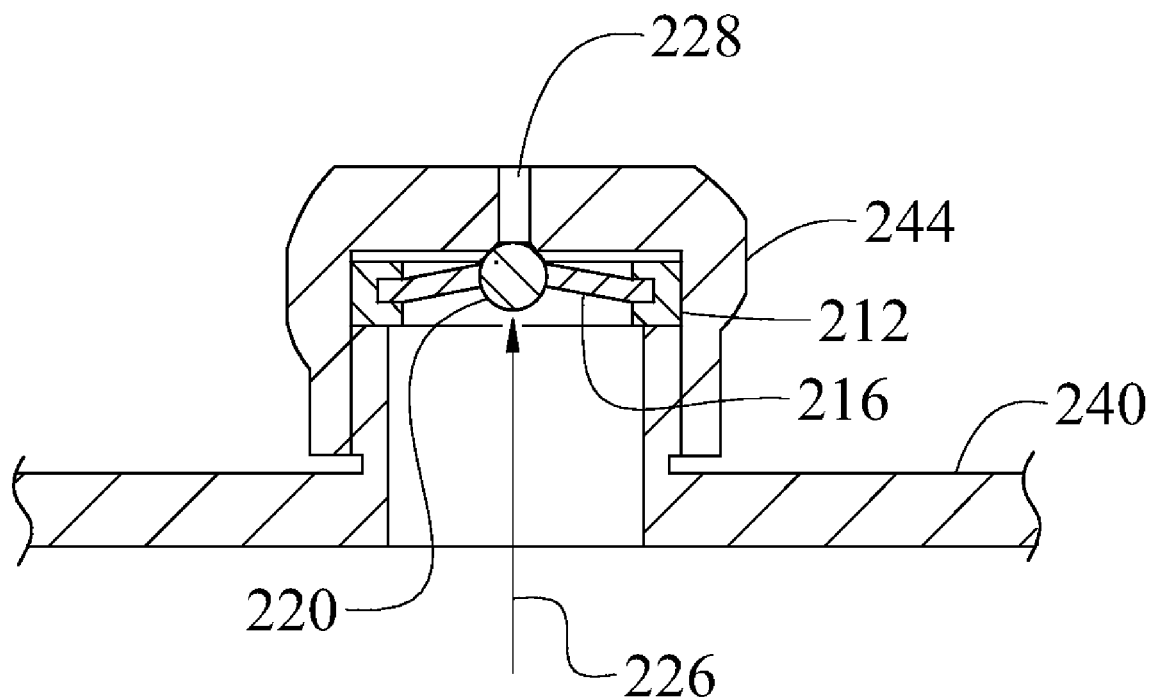
FIG. 10B is another cross-sectional view of the container shown in FIG. 10A but now illustrating the combination filter valve apparatus in a closed position.

FIGS. 9, 10A, and 10B illustrate an exemplary container 240 having a cap 244 with a combination filter valve apparatus 200 according to exemplary embodiments. The apparatus 200 is generally sandwiched between the upper lip of the container's spout and an inner surface of the cap 244. In some embodiments, the combination filter valve apparatus 200 is fixedly attached to the cap 244, for example, via adhesive bonding, etc. Alternatively, other means can be employed for providing the container 240 and cap 244 with the combination filter valve apparatus 200.

In this exemplary application, the apparatus 200 is operable as a "rollover" filter valve. In this regard, FIGS. 10A and 10B respectively illustrate the combination filter valve apparatus 200 in a normally open position (FIG. 10A) and a close position (FIG. 10B).

As shown in FIG. 10A, the arrows 224 generally represent that air flow in both directions can occur when the combination filter valve apparatus 200 when in the normally open position. By way of example, gasoline may be stored within the container 240. In which case, the arrows 224 may represent air entering the container 240 and/or gasoline fumes venting out the container 240.

As shown in FIG. 10B, the arrows 226 generally represent pressure (e.g., via liquid contact, etc.) being applied to the sealing member 220 and filtration media 216, such that the combination filter valve apparatus 200 is in the closed position. The pressure 226 causes the sealing member 220 to seal the opening 228 of the cap 244. This pressure may occur, for example, when the container 240 is upended or rolled over such that the liquid within the container 240 contacts the sealing member 220 and/or filtration media 216 with sufficient pressure for causing the sealing member 220 to move from its normally open position (FIG. 10A) to the closed position (FIG. 10B). When in the closed position, the sealing member 220 substantially seals the opening 228 of the cap 244. In which case, the closed filter valve apparatus 200 inhibits the egress of liquids (e.g., spilling of liquid, etc.) out of the container 240, and also inhibits the ingress of vapor back into the container 240. The apparatus 200 may be re-opened when the sealing member 220 moves back to its open position (FIG. 10A) upon removal of the pressure 226, for example, by placing the container 240 in its upright position such that the liquid within the container no longer contacts and applies pressure against the sealing member 220 and/or filtration media 216.

Figure 11:
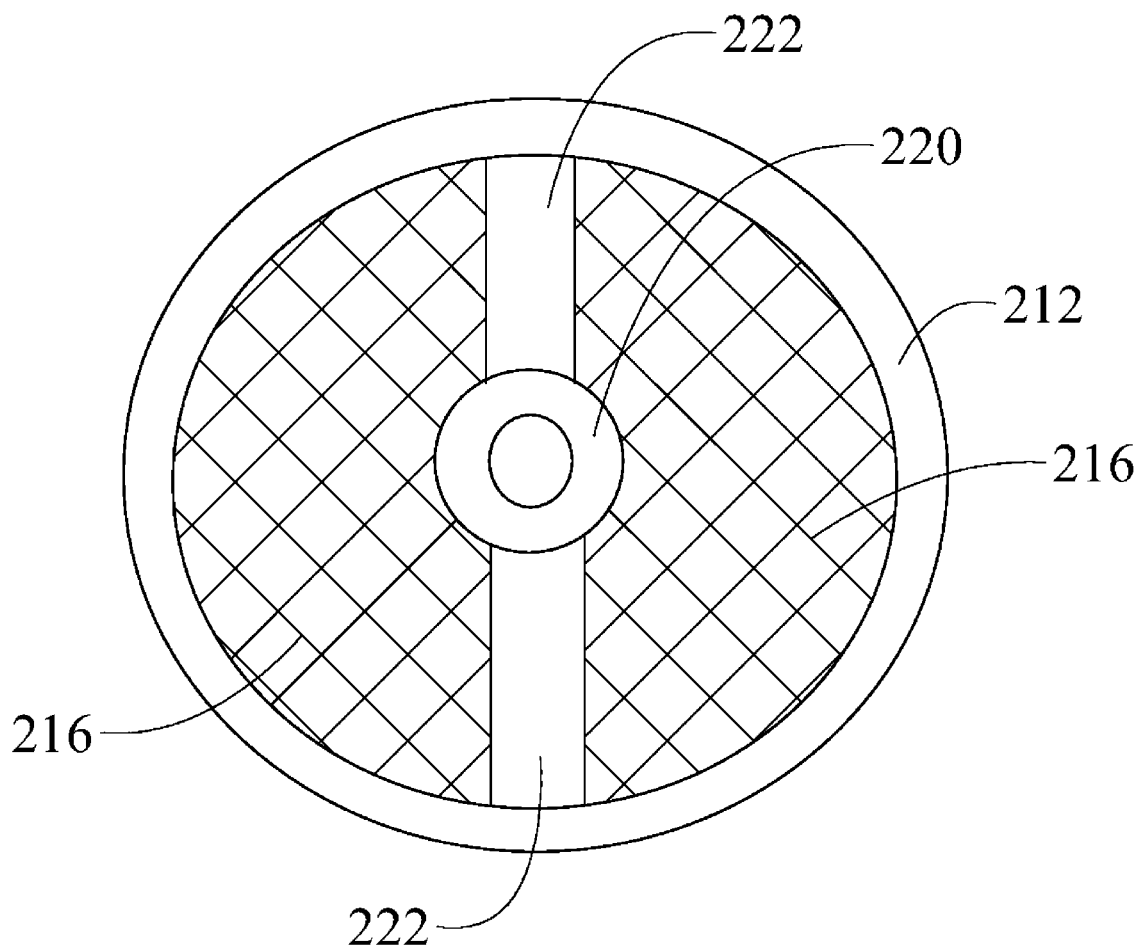
FIG. 11 is a plan view of an exemplary configuration for the combination filter valve apparatus shown in FIGS. 9 and 10 according to exemplary embodiments.

FIG. 11 illustrates an exemplary configuration for the combination filter valve apparatus 200 according to exemplary embodiments. As shown, the combination filter valve apparatus 200 generally includes an outer member 212, filtration media 216, and an inner valve or sealing member 220.

In this exemplary embodiment, the combination filter valve apparatus 200 also includes ribs 222 extending generally across the apparatus 200 from the sealing member 220 to the outer member 212. These ribs 222 can facilitate and ease molding of the apparatus 200. In this regard, the filtration media 216 may comprise an insert molded screen. The screen can be configured (e.g., formed from one or more materials having a sufficiently small pore size, etc.) for restricting fluid flow for causing a differential pressure to close the apparatus 200. Alternative embodiments, however, can include combination filter valve assemblies that do not include such ribs and/or assemblies that are manufactured using other methods besides molding.

As shown in FIG. 11, the outer member 212 comprises a generally circular ring or annular member. Alternative embodiments, however, can include an outer member in other configurations, including rectangular and non-rectangular configurations (e.g., triangular, hexagonal, ovular, other polygonal shapes, etc.) depending, for example, on the particular environment in which the combination filter valve apparatus 200 will be used.

In this embodiment, the valve or sealing member 220 comprises a generally spherical member configured to seal against the opening 228 of the cap 244. Alternative embodiments, however, can include a valve or sealing member in other configurations, including circular discs, rectangular and non-rectangular configurations (e.g., triangular, hexagonal, ovular, other polygonal shapes, etc.) depending, for example, on the particular environment in which the combination filter valve apparatus 200 will be used, and on the particular configuration (e.g., shape, size, etc.) of the opening to be closed by the sealing member 220.

Figure 12:
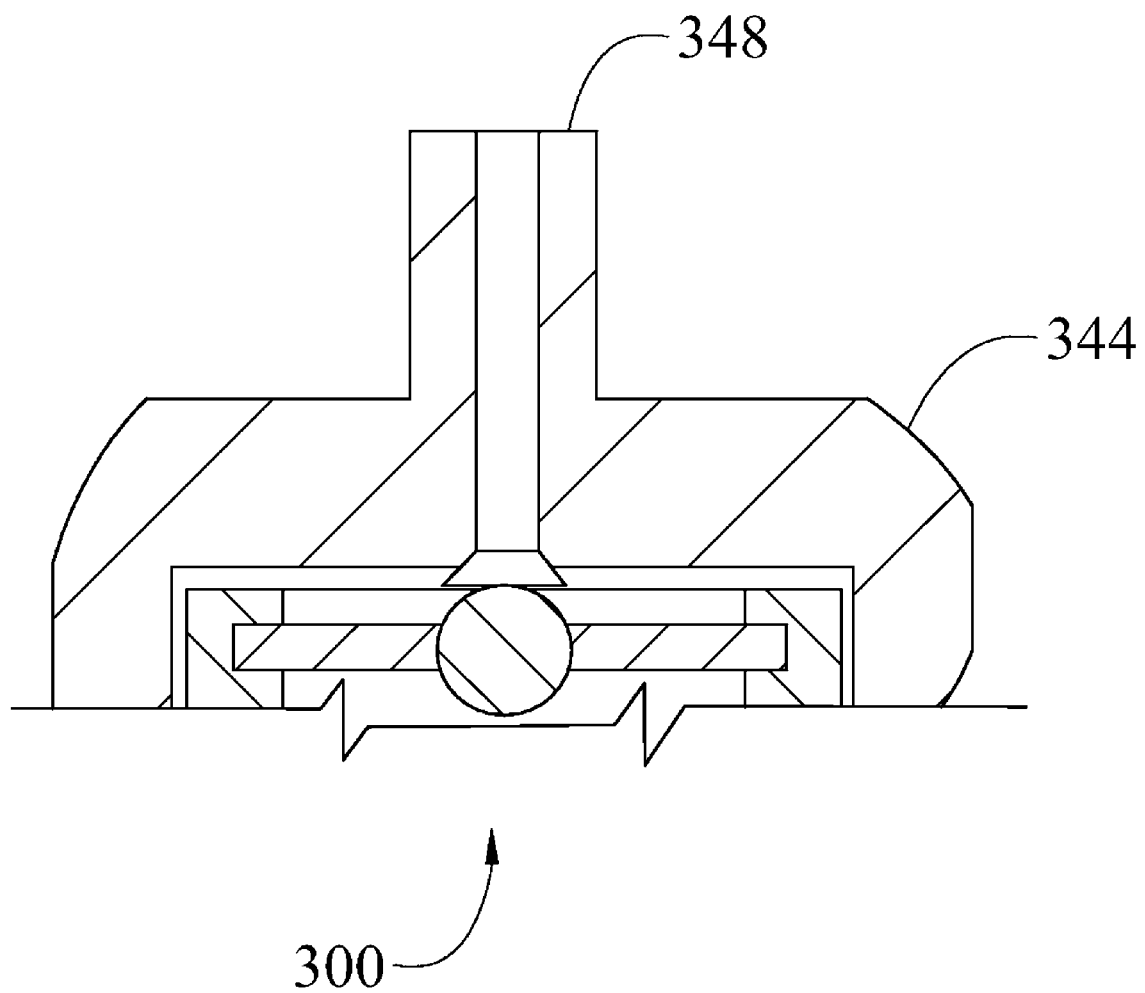
FIG. 12 is a cross-sectional view of an exemplary cap having a combination filter valve apparatus (shown in an open position) and an optional port for vapor recovery according to exemplary embodiments.

FIG. 12 illustrates another embodiment of an exemplary cap 344 having a combination filter valve apparatus 300. In this particular embodiment, however, the cap 344 also includes an optional port 348 for vapor recovery according to exemplary embodiments.

Figure 13A:
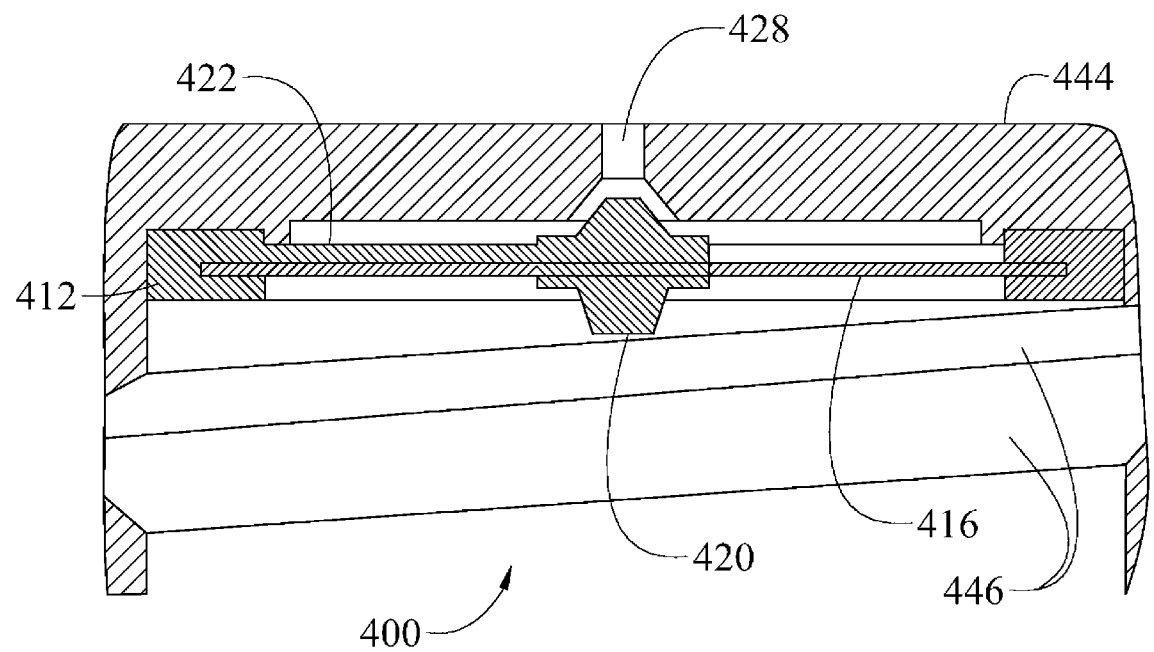
FIG. 13A is a cross-sectional view of an exemplary cap having a combination filter valve apparatus (shown in an open position) according to exemplary embodiments.
Figure 13B:
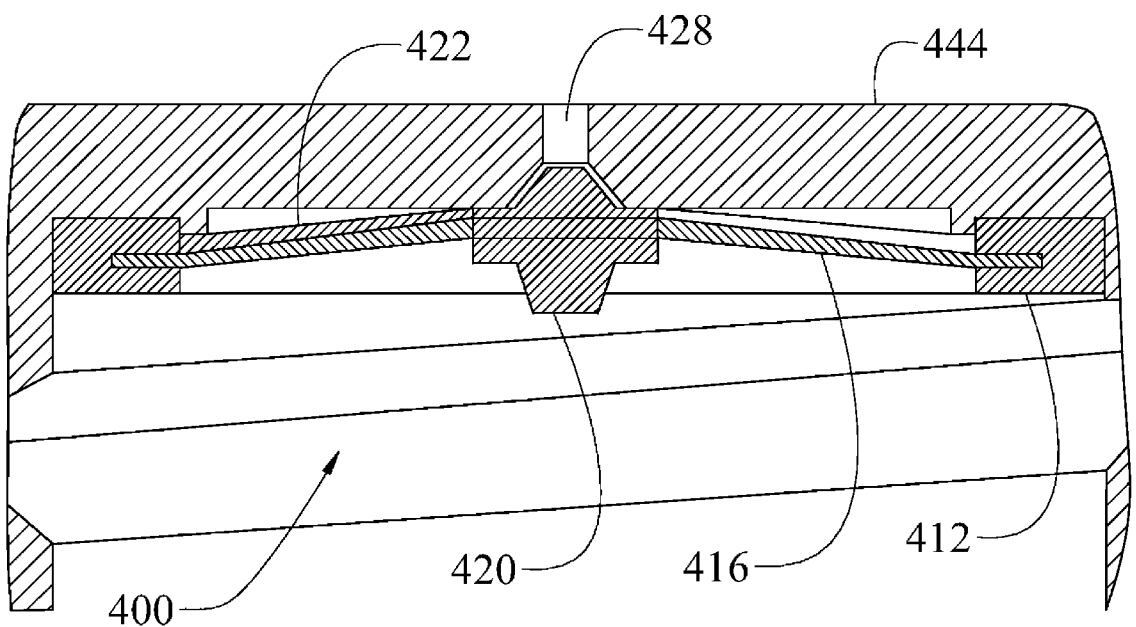
FIG. 13B is another cross-sectional view of the cap shown in FIG. 13A but now illustrating the combination filter valve apparatus in a closed position.

FIGS. 13A and 13B illustrate another embodiment of an exemplary cap 444 having a combination filter valve apparatus 400. As shown, the combination filter valve apparatus 400 generally includes an outer member 412, filtration media 416, and an inner valve or sealing member 420. The combination filter valve apparatus 400 also includes a rib 422 extending generally half-way across the apparatus 400 from the outer member 412 to the sealing member 420. This rib 422 can facilitate and ease molding of the apparatus 400. In this regard, the filtration media 416 may comprise an insert molded screen. The screen can be configured (e.g., formed from one or more materials having a sufficiently small pore size, etc.) for restricting fluid flow for causing a differential pressure to close the apparatus 400. Alternative embodiments, however, can include combination filter valve assemblies that do not include such ribs and/or assemblies that are manufactured using other methods besides molding.

In this embodiment, the valve or sealing member 420 is configured for sealing engagement with the opening 428 of the cap 444. Alternative embodiments, however, can include a valve or sealing member in other configurations besides what is shown in FIGS. 13A and 13B depending, for example, on the particular environment in which the combination filter valve apparatus 400 will be used, and on the particular configuration (e.g., shape, size, etc.) of the opening to be closed or sealed by the sealing member 420.

In addition, the cap 444 includes threads 446 for removably attaching the cap 444 to a container. Alternatively, other means can be employed to allow for removable attachment of the cap 444 to a container, such as a friction/interference/press fit, etc.

The apparatus 400 can be generally sandwiched between a container and an inner surface of the cap 444. In some embodiments, the combination filter valve apparatus 400 is fixedly attached to the cap 444, for example, via adhesive bonding, etc. Alternative means can also be employed for providing the container cap 444 with the combination filter valve apparatus 400.

In FIG. 13A, the combination filter valve apparatus 400 is shown in its normally open position that allows vapor ventilation through the opening 428 of the cap 444. FIG. 13B illustrates the combination filter valve apparatus 400 in a closed position, for example, after liquid within an upended or rolled over container (to which the cap 444 is attached) has created sufficient pressure for moving the sealing member 420 into sealing engagement with the cap's opening 428. In the closed position, the sealing member 420 inhibits the passage of fluid (e.g., liquids, gases, air, vapors, etc.) through the cap's opening 428. When pressure is removed, for example, by placing the container in its upright position such that the liquid within the container no longer contacts and applies pressure against the sealing member 420 and/or filtration media 416, the sealing member 420 may return to its normally open position (FIG. 13A).

Accordingly, various embodiments disclosed herein include combination filter valve apparatus (e.g., 100, 200, 300, 400, etc.) that can be used as "rollover" valves, such as for a portable gasoline tank, or other container. In some embodiments, a combination filter valve apparatus can also be used as a rollover valve for a small engine vapor recovery system. A rollover valve preferably has one or more (and preferably all in some embodiments) of the following characteristics. For example, the rollover valve may be configured to allow venting of fuel vapor to the vapor recovery canister, while also preventing (or at least inhibiting) liquid fuel from entering the vapor recovery canister. The rollover valve may be configured such that it doesn't block fuel contact. The rollover valve may be configured such that it can hold a fuel pressure of about one PSIG (pounds per square inch gauge) for at least about one hour. The rollover valve may be configured such that it allows passage of fuel vapor at less than about one inch above atmospheric pressure. The rollover valve can be configured to allow fuel vapor out and air back into the tank. The rollover valve can be configured to be resistant to gasoline for at least about five years. In those embodiments in which two cycle fuel is used, the rollover valve can be configured to be resistant to contact with the oil mixed with the fuel. The rollover valve can be configured to withstand temperatures from about minus forty degrees Fahrenheit to about three hundred degrees Fahrenheit. The rollover valve can be configured such that fuel vapor and air flow through the rollover valve at relatively low rates, such as at about one millimeter per day of fluid flow rate.

Figure 14A:
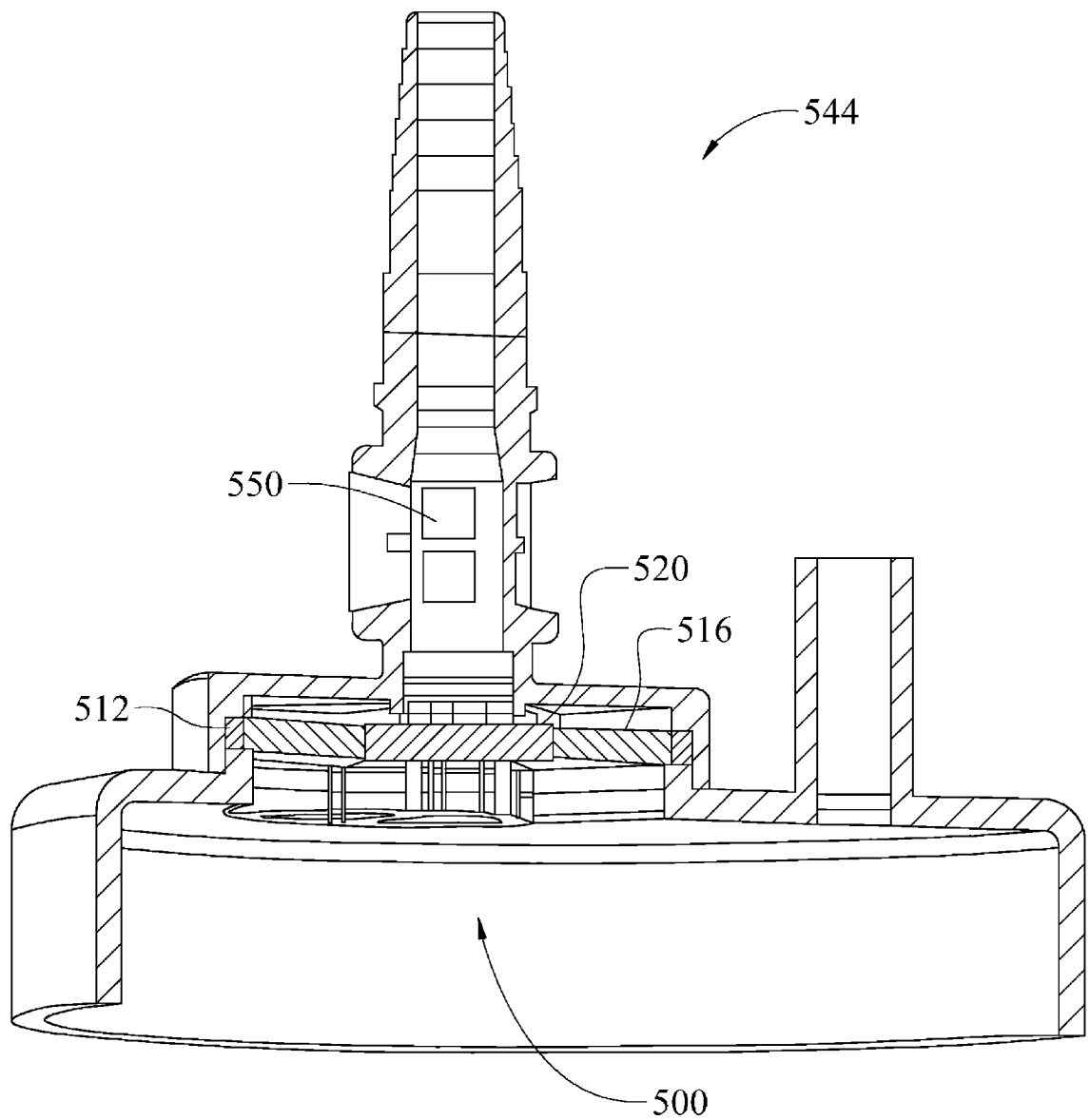
FIG. 14A is a perspective view of an exemplary suction cap apparatus with forward portions broken away for clarity, where the suction cap apparatus includes a suction line vent, and a combination filter valve apparatus (shown in an open position) being used as an inline filter and check valve according to exemplary embodiments.
Figure 14B:
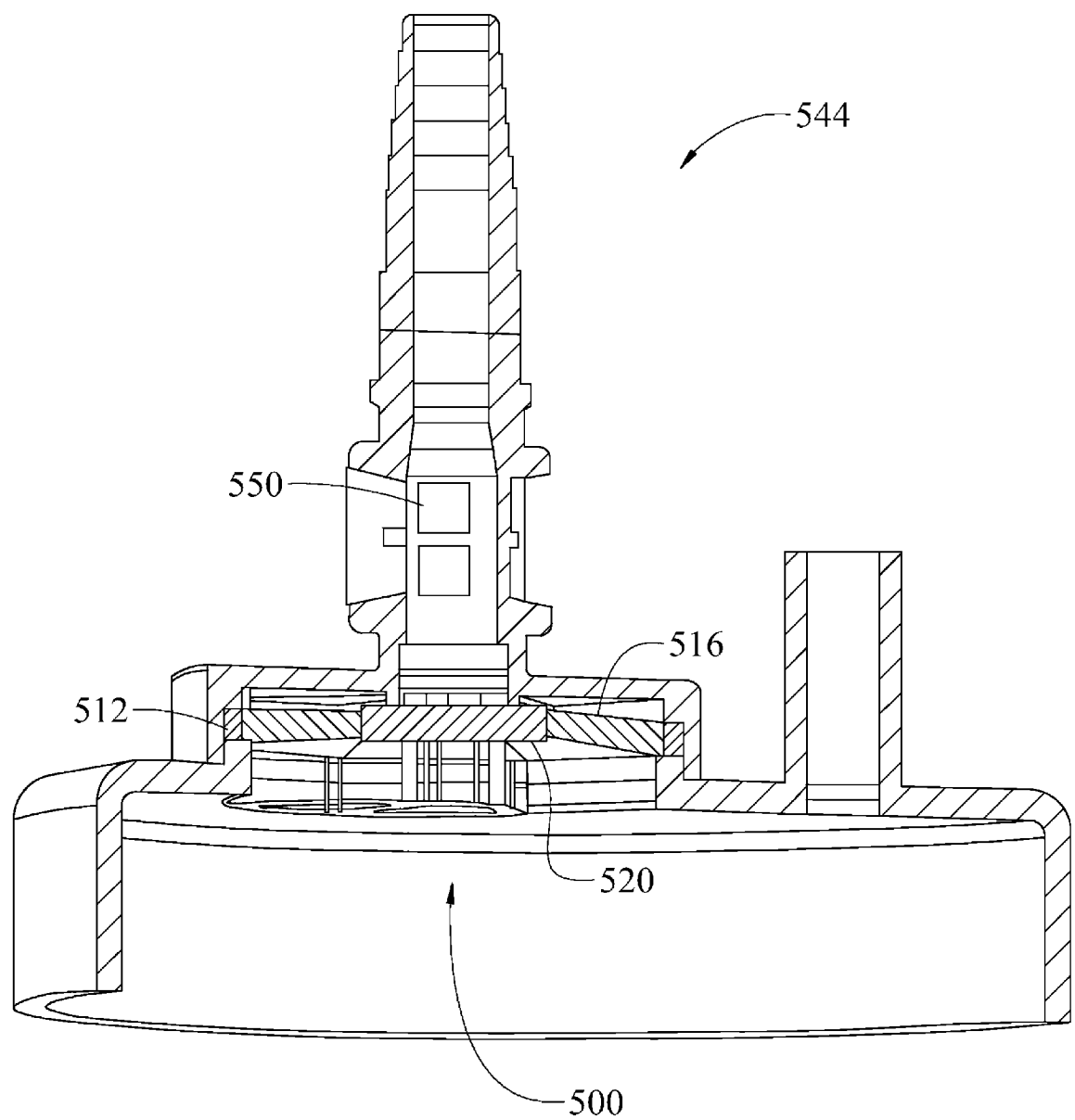
FIG. 14B is another perspective view of the suction cap apparatus shown in FIG. 14A but now illustrating the combination filter valve apparatus in a closed position.

FIGS. 14A and 14B illustrate another exemplary environment in which can be used a combination filter valve apparatus 500 embodying one or more aspects of the present disclosure. As shown, the combination filter valve apparatus 500 is associated with a suction cap apparatus 544. In this example, the combination filter valve apparatus 500 is operable as an inline filter that allows filtered air to pass (FIG. 14A) and as a check valve that is closed via liquid contact and prevents (or at least inhibits) fluid flow therepast (FIG. 14B). The suction cap apparatus 544 may also include a vacuum line vent 550 for venting and clearing of the inline filter of fluid.

A wide range of materials, manufacturing methods, and configurations (e.g., shapes, sizes, etc.) can be used for components (e.g., outer member 512, filtration media 516, sealing member 520, etc.) of the combination filter valve apparatus 500 and the suction cap apparatus 544. For example, various embodiments include the check valve or sealing member 520 being molded to the inline filter or filtration media 516. Alternative manufacturing methods can also be employed.

Figure 15A:
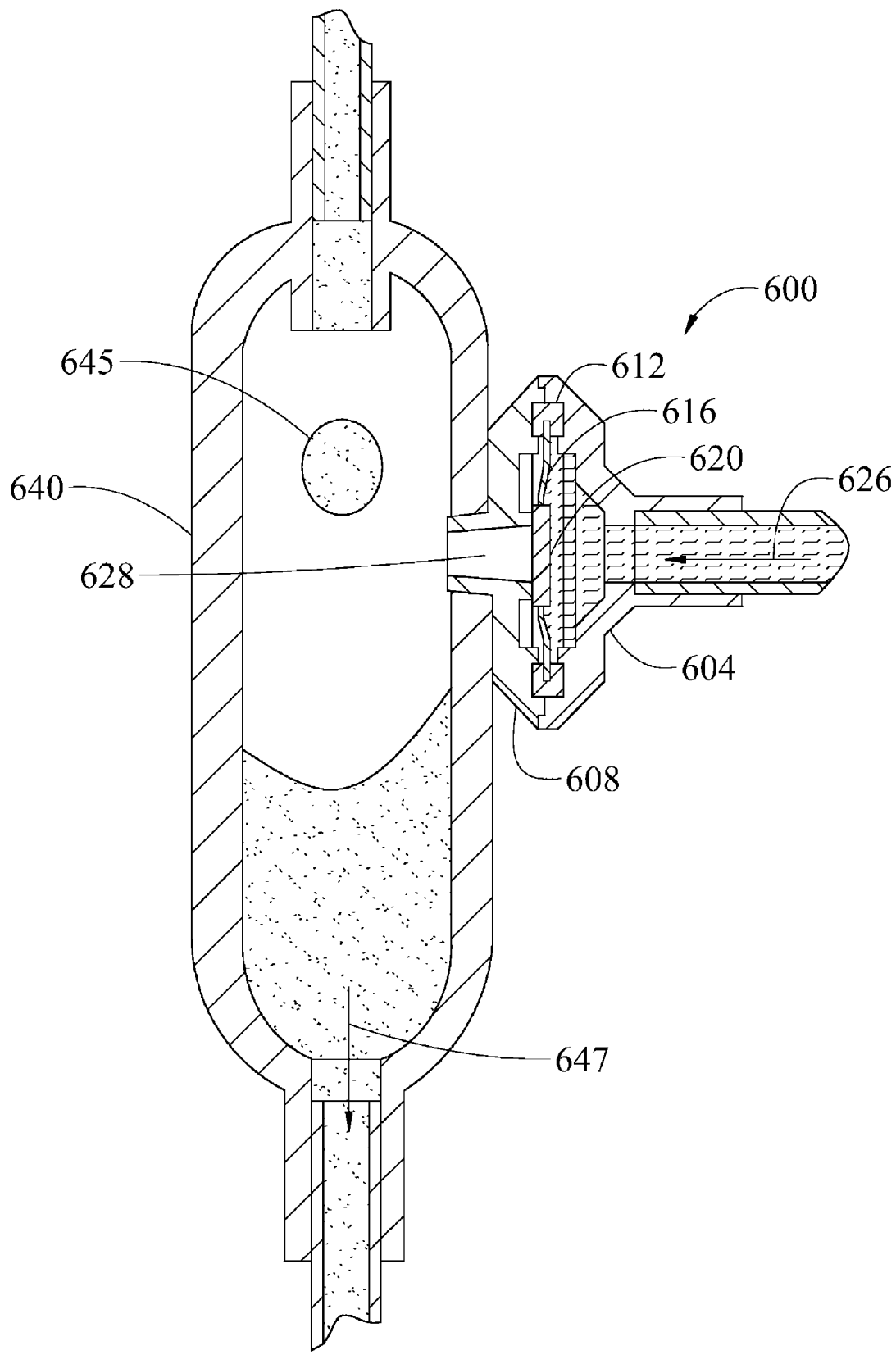
FIG. 15A is a cross-sectional view of an exemplary container having a combination filter valve apparatus (shown in a closed position) according to exemplary embodiments.
Figure 15B:
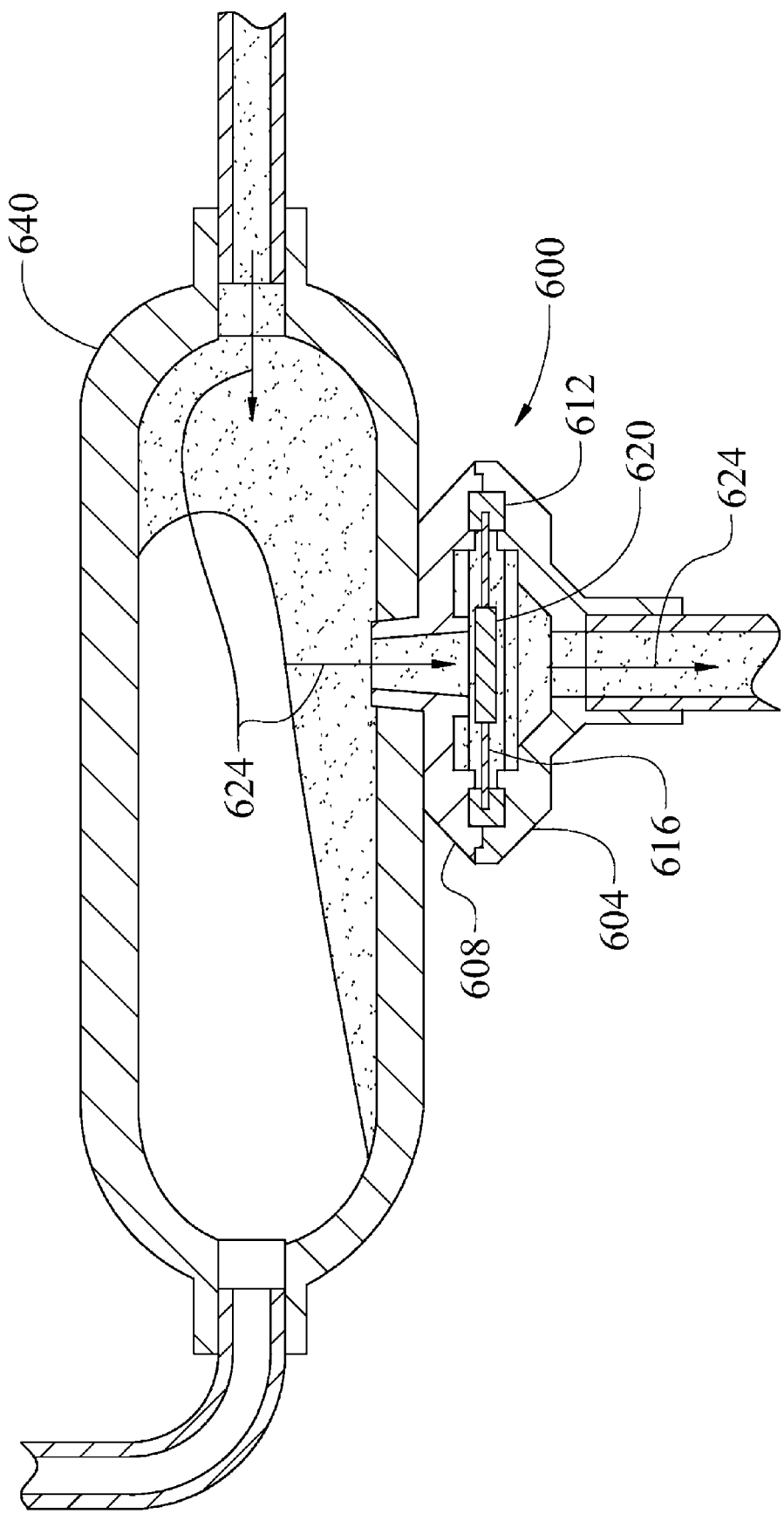
FIG. 15B is another cross-section view of the container shown in FIG. 15A but now illustrating the combination filter valve apparatus in an open position.

FIGS. 15A and 15B illustrate another exemplary environment in which can be used a combination filter valve apparatus 600 embodying one or more aspects of the present disclosure. As shown, the combination filter valve apparatus 600 is associated with a container 640. In this example, the combination filter valve apparatus 600 is operable as a one-way filter vent.

In FIG. 15A, the combination filter valve apparatus 600 is shown in a normally closed position that prevents (or at least inhibits) fluids (e.g., air, gases, liquids, etc.) from entering the container 640 through the opening 628. The arrow 626 and squiggly lines shown in FIG. 15A generally represent fluid that the closed valve apparatus 600 is preventing (or at least inhibiting) from entering the container 640 through the opening 628. Also shown in FIG. 15A, the speckles generally represent liquid. The drip 645 generally represents fluid flow into the container 640. The arrow 647 generally represents fluid flow out of the container 640.

FIG. 15B illustrates the combination filter valve apparatus 600 in an open position in which fluids (e.g., air, gases, liquids, etc.) can pass out of the container 640 via the opening 628 after passing through the filtration media 616. Also shown in FIG. 15B, the speckles generally represent liquid. The arrows 624 generally represent liquid flow. By way of example, the container 640 is shown in FIG. 15B on its side such that liquid within the container 640 is applying pressure for causing the sealing member 620 to disengage or move outwardly away from the opening 628. When the pressure is removed by returning the container 640 back to its upright position as shown in FIG. 15A, the sealing member 620 may return to its normally closed position.

Figure 15C:
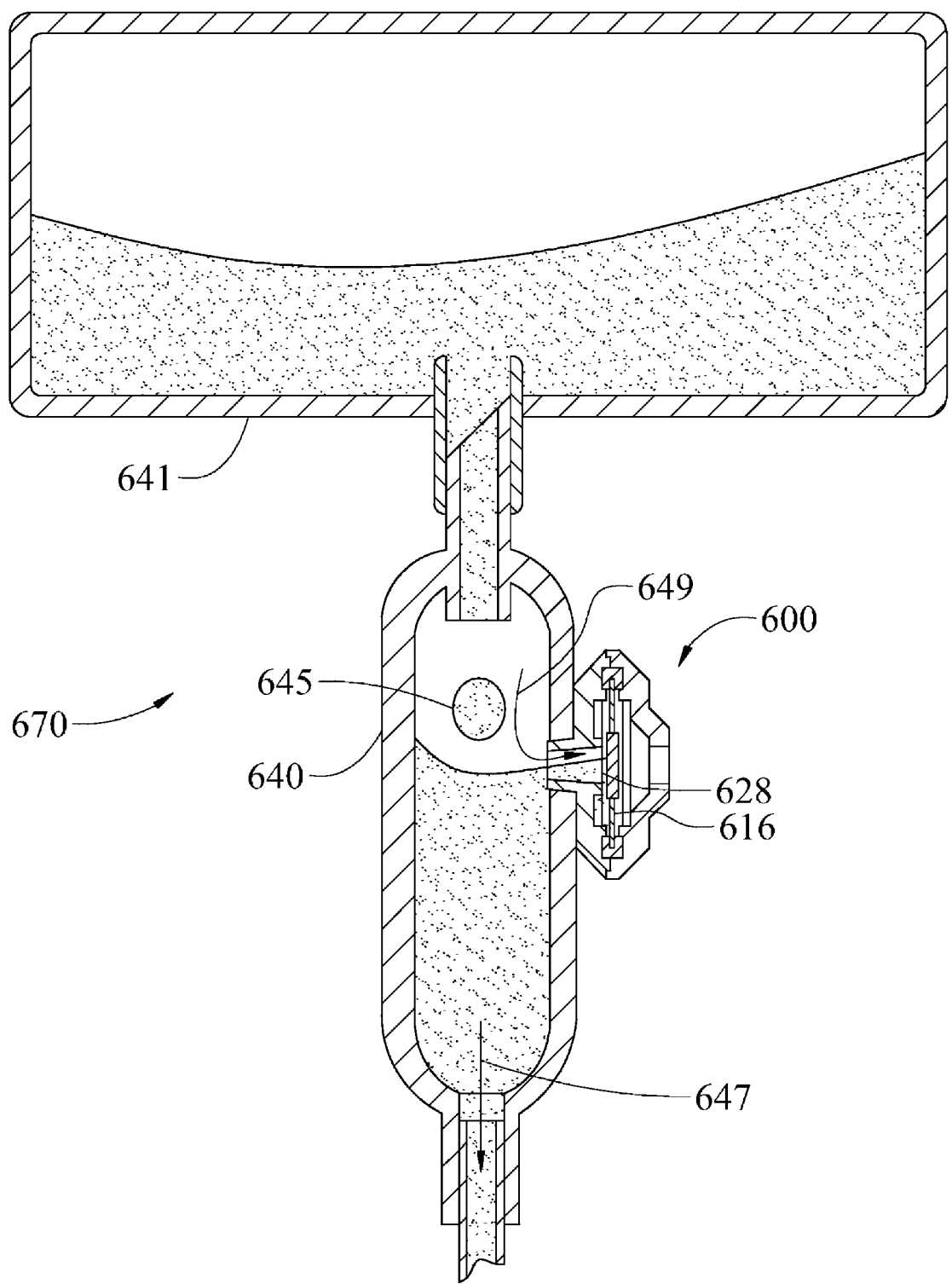
FIG. 15C is a cross-sectional view of an exemplary environment in which a combination filter valve apparatus (shown in an open position) can be used with a medical intravenous drip chamber system according to exemplary embodiments.
Figure 15D:
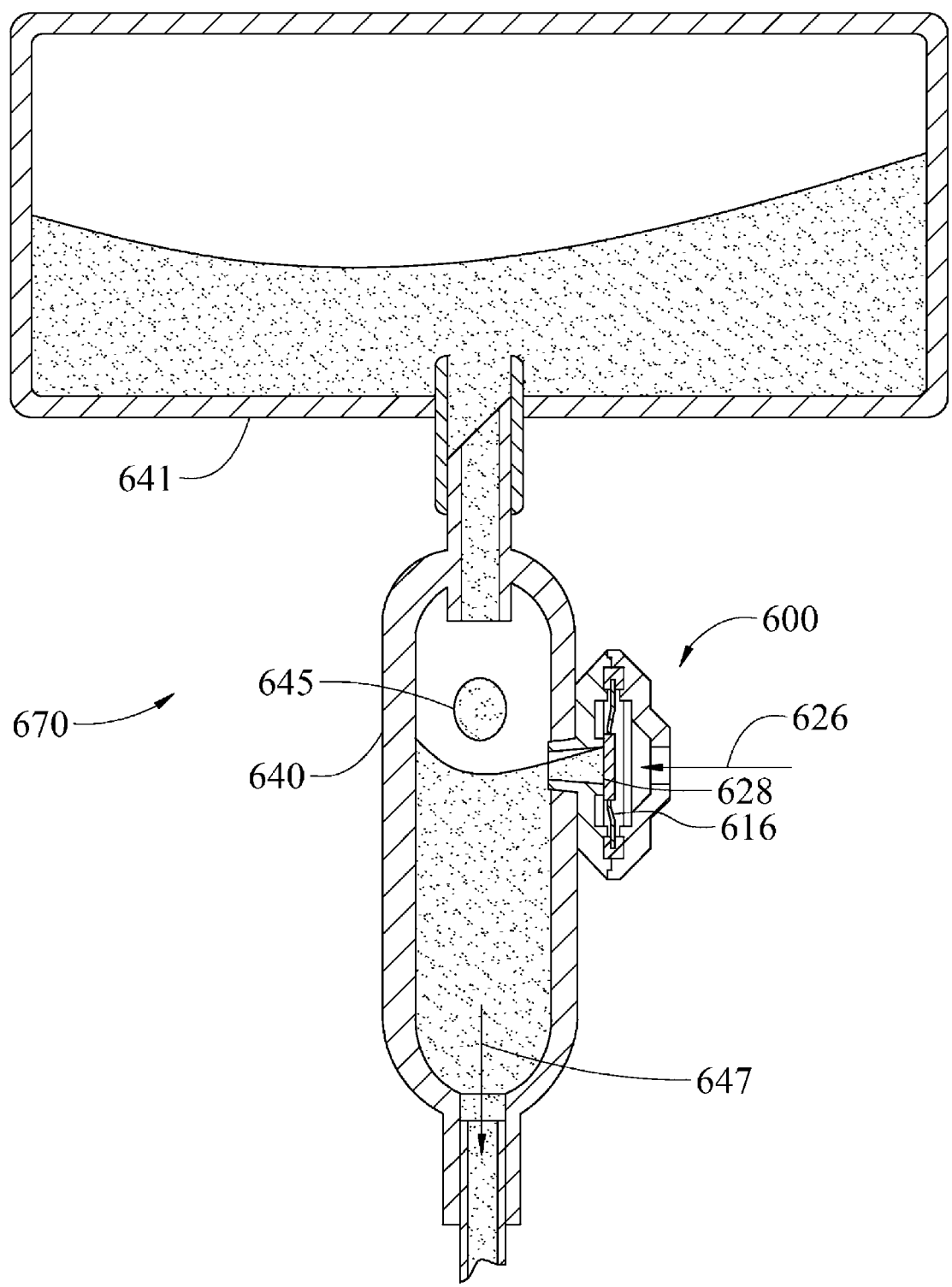
FIG. 15D is another cross-sectional view of the exemplary environment shown in FIG. 15C but now illustrating the combination filter valve apparatus in a closed position.

FIGS. 15C and 15D illustrate an exemplary medical application in which can be used a combination filter valve apparatus 600 embodying one or more aspects of the present disclosure. As shown, the combination filter valve apparatus 600 is being used with a medical intravenous drip chamber system 670. The system 670 generally includes a solution container 641 and a drip chamber 640. Also shown in FIG. 15C, the speckles generally represent liquid. The speckled drip 645 generally represents liquid flow into the drip chamber. The arrow 647 generally represents liquid flow out of the drip chamber 640.

With continued reference to FIG. 15C, the combination filter valve apparatus 600 is shown in a normally open position. In the open position, the media 616 (e.g., hydrophobic membrane or vent material, etc.) allows air (as generally represented by arrow 649) from within the chamber 640 to pass out through the opening 628. But the hydrophobic material 616 prevents (or at least inhibits) liquids from within the chamber 640 from passing through the hydrophobic material 616.

FIG. 15D illustrates the combination filter valve apparatus 600 in a closed position in which air is prevented (or at least inhibited) from entering the system 670 through the valve apparatus 600. Also shown in FIG. 15D, the speckles generally represent liquid. The speckled drip 645 generally represents liquid flow into the drip chamber. The arrow 647 generally represents liquid flow out of the drip chamber 640. By way of example, the valve apparatus 600 may be caused to close when air drawn into the system under a vacuum condition applies sufficient pressure (as generally represented by arrow 626) for causing the sealing member 620 to move into sealing engagement with the opening 628 into the chamber 640.

In other embodiments, the combination filter valve apparatus 600 can also be configured as a fluid filter with a valve feature for preventing (or at least inhibiting) the system from emptying. For example, a combination filter valve apparatus 600 and the members 604 and 608 may be rotated one hundred eighty degrees relative to the opening 628. In which case, the combination filter valve apparatus 600 in its normally open position would allow filtered air to enter the container 640 via opening 628 after passing through the filtration media 616. Vacuum or negative pressure would close the combination filter valve apparatus 600, thereby preventing (or at least inhibiting) fluid within the container 640 from emptying via the opening 628.

A wide range of materials, manufacturing methods, and configurations (e.g., shapes, sizes, etc.) can be used for components (e.g., outer member 612, filtration media 616, sealing member 620, etc.) of the combination filter valve apparatus 600 and the container 640. For example, various embodiments include a sealing member 620 insert molded to a hydrophobic filter membrane 616. Alternative manufacturing methods can also be employed.

Figure 16A:
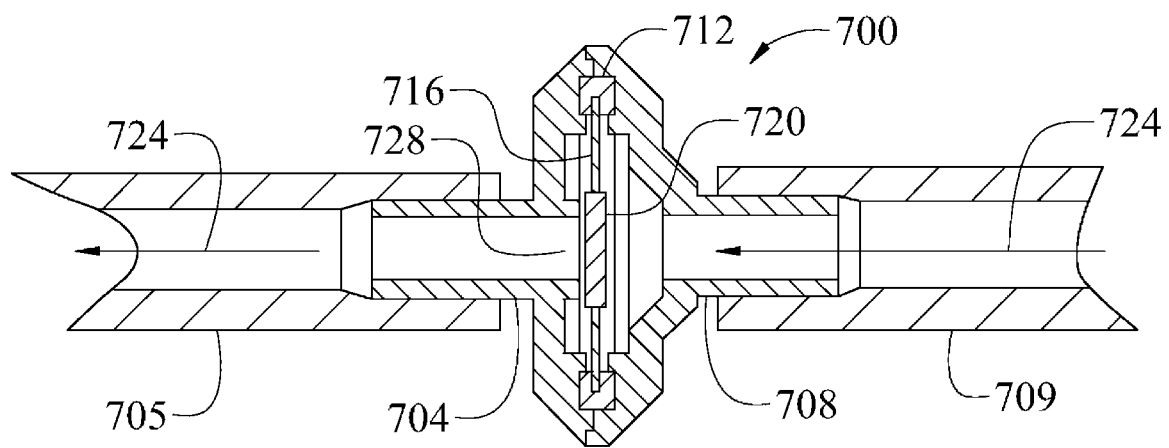
FIG. 16A is a cross-sectional view of an exemplary environment in which a combination filter valve apparatus (shown in an open position) can be used as a fluid control valve between two fluid passages or conduits according to exemplary embodiments.
Figure 16B:
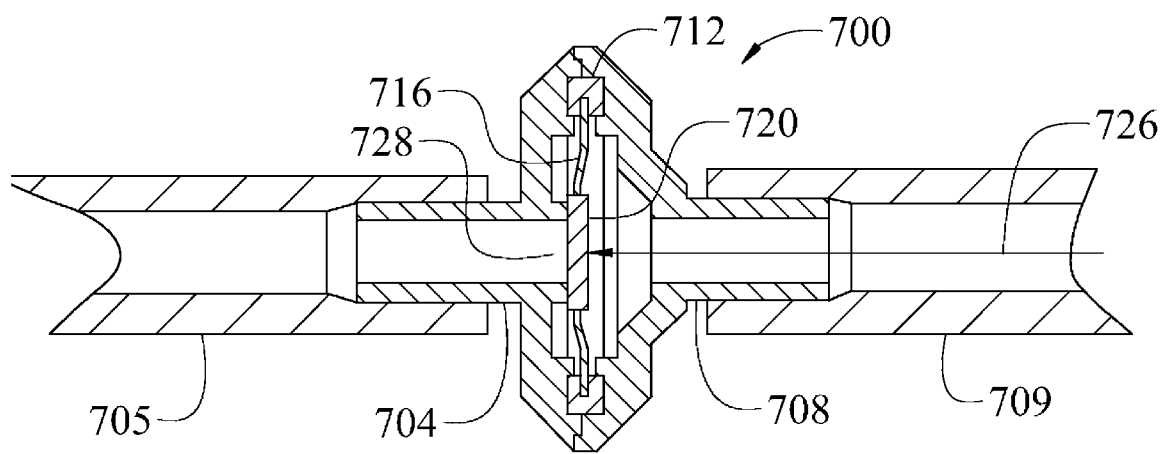
FIG. 16B is another cross-sectional view of the exemplary environment shown in FIG. 16A but now illustrating the combination filter valve apparatus in a closed position.

FIGS. 16A and 16B illustrate another exemplary environment in which can be used a combination filter valve apparatus 700 embodying one or more aspects of the present disclosure. As shown, the combination filter valve apparatus 700 generally includes an outer member 712, filtration media 716, a valve or sealing member 720 positioned generally between two fluid conduits or passages 704 and 708. In turn, the fluid conduits 704 and 708 are fluidically coupled in communication with conduits 705 and 709. In this example, the combination filter valve apparatus 700 is operable as a fluid flow control valve.

In FIG. 16A, the combination filter valve apparatus 700 is shown in a normally open position that allows fluid flow (as generally represented by arrows 724) from one conduit 708 to the other conduit 704. FIG. 16B illustrates the combination filter valve apparatus 700 in a closed position that prevents (or at least inhibits) fluids (e.g., air, gases, liquids, etc.) from passing from the conduit 708 to the conduit 704. By way of example, the combination filter valve apparatus 700 may shut off or close automatically without manual user intervention when the filtration media 716 is clogged and when fluid flow against the clogged filtration media 716 creates a sufficient pressure (as generally represented by arrow 726) for causing the sealing member 720 to move into sealing engagement with the opening 728 into the conduit 704. Additionally, or alternatively, the combination filter valve apparatus 700 may shut off or close automatically without manual user intervention when there is a sufficiently high or too fast of fluid flow, which creates pressure 726 for causing the sealing member 720 to move into sealing engagement with the opening 728 into the conduit 704. When the pressure 726 is removed (e.g., by unclogging or cleaning the filtration media 716, by reducing the fluid flow rate, etc.), the sealing member 720 may return to its normally open position as shown in FIG. 16A.

A wide range of materials, manufacturing methods, and configurations (e.g., shapes, sizes, etc.) can be used for components of the combination filter valve apparatus 700. For example, various embodiments include a sealing member 720 insert molded to a hydrophobic, hydrophilic, screen, and/or depth media filter membrane 716. Alternative materials and manufacturing methods can also be employed.

Figure 17A:
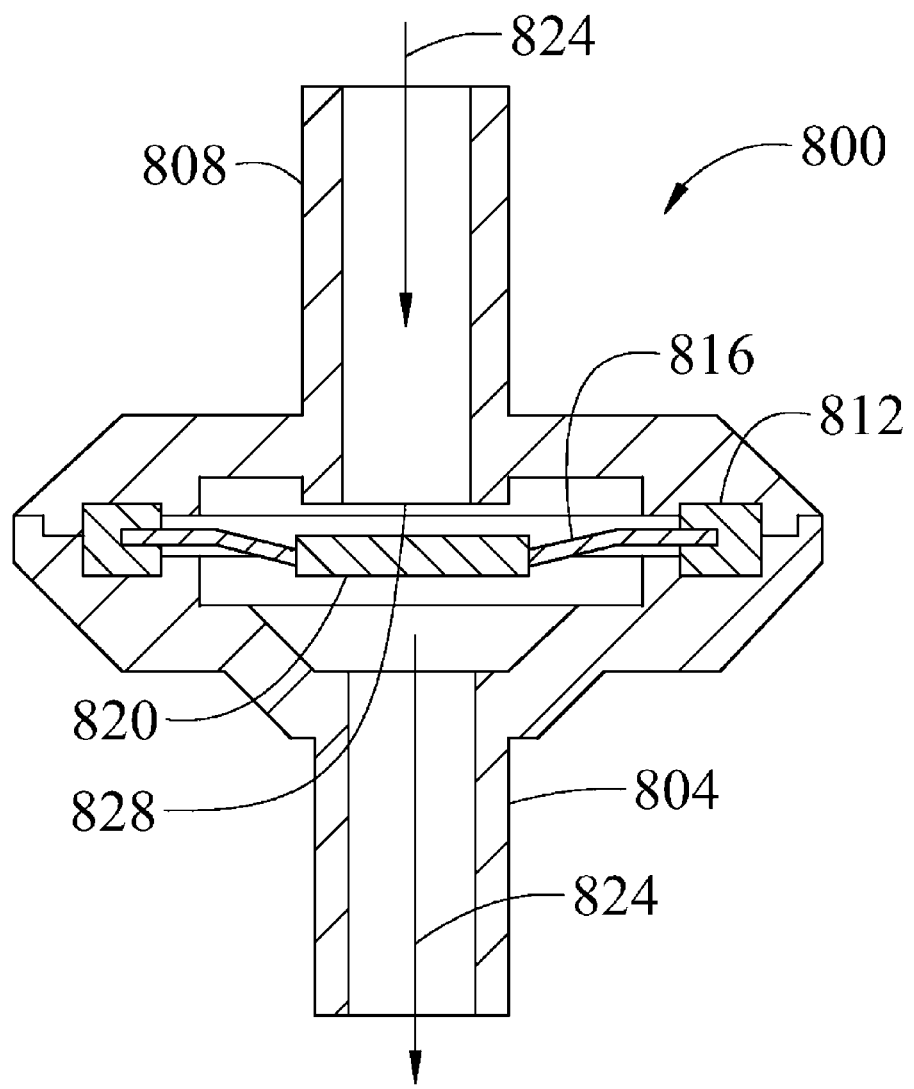
FIG. 17A is a cross-sectional view of an exemplary environment in which a combination filter valve apparatus (shown in an open position) can be used as a high-flow one-way valve between two fluid passages or conduits according to exemplary embodiments.
Figure 17B:
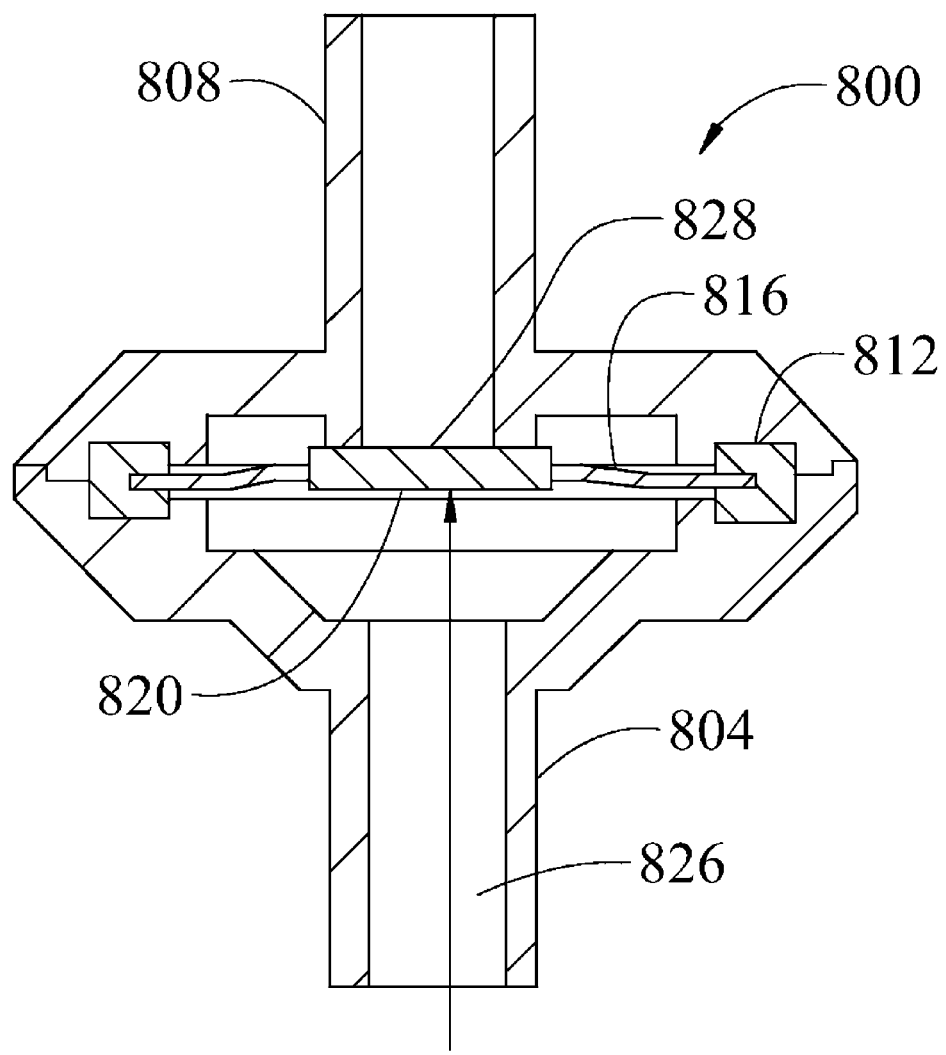
FIG. 17B is another cross-sectional view of the exemplary environment shown in FIG. 17A but now illustrating the combination filter valve apparatus in a closed position.

FIGS. 17A and 17B illustrate another exemplary environment in which can be used a combination filter valve apparatus 800 embodying one or more aspects of the present disclosure. As shown, the combination filter valve apparatus 800 generally includes an outer member 812, filtration media 816, a valve or sealing member 820 positioned generally between two fluid conduits or passages 804 and 808. In this example, the combination filter valve apparatus 800 is operable as a high-flow one-way valve, which may be used in the medical profession for controlling blood flow, etc.

In FIG. 17A, the combination filter valve apparatus 800 is shown in a normally open position that allows fluid flow (as generally represented by arrows 824) from one conduit 808 to the other conduit 804. FIG. 17B illustrates the combination filter valve apparatus 800 in a closed position that prevents (or at least inhibits) fluids (e.g., air, gases, liquids, etc.) from passing from the conduit 808 to the conduit 804. By way of example, the combination filter valve apparatus 800 may shut off or close automatically without user intervention when a back flow creates a sufficient pressure (as generally represented by arrow 826) for causing the sealing member 820 to move into sealing engagement with the opening 828 into the conduit 808. When the pressure 826 is removed, the sealing member 820 may return to its normally open position as shown in FIG. 17A.

Figure 18:
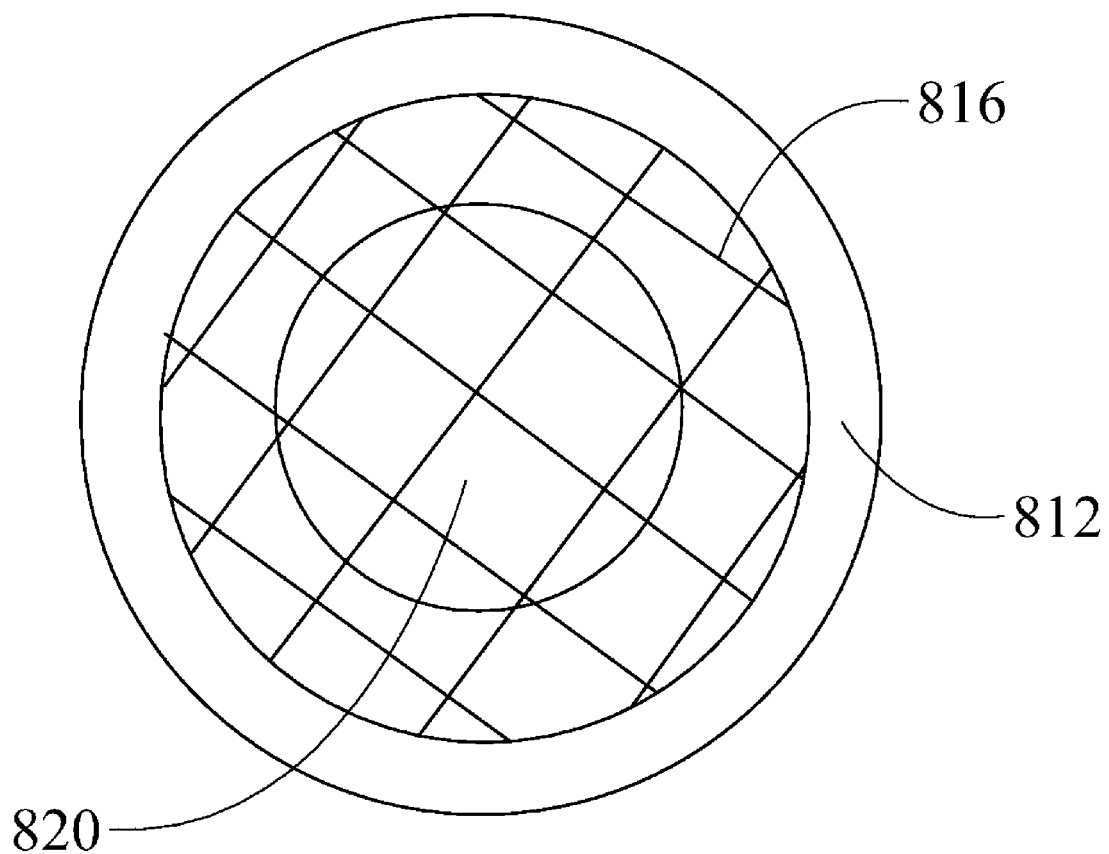
FIG. 18 is a plan view of an exemplary configuration for the combination filter valve apparatus shown in FIGS. 17A and 17B according to exemplary embodiments.

FIG. 18 illustrates an exemplary configuration for the combination filter valve apparatus 800 according to exemplary embodiments. As shown, the combination filter valve apparatus 800 generally includes an outer member 812, filtration media 816, and an inner valve or sealing member 820. In this exemplary embodiment, the filtration media 816 is configured (e.g., is relatively coarse, large pore size, large openings, etc.) for high flow conditions (e.g., high flow conditions suitable for blood flow, etc.) through the filtration media 816. By way of example, the filtration media 816 may comprise an insert molded screen that generally supports the sealing member 820. Alternative manufacturing methods and configurations (e.g., shapes, sizes, materials, etc.) can also be used for components of the combination filter valve apparatus 800.

Figure 19A:
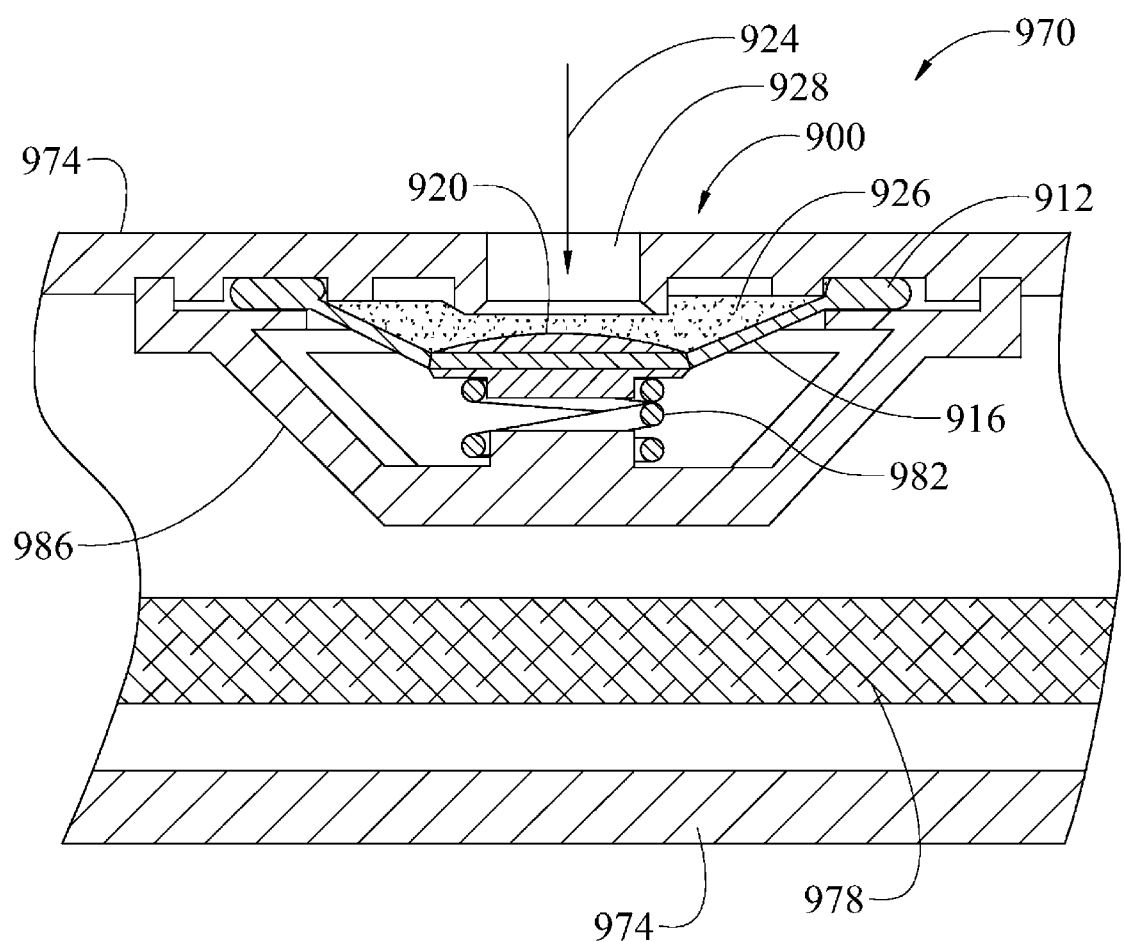
FIG. 19A is a cross-sectional view of an exemplary environment in which a combination filter valve apparatus (shown in an open position) can be used as a spring-biased bypass valve having filtration media wherein a spring is used for resiliently biasing the valve towards a closed position according to exemplary embodiments.
Figure 19B:
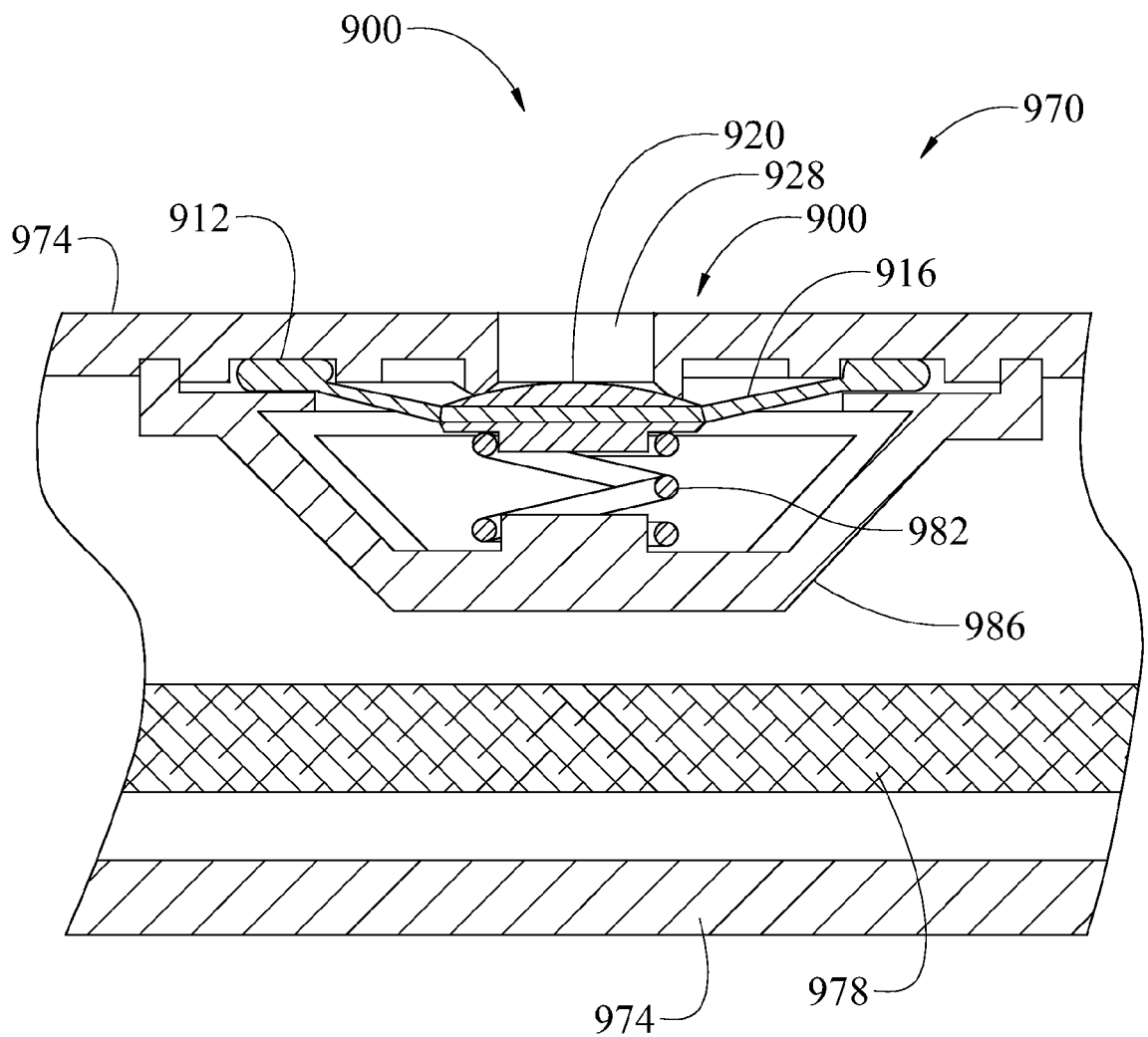
FIG. 19B is another cross-sectional view of the exemplary environment shown in FIG. 19A but now illustrating the combination filter valve apparatus in a closed position.

FIGS. 19A and 19B illustrate another exemplary environment in which can be used a combination filter valve apparatus 900 embodying one or more aspects of the present disclosure. As shown, the combination filter valve apparatus 900 generally includes an outer member 912, filtration media 916, and a valve or sealing member 920. In this example, the combination filter valve apparatus 900 is operable as a filter bypass valve, which may find use in the automotive industry, among other possible industries.

In the particular illustrated embodiment, FIGS. 19A and 19B illustrate an automatic transmission suction filter system 970 in which the combination filter valve apparatus 900 is installed for operation as a bypass valve. The inventor hereof has recognized that filtration needs in an automatic transmission are generally becoming greater, thereby increasing the need for finer filtration with smaller pore size. With the smaller pore size, however, the inventor has recognized that the filters may need a bypass feature to maintain fluid flow under all conditions.

With continued reference to FIGS. 19A and 19B, the automatic transmission suction filter system 970 generally includes a filter housing 974 and transmission filtration media 978. Also shown are a biasing device 982 (e.g., coil spring, etc.) for applying a force for biasing the combination filter valve apparatus 900 towards a normally closed position (FIG. 19B). The biasing device 982 is supported by structure 986. As shown in FIG. 19A, the combination filter valve apparatus 900 will open under high vacuum pressure, for example, during a cold start or a blocked filter. The speckles 926 in FIG. 19A generally represent that the filtration media 916 is substantially solid in this embodiment. When the combination filter valve apparatus 900 is in the opened position, fluid (as represented by arrow 924) may enter the housing 974 via the opening 928 and then by passing through the filtration media 916.

An exemplary operation of the transmission suction filter system 970 will now be provided for purposes of illustration only, and not for purposes of limitation. When the engine is first started, the transmission fluid will be relatively cold such that a relatively high vacuum pressure is needed to pull the cold transmission fluid through the main filter 978. In this particular example, the filtration media 916 preferably has a larger pore size than the transmission filtration media 978. For example, the filtration media 916 can be configured to allow transmission fluid to pass therethrough with an available pressure less than about negative fifteen PSIG. As noted above and shown in FIG. 19B, the combination filter valve apparatus 900 has a normally closed position due to the biasing force applied by the spring 982. The sealing member 920, however, will be forced to move out of sealing engagement with the opening 928 under a vacuum pressure that is high enough to overcome the biasing force applied by the spring 982. With the combination filter valve apparatus 900 opened, transmission fluid will flow through the opening 928 into the housing 974 (as represented by arrows 924 in FIG. 19A). But the vacuum pressure or pressure drop will decrease as the transmission fluid heats up, such that eventually the biasing force applied by the spring 982 will cause the sealing member 920 to move back into sealing engagement with the opening 928. At which point, the sealing member 920 will prevent (or at least inhibit) transmission fluid from entering the housing 974 via the opening 928.

Figure 20A:
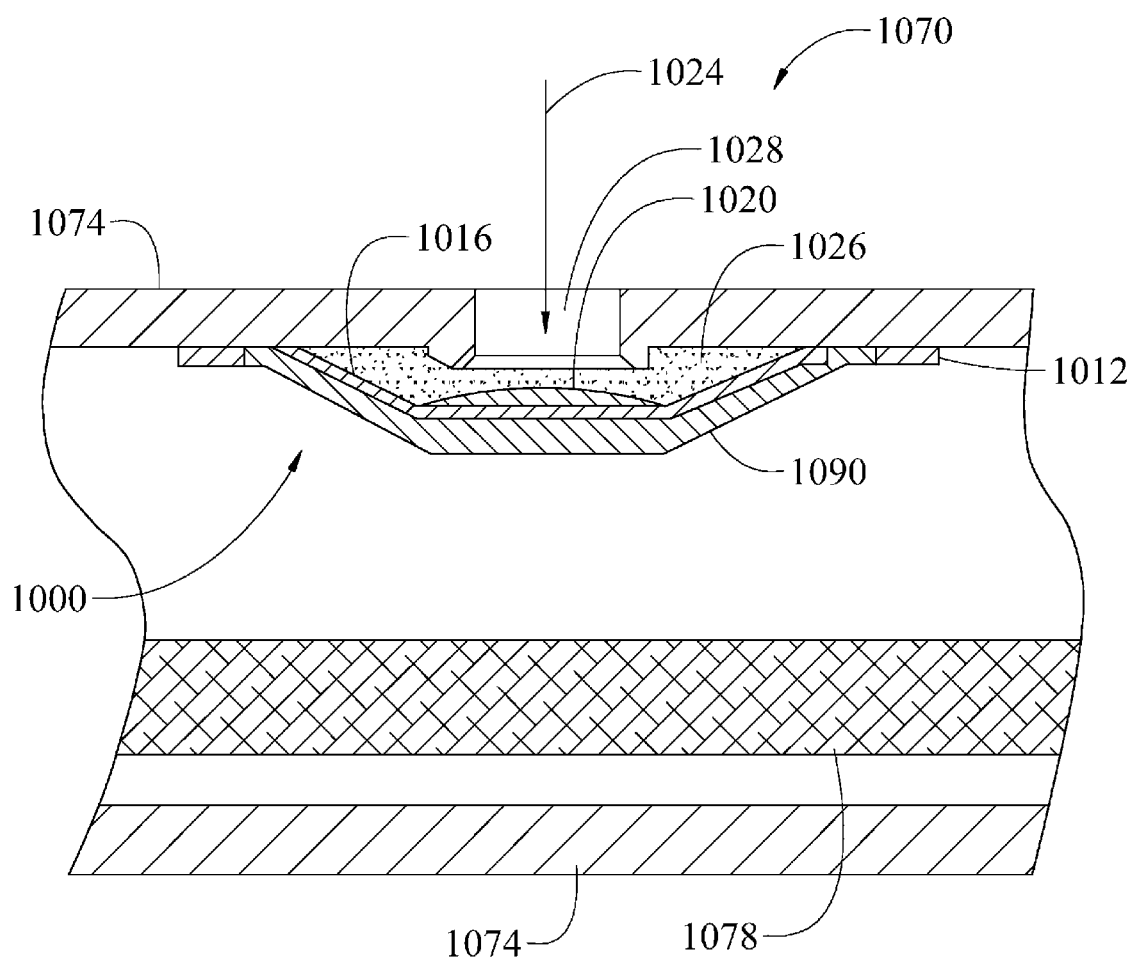
FIG. 20A is a cross-sectional view of an exemplary environment in which a combination filter valve apparatus (shown in an open position) can be used as a bypass valve having filtration media wherein an elastomeric valve-return feature is used for resiliently biasing the valve towards a closed position according to exemplary embodiments.
Figure 20B:
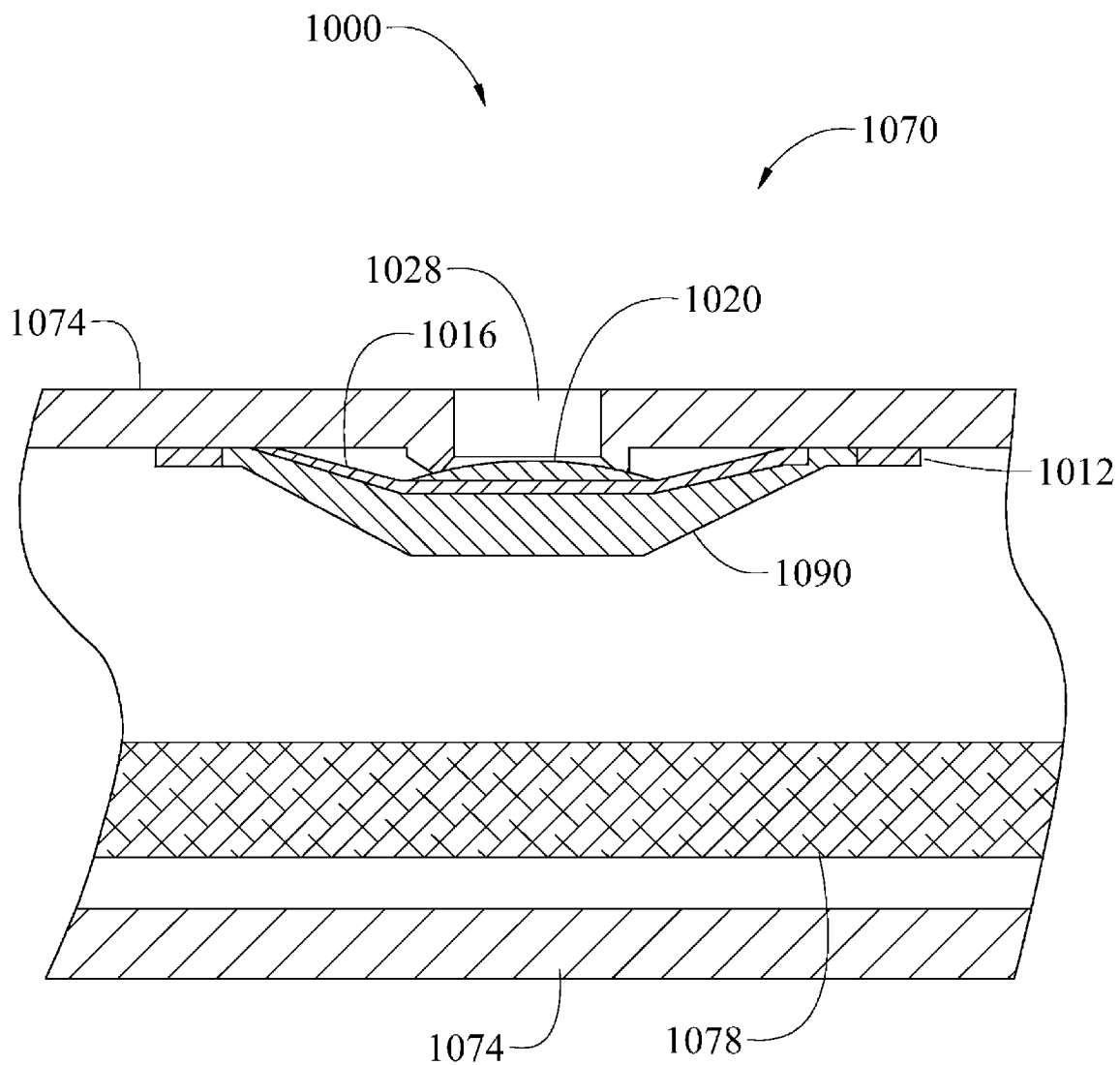
FIG. 20B is another cross-sectional view of the exemplary environment shown in FIG. 20A but now illustrating the combination filter valve apparatus in a closed position.

FIGS. 20A and 20B illustrate another exemplary environment in which can be used a combination filter valve apparatus 1000 embodying one or more aspects of the present disclosure. In this example, the combination filter valve apparatus 1000 is being used as a bypass valve for an automatic transmission suction filter system 1070. This particular embodiment does not include a spring for applying a biasing force to urge the combination filter valve apparatus 1000 towards a normally closed position (FIG. 20B). Instead, the combination filter valve apparatus 1000 includes a biasing member 1090 for resiliently biasing the sealing member 1020 into sealing engagement with the opening 1028 of the housing 1074. Alternatively, the combination filter valve apparatus 1000 can be configured such that it is in a normally closed position without application of an external biasing force. By way of example, the outer member 1012 and/or filtration media 1016 can be configured (e.g., shaped, sized, formed of materials, etc.) such they resiliently bias the sealing member 1020 into sealing engagement with the opening 1028.

As shown in FIG. 20A, the combination filter valve apparatus 1000 will open under high vacuum pressure, for example, during a cold start or a blocked filter. The speckles 1026 in FIG. 20A generally represent that the filtration media 1016 is substantially solid in this embodiment. When the combination filter valve apparatus 1000 is in the opened position, fluid (as represented by arrow 1024) may then enter the housing 1074 via the opening 1028 and then by passing through the filtration media 1016.

An exemplary operation of the transmission suction filter system 1070 will now be provided for purposes of illustration only, and not for purposes of limitation. When the engine is first started, the transmission fluid will be relatively cold such that a relatively high vacuum pressure is needed to pull the cold transmission fluid through the main filter 1078. In this particular example, the filtration media 1016 preferably has a larger pore size than the transmission filtration media 1078. For example, the filtration media 1016 can be configured to allow transmission fluid to pass therethrough with an available pressure less than about negative fifteen PSIG. As shown in FIG. 20B, the combination filter valve apparatus 1000 has a normally closed position due to the biasing force applied by the biasing member 1090. The sealing member 1020, however, will be forced to move out of sealing engagement with the opening 1028 under a vacuum pressure that is high enough to overcome the biasing force applied by biasing member 1090. With the combination filter valve apparatus 1000 opened, transmission fluid will flow through the opening 1028 into the housing 1074 (as represented by arrows 1024 in FIG. 20A). But the vacuum pressure or pressure drop will decrease as the transmission fluid heats up, such that eventually the biasing force applied by the biasing member 1090 will cause the sealing member 1020 to move back into sealing engagement with the opening 1028. At which point, the sealing member 1020 will prevent (or at least inhibit) transmission fluid from entering the housing 1074 via the opening 1028.

Figure 21:
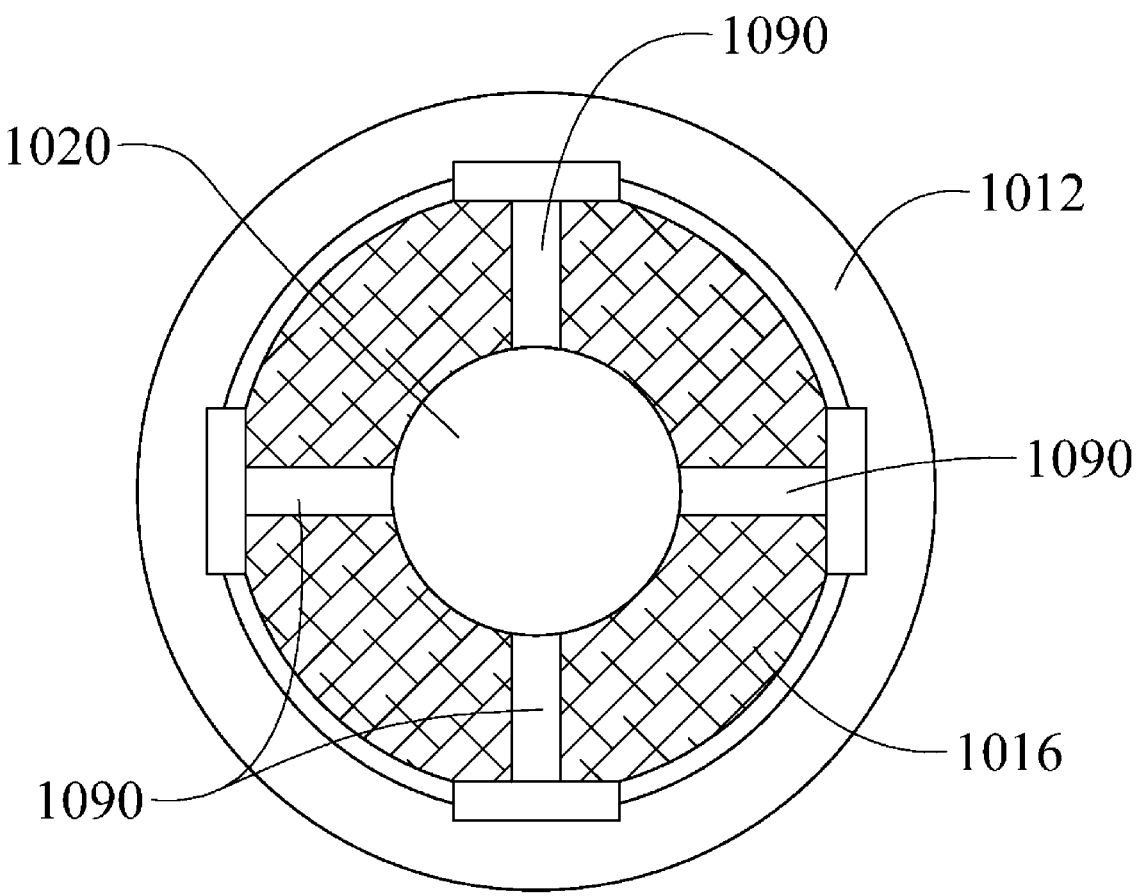
FIG. 21 is a plan view of an exemplary configuration for the combination filter valve apparatus shown in FIGS. 20A and 20B according to exemplary embodiments.

FIG. 21 illustrates an exemplary configuration for the combination filter valve apparatus 1000 according to exemplary embodiments. As shown, the combination filter valve apparatus 1000 generally includes an outer member 1012, filtration media 1016, and an inner valve or sealing member 1020. In this exemplary embodiment, the combination filter valve apparatus 1000 also includes the biasing member or ribs 1090 extending generally across the apparatus 1000. As noted above, the biasing member 1090 is configured for resiliently biasing the sealing member 1020 into sealing engagement with the housing's opening 1028.

A wide range of materials and manufacturing methods can be used for components of the combination filter valve apparatus 1000. For example, various embodiments include the outer member 1012, sealing member 1020, and biasing member 1090 being formed from one or more fuel-tolerant or fuel-resistant materials and/or relatively soft or resilient materials, such as plastic, thermoplastic elastomer, silicone, etc.

Figure 22A:
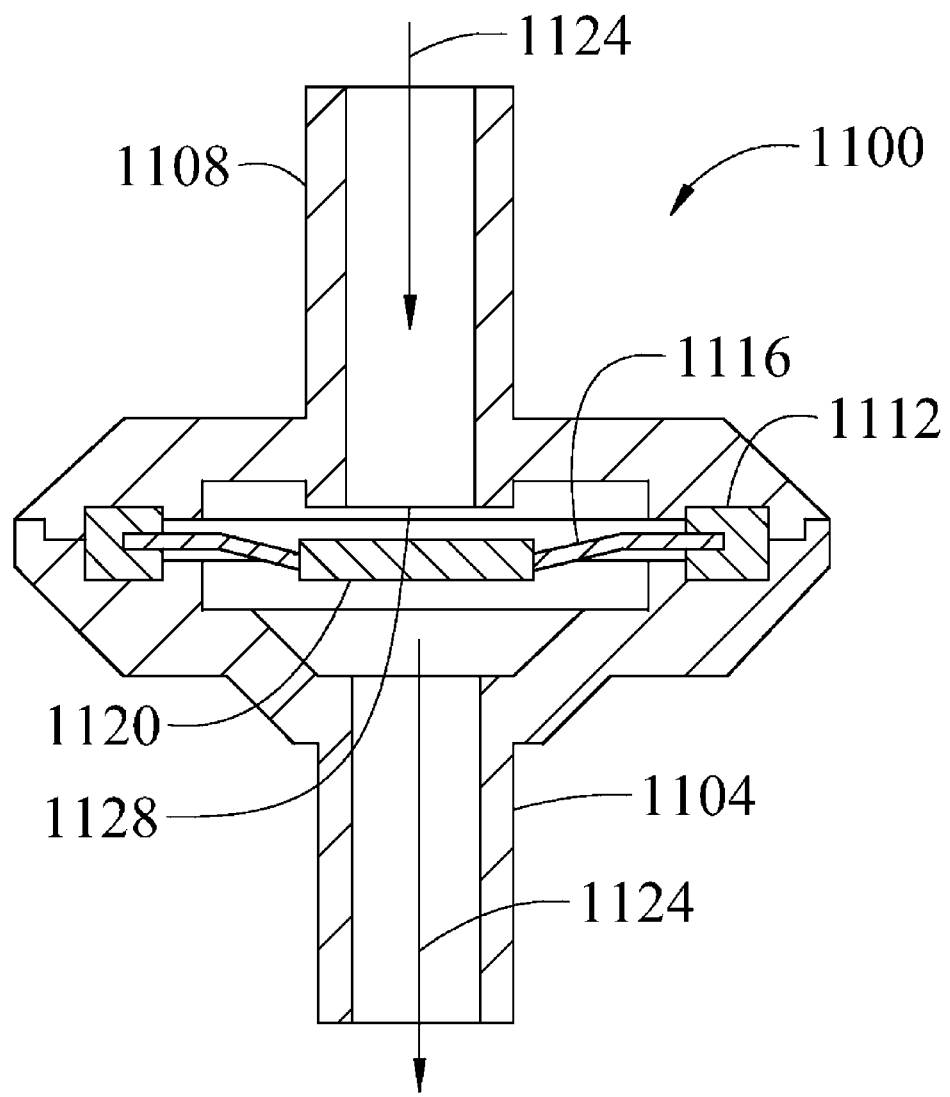
FIG. 22A is a cross-sectional view of an exemplary environment in which a high-flow one-way valve apparatus (shown in an open position) is disposed between two fluid passages or conduits according to exemplary embodiments.
Figure 22B:
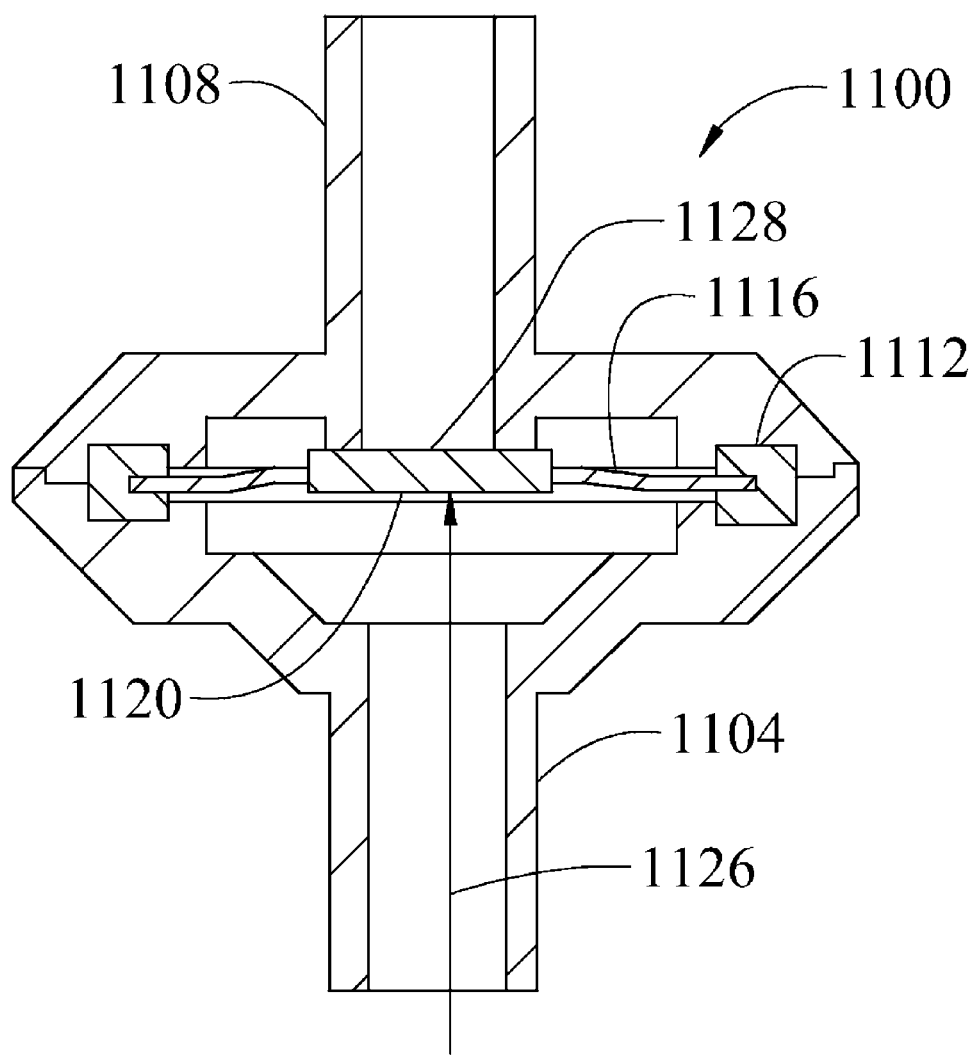
FIG. 22B is another cross-sectional view of the high-flow one-way valve apparatus shown in FIG. 22A but now illustrating the valve apparatus in a closed position.

FIGS. 22A and 22B illustrate an exemplary environment in which can be used a high-flow one-way valve apparatus 1100 embodying one or more aspects of the present disclosure. As shown in FIGS. 22A and 22B, the valve apparatus 1100 generally includes an outer member 1112 and a sealing member 1120. The valve apparatus 1100 also includes a portion 1116 (e.g., membrane portion or filtration media, etc.) disposed generally between the outer member 1112 and the sealing member 1120. The valve apparatus 1100 is shown in FIGS. 22A and 22B generally between two fluid conduits or passages 1104 and 1108. In this particular example, the valve apparatus 1100 is operable as a high-flow one-way valve.

In FIG. 22A, the valve apparatus 1100 is shown in a normally open position that allows fluid flow (as generally represented by arrows 1124) from one conduit 1108 to the other conduit 1104. FIG. 22B illustrates the valve apparatus 1100 in a closed position that prevents (or at least inhibits) fluids (e.g., air, gases, liquids, etc.) from passing from the conduit 1108 to the conduit 1104. By way of example, the valve apparatus 1100 may shut off or close automatically without manual user intervention when a back flow creates sufficient pressure (as generally represented by arrow 1126 in FIG. 22B) for causing the sealing member 1120 to move into sealing engagement with the opening 1128 into the conduit 1108. In various embodiments, the membrane portion 1116 and the fluid flow openings 1117 (FIG. 23) can be configured (e.g., sized, shaped, formed of certain materials, etc.) such that the valve apparatus 1100 moves to the closed position (FIG. 22B) when a predetermined pressure level has been reached. When the back pressure 1126 is removed, the sealing member 1120 may then return to its normally open position (FIG. 22A).

Figure 23:
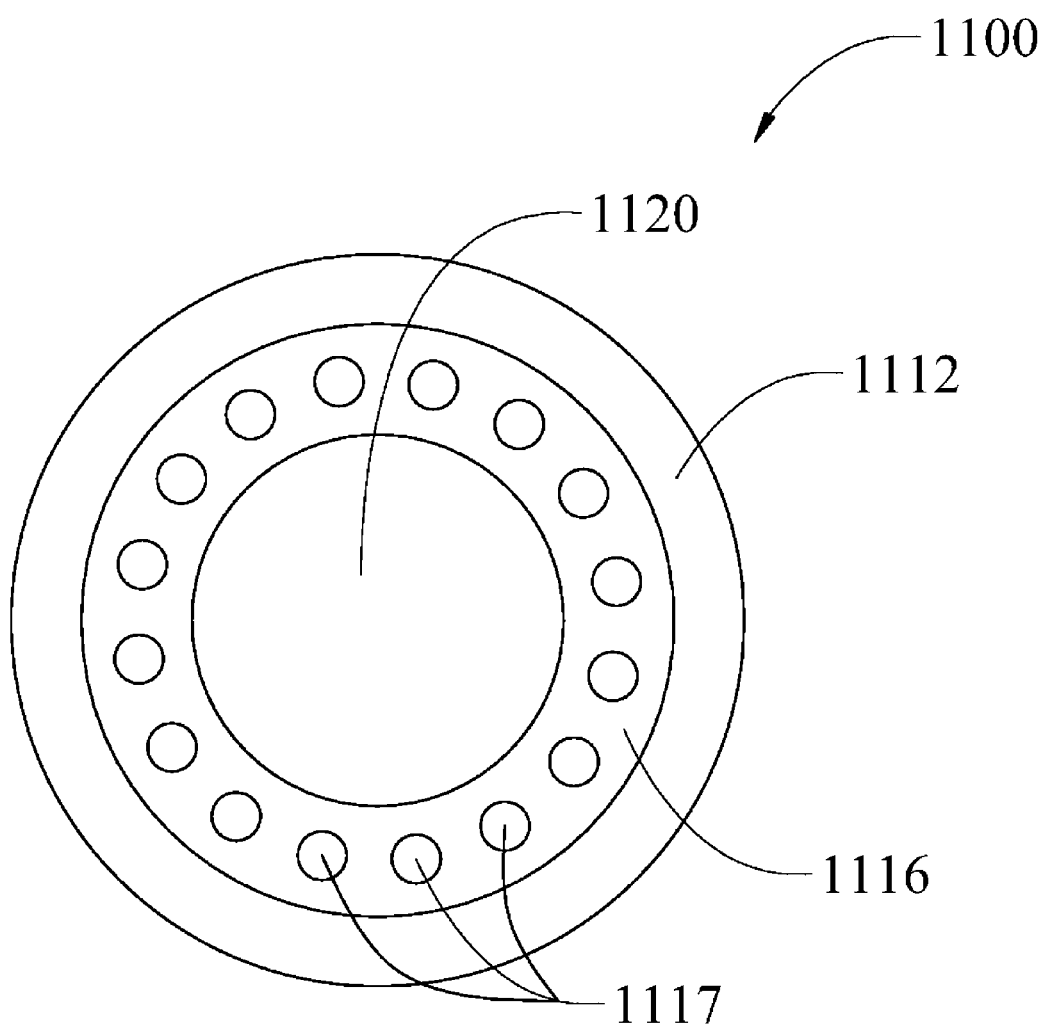
FIG. 23 is a plan view of an exemplary valve configuration and fluid flow openings thereof which can be used in the high-flow one-way valve apparatus shown in FIGS. 22A and 22B according to exemplary embodiments.

FIG. 23 illustrates an exemplary configuration for the valve apparatus 1100. As shown, the valve apparatus 1100 generally includes an outer member 1112, an intermediate portion 1116 having fluid flow openings 1117 therethrough, and a sealing member 1120. In this exemplary embodiment, the fluid flow openings 1117 can be configured (e.g., relatively coarse, large pore size, large openings, etc.) for relatively high flow conditions (e.g., high flow conditions suitable for blood flow, etc.). By way of example, the fluid flow openings 1117 may be drilled, punched, or otherwise formed in the valve apparatus 1100. As another example, the portions 1112, 1116, and 1120 can be integrally formed via a molding process. In such embodiments, structure may be provided within the mold cavity for forming the fluid flow openings 1117 during the molding process. Alternative manufacturing methods and configurations (e.g., shapes, sizes, materials, etc.) can also be used for making and/or forming the valve components.

Figure 24:
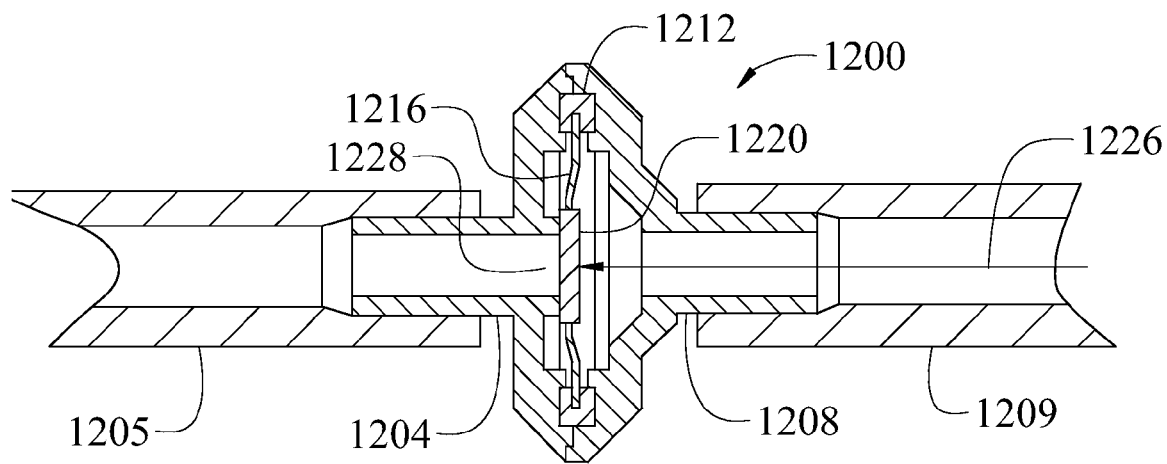
FIG. 24 is a cross-sectional view of another exemplary environment in which the exemplary valve configuration shown in FIG. 23 can be used as a high-flow control valve apparatus between two fluid passages or conduits and illustrating the valve apparatus in a closed position, for example, during a high flow condition according to exemplary embodiments.

FIG. 24 illustrates an exemplary environment in which can be used a valve apparatus 1200 embodying one or more aspects of the present disclosure. As shown in FIG. 24, the valve apparatus 1200 generally includes an outer member 1212 and a sealing member 1220. The valve apparatus 1200 also includes a portion 1216 (e.g., membrane portion or filtration media, etc.) disposed generally between the outer member 1212 and the sealing member 1220. The valve apparatus 1200 is shown in FIG. 24 generally between two fluid conduits or passages 1204 and 1208. In turn, the fluid conduits 1204 and 1208 are fluidically coupled in communication with conduits 1205 and 1209. In this particular example, the valve apparatus 1200 is operable as a high-flow control valve.

The valve apparatus 1200 is normally in an open position that allows fluid flow from one conduit 1208 to the other conduit 1204. See, for example, the open position of apparatus 700 shown in FIG. 16A. With continued reference to FIG. 24, the valve apparatus 1200 is shown in a closed position that prevents (or at least inhibits) fluids (e.g., air, gases, liquids, etc.) from passing from the conduit 1208 to the other conduit 1204. The valve apparatus 1200 may shut off or close automatically without manual user intervention when pressure (as generally represented by arrow 1226) causes the sealing member 1220 to move into sealing engagement with the opening 1228 into the conduit 1204. By way of example, this pressure may arise when openings through the membrane portion 1216 are blocked with contamination. Or, for example, the valve apparatus 1200 may shut off or close automatically without manual user intervention when the fluid flow rate becomes so high that the pressure 1226 therefrom causes the sealing member 1220 to move into sealing engagement with the opening 1228 into the conduit 1204. When the pressure 1226 is removed (e.g., by unclogging or cleaning the openings through the membrane portion filtration media 1216, by reducing fluid flow rate, etc.), the sealing member 1220 may return to its normally open position.

A wide range of materials, manufacturing methods, and configurations (e.g., shapes, sizes, etc.) can be used for any one or more of the components of the apparatus 1200. In various embodiments, the membrane portion 1216 and the fluid flow openings therethrough can be configured (e.g., sized, shaped, formed from certain materials, etc.) such that the valve apparatus 1200 moves to the closed position (FIG. 24) when a predetermined pressure level has been reached. In some embodiments, the membrane portion 1216 may include fluid flow openings similar to the openings 1116 shown in FIG. 23. In such embodiments, the openings through the membrane portion 1216 may be configured (e.g., relatively coarse, large pore size, large openings, etc.) for high flow conditions (e.g., high flow conditions suitable for blood flow, etc.). In various embodiments of the valve apparatus 1200, the portions 1212, 1216, and 1220 can be integrally formed via a molding process. In such embodiments, structure may be provided within the mold cavity for forming the fluid flow openings during the molding process. As further examples, the fluid flow openings can be drilled, punched, or otherwise formed in the membrane portion 1216 after the molding process has been completed. Alternative manufacturing methods and configurations (e.g., shapes, sizes, materials, etc.) can also be used for making and/or forming any one or more of the components of the apparatus 1200.

Figure 25:
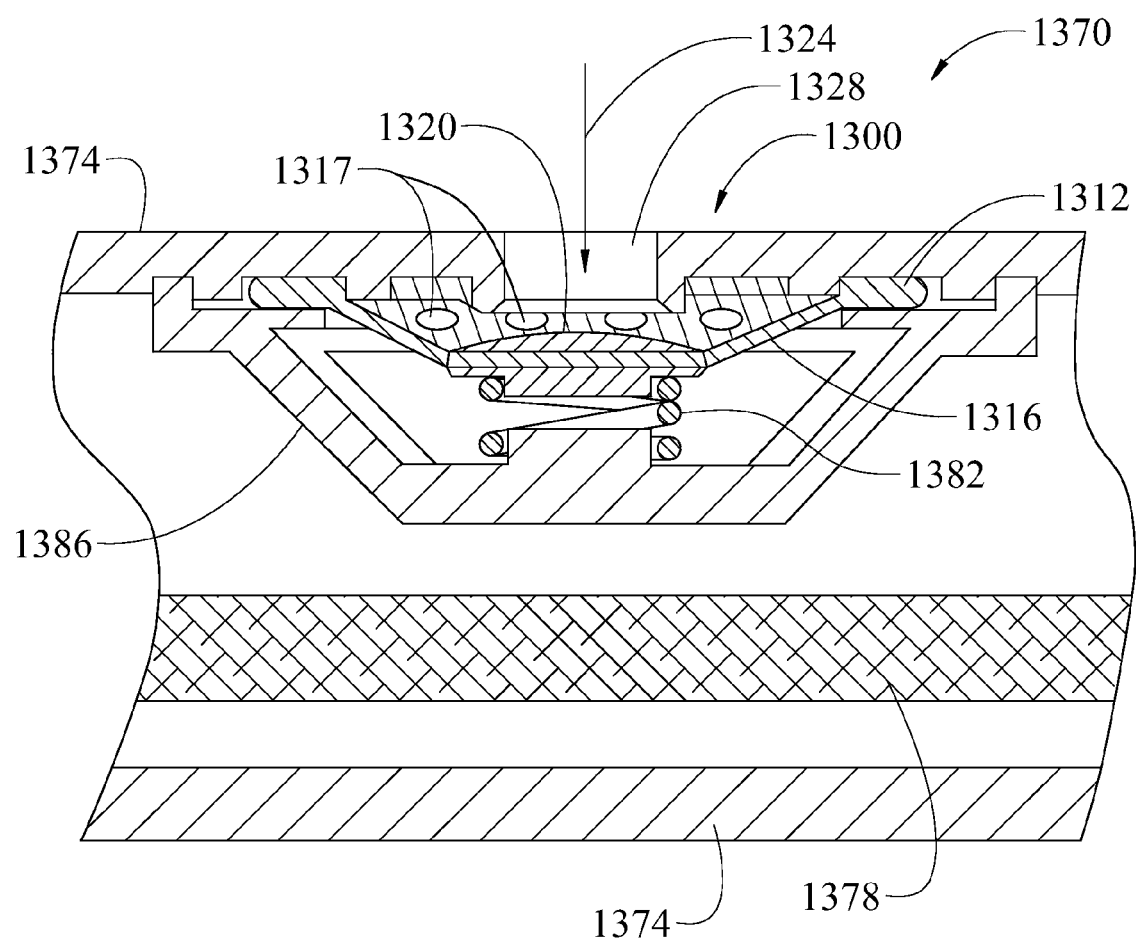
FIG. 25 is a cross-sectional view of an exemplary environment in which can be used a spring-biased bypass valve apparatus including a molded filter valve feature and a spring for resiliently biasing the valve apparatus towards a closed position according to exemplary embodiments.

FIG. 25 illustrates an exemplary environment in which can be used a spring-biased bypass valve apparatus 1300 embodying one or more aspects of the present disclosure. As shown in FIG. 25, the apparatus 1300 generally includes an outer member 1312, an intermediate portion 1316 with fluid flow openings 1317 therethrough, and a sealing member 1320. In this example, the apparatus 1300 is being used as a bypass valve, which may find use in the automotive industry, among other possible industries.

FIG. 25 illustrates an automatic transmission suction filter system 1370 in which the apparatus 1300 is installed for operation as a bypass valve. The automatic transmission suction filter system 1370 generally includes a filter housing 1374 and transmission filtration media 1378. Also shown are a biasing device 1382 (e.g., coil spring, etc.) for applying a force for biasing the valve apparatus 1300 towards a normally closed position. See, for example, the closed position for apparatus 900 shown in FIG. 19B.

With further reference to FIG. 25, the biasing device 1382 is supported by structure 1386. The valve apparatus 1300 will open under high vacuum pressure, for example, during a cold start or a blocked filter. When the valve apparatus 1300 is in the opened position, fluid may enter the housing 1374 via the opening 1328 as represented by arrows 1324.

An exemplary operation of the transmission suction filter system 1370 will now be provided for purposes of illustration only, and not for purposes of limitation. When the engine is first started, the transmission fluid will be relatively cold such that a relatively high vacuum pressure is needed to pull the cold transmission fluid through the main filter 1378. In this particular example, the membrane portion 1316 preferably has fluid flow openings 1317 larger than the pore size of the transmission filtration media 1378. The relatively large fluid flow openings 1317 in the membrane portion 1316 can be configured for restricting flow and for opening during high flow conditions. The larger openings 1317 can also help prevent (or at least inhibit) contaminate blockage as compared to much smaller openings.

The valve apparatus 1300 has a normally closed position due to the biasing force applied by the spring 1382. See, for example, the closed position for apparatus 900 shown in FIG. 19B. As shown in FIG. 25, the sealing member 1320 will move out of sealing engagement with the opening 1328 under a vacuum pressure that is high enough to overcome the biasing force applied by the spring 1382. With the valve apparatus 1300 opened, transmission fluid will flow through the opening 1328 into the housing 1374 and then through the openings 1317 of the membrane portion 1316 (as represented by arrows 1324 in FIG. 25). But the vacuum pressure or pressure drop will decrease as the transmission fluid heats up, such that eventually the biasing force applied by the spring 1382 will cause the sealing member 1320 to move back into sealing engagement with the opening 1328. At which point, the sealing member 1320 will prevent (or at least inhibit) transmission fluid from entering the housing 1374 via the opening 1328.

A wide range of materials, manufacturing methods, and configurations (e.g., shapes, sizes, etc.) can be used for any one or more of the components of the apparatus 1300. Exemplary materials include fuel-tolerant or fuel-resistant materials and/or relatively soft or resilient materials, such as plastic, thermoplastic elastomer, silicone, etc. In various embodiments of the valve apparatus 1300, the portions 1312, 1316, and 1320 can be integrally formed via a molding process. In such embodiments, structure may be provided within the mold cavity for forming the fluid flow openings 1317 during the molding process. As further examples, the fluid flow openings 1317 can be drilled, punched, or otherwise formed in the membrane portion 1316 after the molding process has been completed. Alternatively, other manufacturing methods and configurations (e.g., shapes, sizes, materials, etc.) can be used for making and/or forming any one or more of the components of the apparatus 1300.

Figure 26:
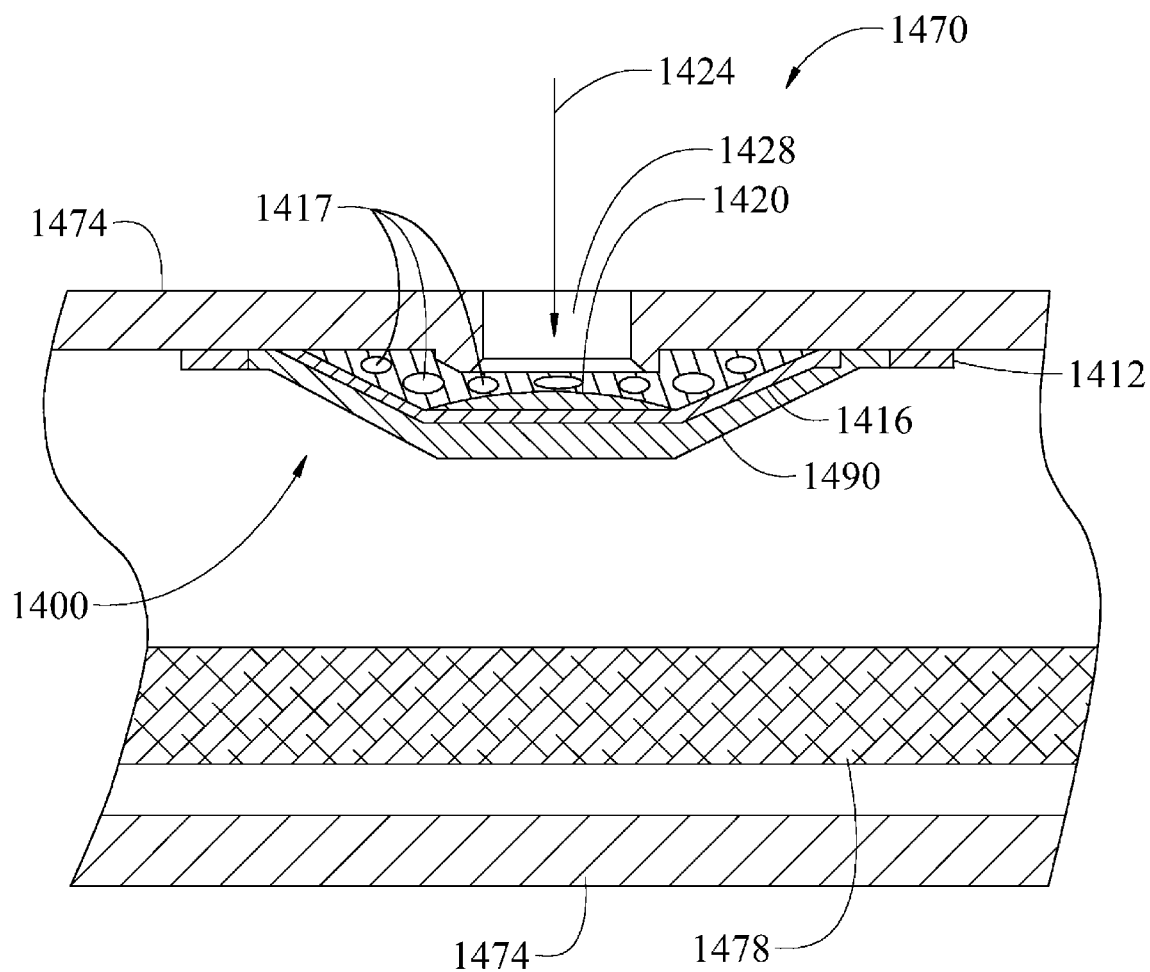
FIG. 26 is a cross-sectional view of an exemplary environment in which can be used a bypass valve apparatus including a molded filter valve feature and an elastomeric valve-return feature for resiliently biasing the valve apparatus towards a closed position according to exemplary embodiments.

FIG. 26 illustrates an exemplary environment in which can be used a bypass valve apparatus 1400 embodying one or more aspects of the present disclosure. As shown in FIG. 26, the apparatus 1400 generally includes an outer member 1412, an intermediate portion 1416 with fluid flow openings 1417 therethrough, and a sealing member 1420. In this example, the valve apparatus 1400 is being used as a bypass valve for an automatic transmission suction filter system 1470. This particular embodiment does not include a coil spring for applying a biasing force to move the valve apparatus 1400 towards a normally closed position. Instead, the apparatus 1400 includes a biasing member 1490 for resiliently biasing the sealing member 1420 into sealing engagement with the opening 1428 of the housing 1474. See, for example, the closed position for apparatus 1000 shown in FIG. 20B. Alternatively, the valve apparatus 1400 can be configured such that it is in a normally closed position without application of an external biasing force.

An exemplary operation of the transmission suction filter system 1470 will now be provided for purposes of illustration only, and not for purposes of limitation. When the engine is first started, the transmission fluid will be relatively cold such that a relatively high vacuum pressure is needed to pull the cold transmission fluid through the main filter 1478. In this particular example, the membrane portion 1416 preferably has fluid flow openings 1417 larger than the pore size of the transmission filtration media 1478. The relatively large fluid flow openings 1417 in the membrane portion 1416 can be configured for restricting flow to open during high flow conditions. The larger openings 1417 can also help prevent (or at least inhibit) contaminate blockage as compared to much smaller openings.

The valve apparatus 1400 has a normally closed position due to the biasing force applied by the biasing member 1490. See, for example, the closed position for apparatus 1000 shown in FIG. 20B.

As shown in FIG. 26, the sealing member 1420 will move out of sealing engagement with the opening 1428 under a vacuum pressure that is high enough to overcome the biasing force applied by the biasing member 1490. With the valve apparatus 1400 opened, transmission fluid will flow through the opening 1428 into the housing 1474 and then through the openings 1417 of the membrane portion 1416 (as represented by arrows 1424 in FIG. 26). But the vacuum pressure or pressure drop will decrease as the transmission fluid heats up, such that eventually the biasing force applied by the biasing member 1490 will cause the sealing member 1420 to move back into sealing engagement with the opening 1428. At which point, the sealing member 1420 will prevent (or at least inhibit) transmission fluid from entering the housing 1474 via the opening 1428.

Figure 27:
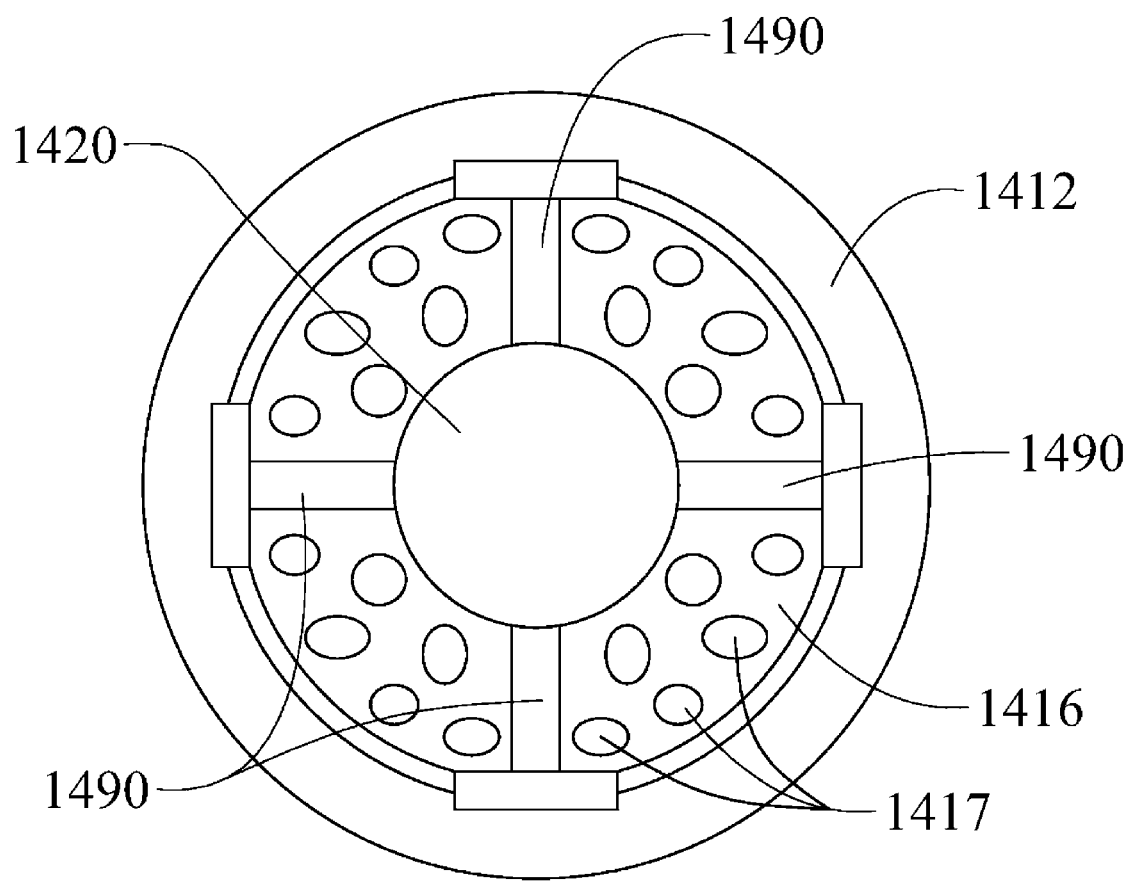
FIG. 27 is a plan view of an exemplary configuration for the molded filter valve feature shown in FIG. 26 according to exemplary embodiments.

FIG. 27 illustrates an exemplary configuration for the valve apparatus 1400. As shown, the valve apparatus 1400 generally includes an outer member 1412, intermediate portion 1416 with fluid flow openings 1417 therethrough, and a sealing member 1420. A biasing member or ribs 1490 extend generally across the apparatus 1400. The biasing member 1490 is configured for resiliently biasing the sealing member 1420 into sealing engagement with the housing's opening 1428.

A wide range of materials, manufacturing methods, and configurations (e.g., shapes, sizes, etc.) can be used for any one or more of the components of the apparatus 1400. Exemplary materials include fuel-tolerant or fuel-resistant materials and/or relatively soft or resilient materials, such as plastic, thermoplastic elastomer, silicone, etc. In various embodiments of the valve apparatus 1400, the portions 1412, 1416, 1420, and 1490 can be integrally formed via a molding process. In such embodiments, structure may be provided within the mold cavity for forming the fluid flow openings 1417 during the molding process. As further examples, the fluid flow openings 1417 can be drilled, punched, or otherwise formed in the membrane portion 1416 after the molding process has been completed. Alternative manufacturing methods and configurations (e.g., shapes, sizes, materials, etc.) can also be used for making and/or forming any one or more of the components of the apparatus 1400.

Figure 28:
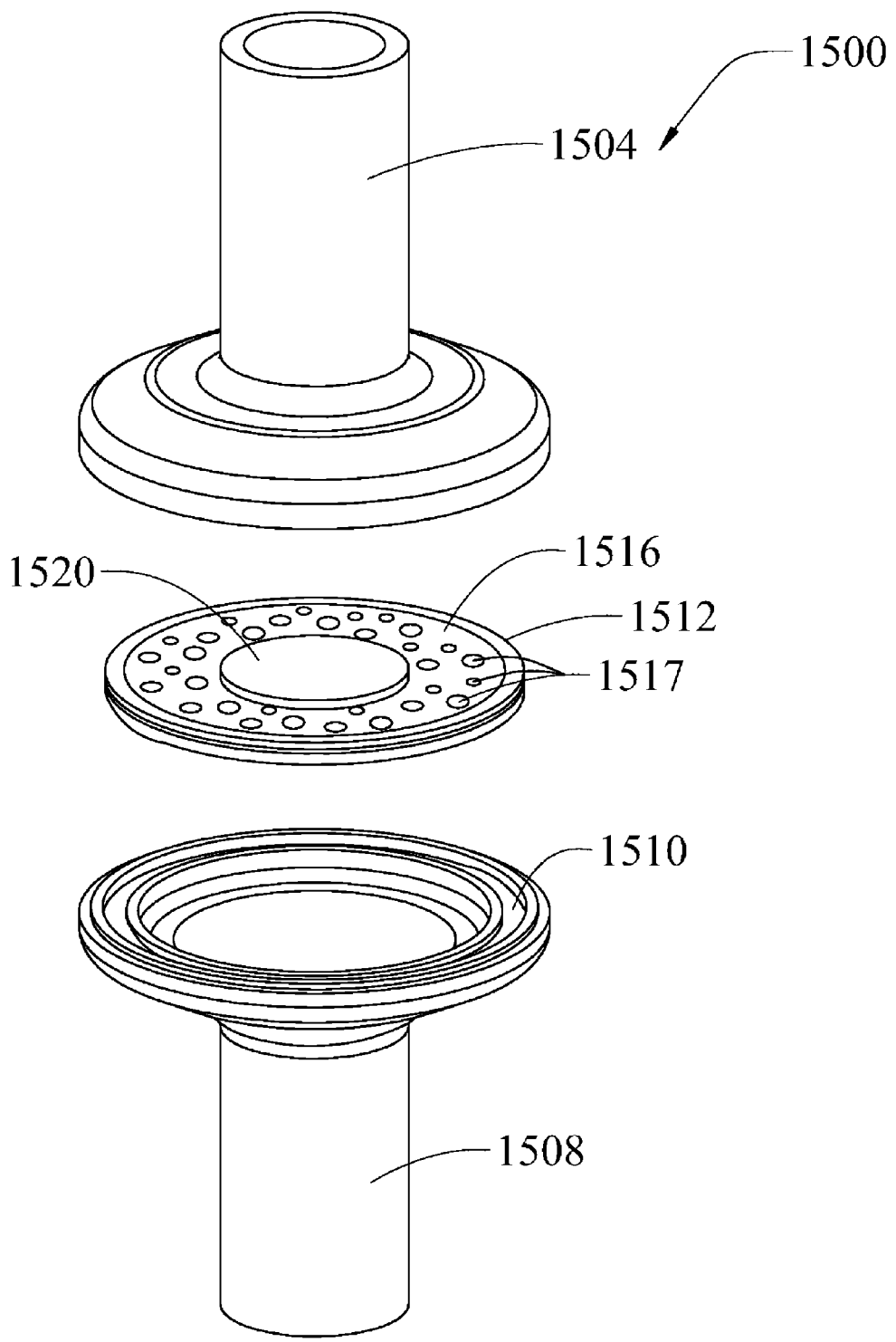
FIG. 28 is an exploded perspective view illustrating an exemplary environment in which a one-way filter valve apparatus can be used between fluid inlet/outlet ports, where the valve apparatus is configured to close and restrict flow, for example, during a backflow condition with high viscosity fluids according to exemplary embodiments.

FIG. 28 illustrates an exemplary environment for a one-way filter valve apparatus 1500 embodying one or more aspects of the present disclosure. The valve apparatus 1500 can be used between fluid inlet/outlet ports 1504 and 1508. The one-way filter valve apparatus 1500 can be configured with a normally open position, but which closes and restricts flow, for example, during a backflow condition with high viscosity fluids.

As shown in FIG. 28, the valve apparatus 1500 generally includes an outer member 1512, an intermediate portion 1516 having fluid flow openings 1517 therethrough, and a sealing member 1520. The sealing member 1520 is operable for sealing the opening 1528 of the fluid conduit 1508.

The intermediate portion 1516 extends generally between the outer member 1512 and the sealing member 1520. In various embodiments, the intermediate portion 1516 has sufficient rigidity for helping to maintain the relative positioning of the sealing member 1520 and outer member 1512. But the intermediate portion 1516 also has sufficient flexibility to allow the sealing member 1520 to move between the open and closed positions.

The outer member 1512 comprises a generally circular ring or annular member. Alternative embodiments, however, can include an outer member in other configurations, including rectangular and non-rectangular configurations (e.g., triangular, hexagonal, ovular, other polygonal shapes, etc.) depending, for example, on the particular environment in which the valve apparatus 1500 will be used.

The outer member 1512 is generally configured (e.g., shaped, sized, etc.) to be engagingly received in the grooves or pockets 1510 of the respective conduits 1504 and 1508. In various embodiments, the outer member 1512 and pockets 1510 are preferably configured to allow the outer member 1512 to act as a spring and allow the membrane portion 1516 (and sealing member 1520) to move relative to the outer member 1512.

When the outer member 1512 is engagingly received within the pockets 1510 and thus assembled between the conduits 1504 and 1508, a substantially fluid-tight seal is preferably formed at the interface between the outer member 1512 and conduits 1504, 1508. Accordingly, substantially sealing the interface in this exemplary manner can thus inhibit the egress of fluid out through the interface and also inhibits the ingress of foreign objects and debris in through the interface.

With continued reference to FIG. 28, the sealing member 1520 comprises a generally circular disc. Alternative embodiments, however, can include a sealing member in other configurations, including rectangular and non-rectangular configurations (e.g., triangular, hexagonal, ovular, other polygonal shapes, etc.) depending, for example, on the particular environment in which the combination filter valve apparatus 1500 will be used, and on the particular configuration (e.g., shape, size, etc.) of the opening to be sealed or closed by the sealing member 1520.

A wide range of materials, manufacturing methods, and configurations (e.g., shapes, sizes, etc.) can be used for any one or more of the components of the apparatus 1500. Exemplary materials include fuel-tolerant or fuel-resistant materials and/or relatively soft or resilient materials, such as plastic, thermoplastic elastomer, silicone, etc. The resiliency of the outer member 1512 can allow the member 1512 to act as a spring to allow the sealing member 1520 to move under pressure and return to its initial or normal position when the pressure is relieved. Additionally, in those embodiments in which the valve apparatus 1500 will be used with a fuel, the outer member 1512 is preferably formed from one or more materials that are fuel tolerant. Also the intermediate portion 1516 can be made of one or more materials that allow movement of the valve. The intermediate portion 1516 can be designed in a shape that will move essentially as a spring, but still also function as a fluid flow restrictor.

In various embodiments of the valve apparatus 1500, the portions 1512, 1516, and 1520 can be integrally formed via a molding process. In such embodiments, structure may be provided within the mold cavity for forming the fluid flow openings 1517 during the molding process. As further examples, the fluid flow openings 1517 can be drilled, punched, or otherwise formed in the membrane portion 1516 after the molding process has been completed. Alternative manufacturing methods and configurations (e.g., shapes, sizes, materials, two-shot molding, etc.) can also be used for making and/or forming any one or more of the components of the apparatus 1500.

Figure 29A:
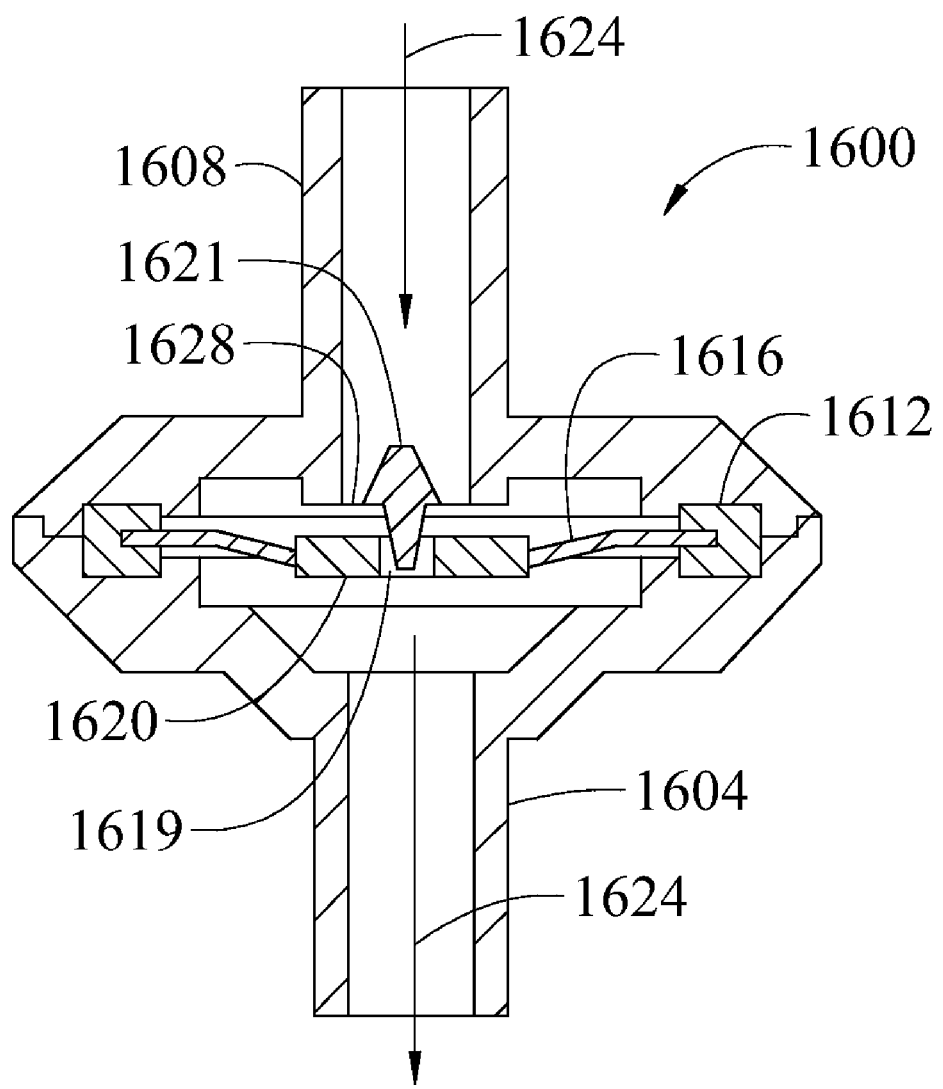
FIG. 29A is a cross-sectional view of an exemplary environment in which a bypass flow control valve apparatus (shown in an open position) is disposed between two fluid passages or conduits according to exemplary embodiments.
Figure 29B:
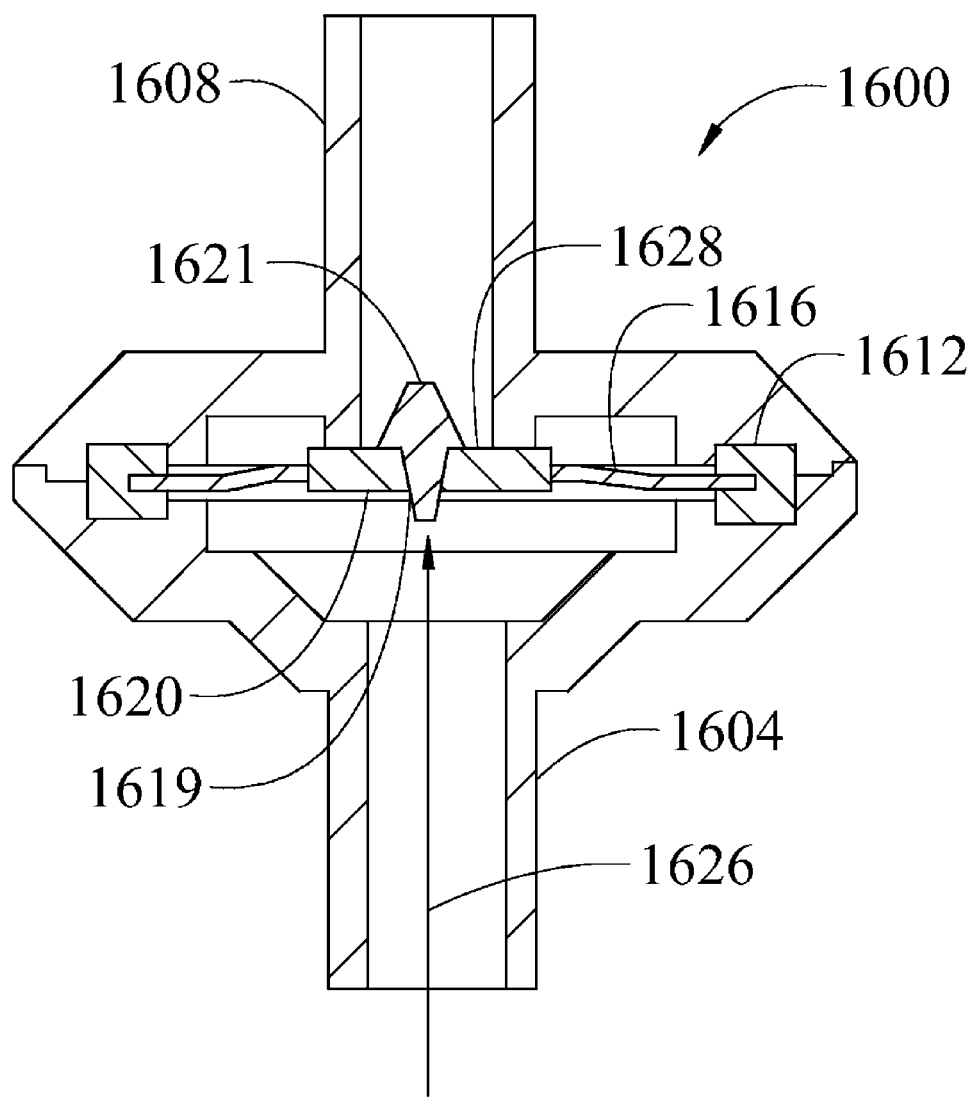
FIG. 29B is another cross-sectional view of the exemplary environment shown in FIG. 29A but now illustrating the valve apparatus in a closed position.

FIGS. 29A and 29B illustrate an exemplary environment for a bypass flow control valve apparatus 1600 embodying one or more aspects of the present disclosure. In FIG. 29A, the valve apparatus 1600 is shown in a normally open position that allows fluid flow (as generally represented by arrows 1624) from one conduit 1608 to the other conduit 1604. FIG. 29B illustrates the valve apparatus 1600 in a closed position. By way of example, the valve apparatus 1600 may shut off or close automatically without manual user intervention when a back flow creates a sufficient pressure (as generally represented by arrow 1626) for causing the sealing member 1620 to move into sealing engagement with the opening 1628 into the conduit 1608. When the pressure 1626 is removed, the sealing member 1620 may return to its normally open position as shown in FIG. 29A.

In this particular example, the valve apparatus 1600 also includes a bypass or relief valve feature comprising an opening 1619 through the sealing member 1620, and a plug or sealing member 1621. As shown in FIG. 29A, the opening 1619 can allow fluid flow from the conduit 1608 to the conduit 1604 when valve apparatus 1620 is open. But when the apparatus 1600 is closed, the sealing member or plug 1621 seals the opening 1619 as shown in FIG. 29B. By way of example, this opening 1619 can be opened when the filtration media 1616 is blocked with contamination and/or when relatively high differential pressures exist. Accordingly, the bypass valve feature (e.g., opening 1619 and plug 1621) can thus help ease the back flow pressure and/or help keep a relatively constant air/gas vapor flow rate.

Figure 30:
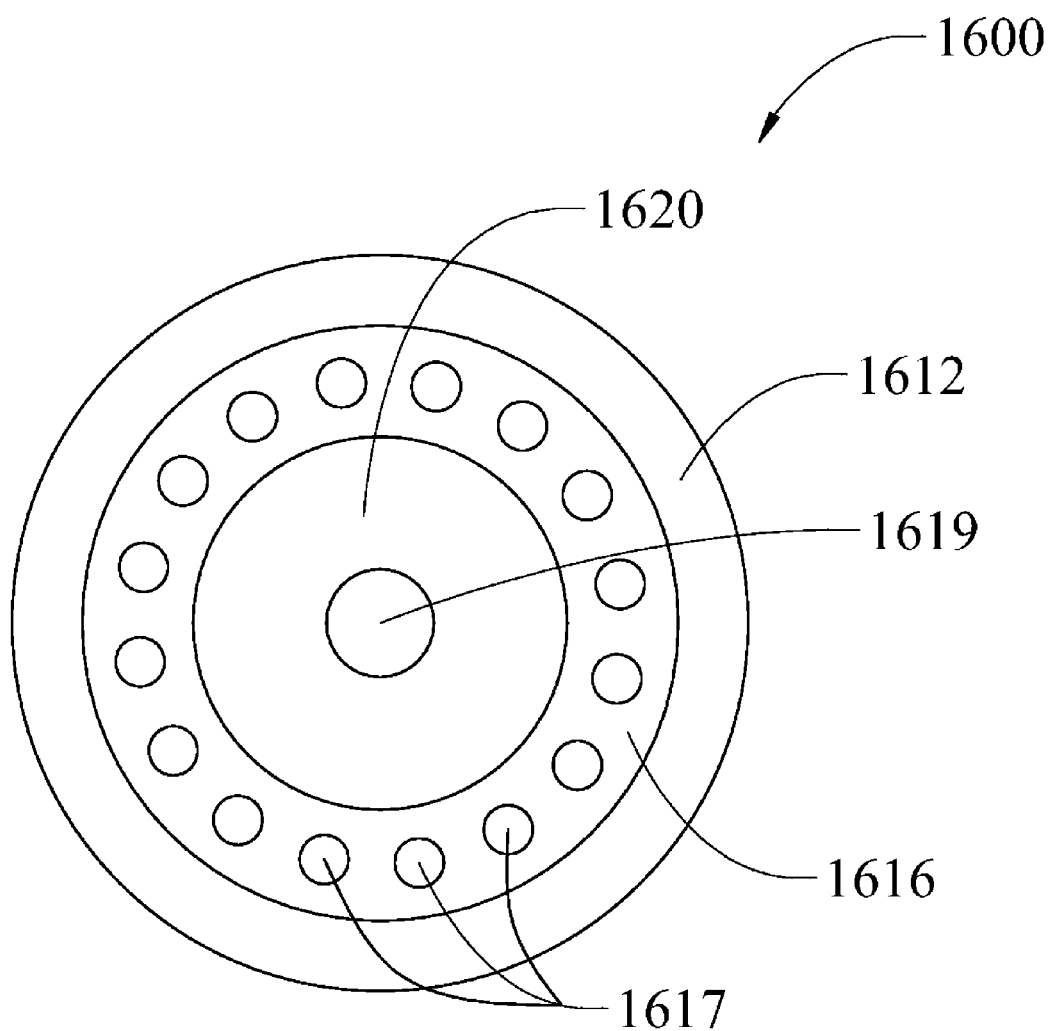
FIG. 30 is a plan view of an exemplary valve configuration and fluid flow openings thereof which can be used in the high-flow one-way valve apparatus shown in FIGS. 29A and 29B according to exemplary embodiments.

FIG. 30 illustrates an exemplary configuration for the valve apparatus 1600. As shown, the valve apparatus 1600 generally includes the outer member 1612, the intermediate portion 1616 having fluid flow openings 1617 therethrough, and the sealing member 1620 having the opening 1619 therethrough. A wide range of materials, manufacturing methods, and configurations (e.g., shapes, sizes, etc.) can be used for any one or more of the components of the apparatus 1600. Exemplary materials include fuel-tolerant or fuel-resistant materials and/or relatively soft or resilient materials, such as plastic, thermoplastic elastomer, silicone, etc. In various embodiments of the valve apparatus 1600, the portions 1612, 1616, and 1620 can be integrally formed via a molding process. In such embodiments, structure may be provided within the mold cavity for forming the fluid flow openings 1617 and opening 1619 during the molding process. As further examples, the fluid flow openings 1617 and/or the opening 1619 can be drilled, punched, or otherwise formed after the molding process has been completed. Alternative manufacturing methods and configurations (e.g., shapes, sizes, materials, two-shot molding, etc.) can also be used for making and/or forming any one or more of the components of the apparatus 1600.

Figure 31A:
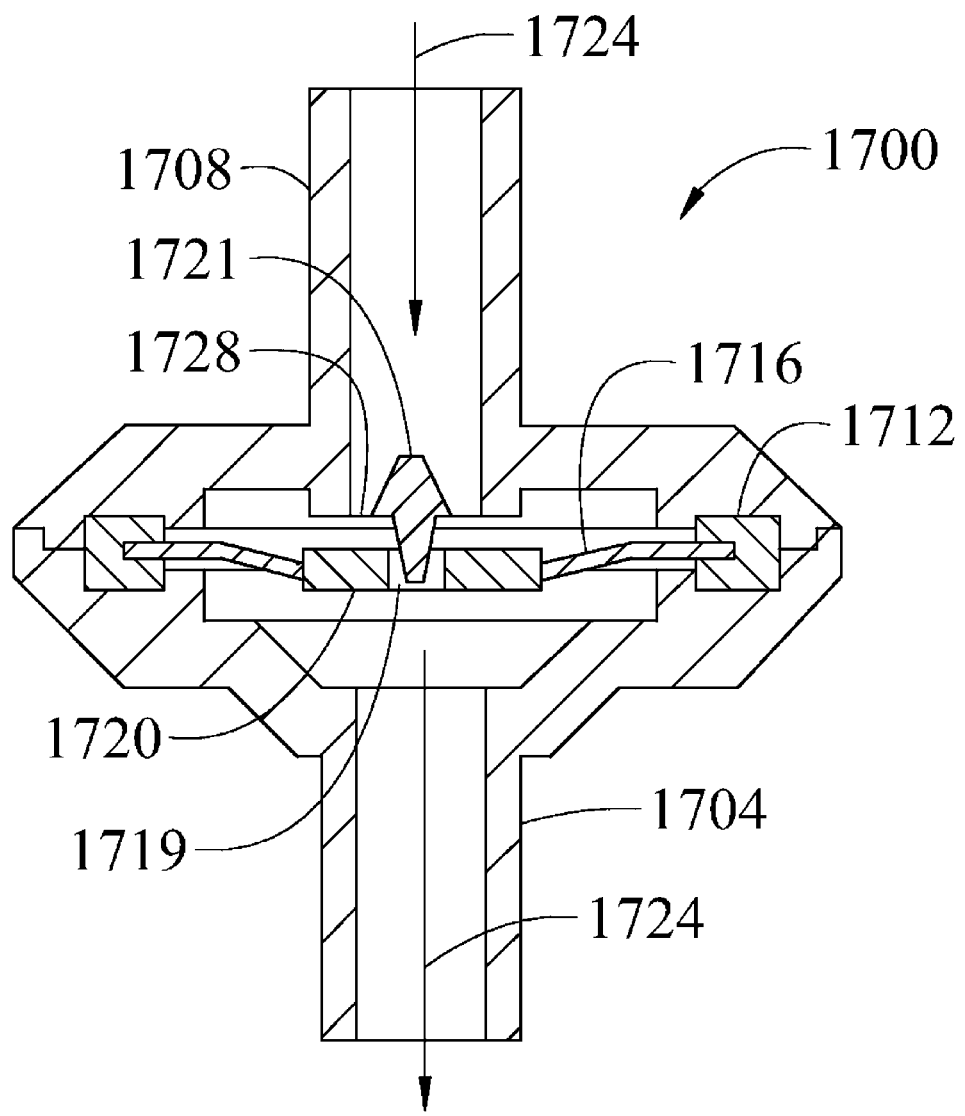
FIG. 31A is a cross-sectional view of an exemplary environment in which a combination filter valve apparatus (shown in an open position) can be used as a bypass control valve between two fluid passages or conduits according to exemplary embodiments.
Figure 31B:
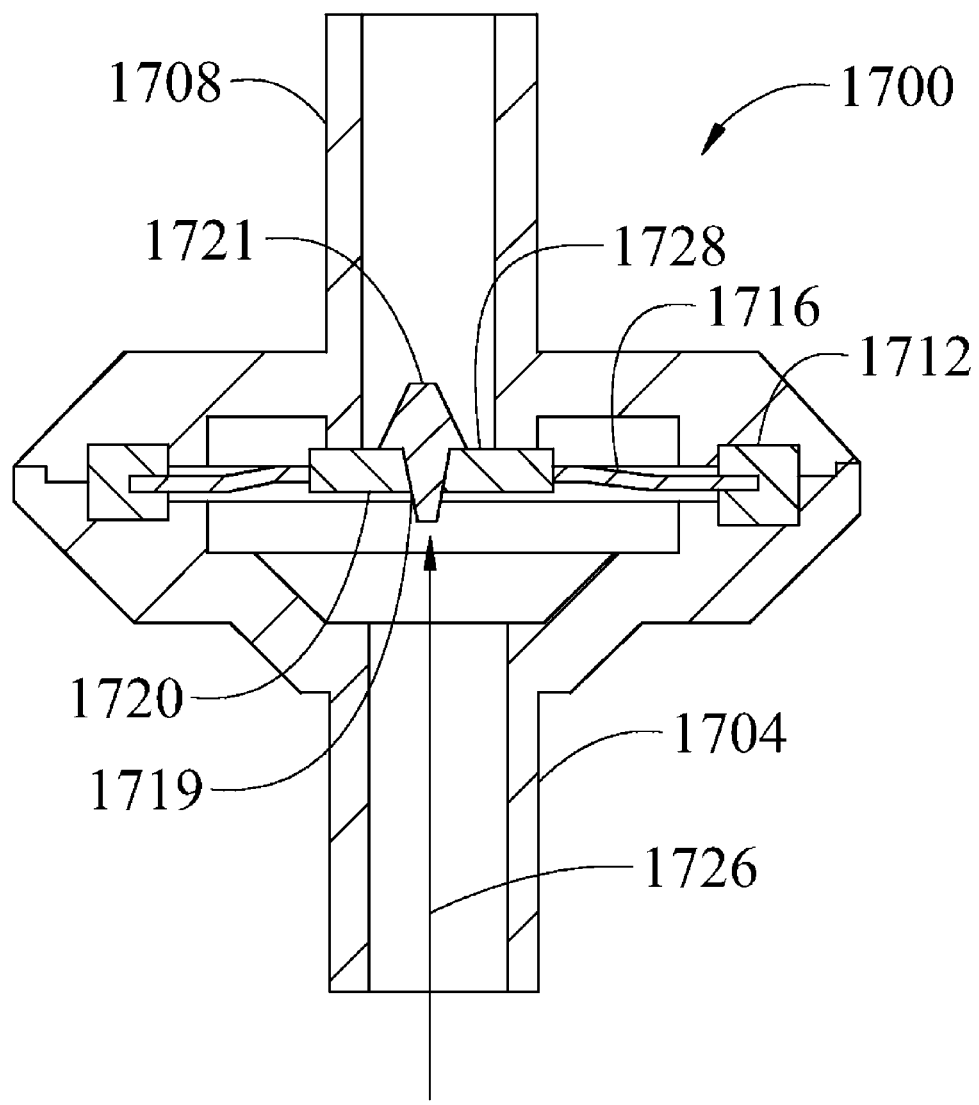
FIG. 31B is another cross-sectional view of the exemplary environment shown in FIG. 31A but now illustrating the valve apparatus in a closed position.

FIGS. 31A and 31B illustrate an exemplary environment for a bypass flow control valve apparatus 1700 embodying one or more aspects of the present disclosure. FIG. 31A shows the valve apparatus 1700 in a normally open position that allows fluid flow (as generally represented by arrows 1724) from one conduit 1708 to the other conduit 1704. FIG. 31B shows the valve apparatus 1700 in a closed position. By way of example, the valve apparatus 1700 may shut off or close automatically without manual user intervention when a back flow creates sufficient pressure (as generally represented by arrow 1726) for causing the sealing member 1720 to move into sealing engagement with the opening 1728 into the conduit 1708. When the pressure 1726 is removed, the sealing member 1720 may return to its normally open position as shown in FIG. 31A.

In this particular example, the valve apparatus 1700 also includes a bypass or relief valve feature comprising an opening 1719 through the sealing member 1720, and a plug or sealing member 1721. As shown in FIG. 31A, the opening 1719 can allow fluid flow from the conduit 1708 to the conduit 1704 when valve apparatus 1720 is open. But when the apparatus 1700 is closed, the sealing member or plug 1721 seals the opening 1719 as shown in FIG. 31B. By way of example, this opening 1719 can be opened when the filtration media 1716 is blocked with contamination and/or when there are relatively high differential pressures. Accordingly, the bypass valve feature (e.g., opening 1719 and plug 1721) can thus help ease the back flow pressure and/or help keep a relatively constant air/gas vapor flow rate.

Figure 32:
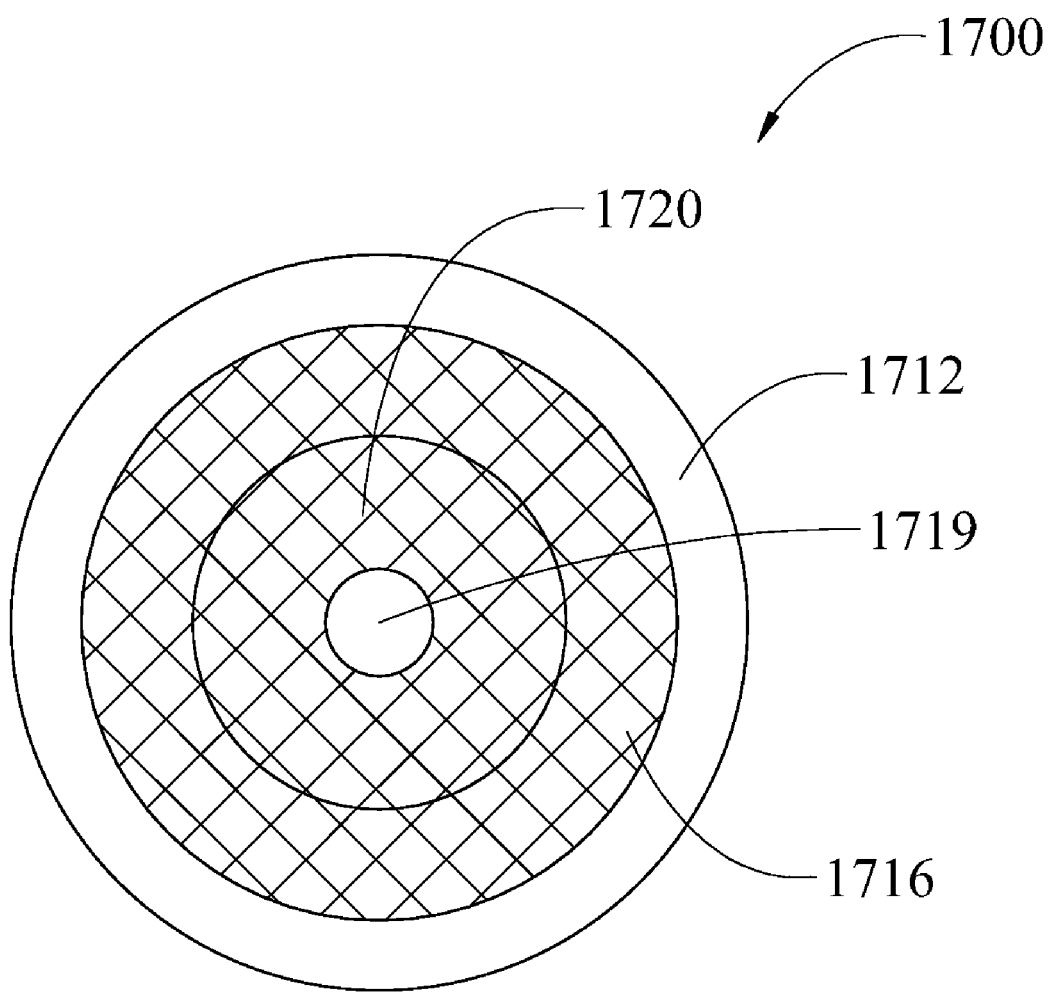
FIG. 32 is a plan view of an exemplary configuration for the combination filter valve apparatus shown in FIGS. 31A and 31B according to exemplary embodiments.

FIG. 32 illustrates an exemplary configuration for the valve apparatus 1700. As shown, the valve apparatus 1700 generally includes the outer member 1712, filtration media 1716, and the sealing member 1720 having the opening 1719 therethrough. A wide range of materials, manufacturing methods, and configurations (e.g., shapes, sizes, etc.) can be used for any one or more of the components of the apparatus 1700. Exemplary materials include fuel-tolerant or fuel-resistant materials and/or relatively soft or resilient materials, such as plastic, thermoplastic elastomer, silicone, etc. For example, various embodiments include the sealing member 1720 insert molded to a hydrophobic, hydrophilic, screen, and/or depth media filter membrane 1716. In various embodiments, the sealing member 1720 and the opening 1719 can be integrally formed via a molding process. In such embodiments, structure may be provided within the mold cavity for forming the opening 1719 during the molding process. Or, for example, the opening 1719 can be drilled, punched, or otherwise formed after the molding process has been completed. Alternative manufacturing methods and configurations (e.g., shapes, sizes, materials, two-shot molding, etc.) can also be used for making and/or forming any one or more of the components of the apparatus 1700.

Figure 33A:
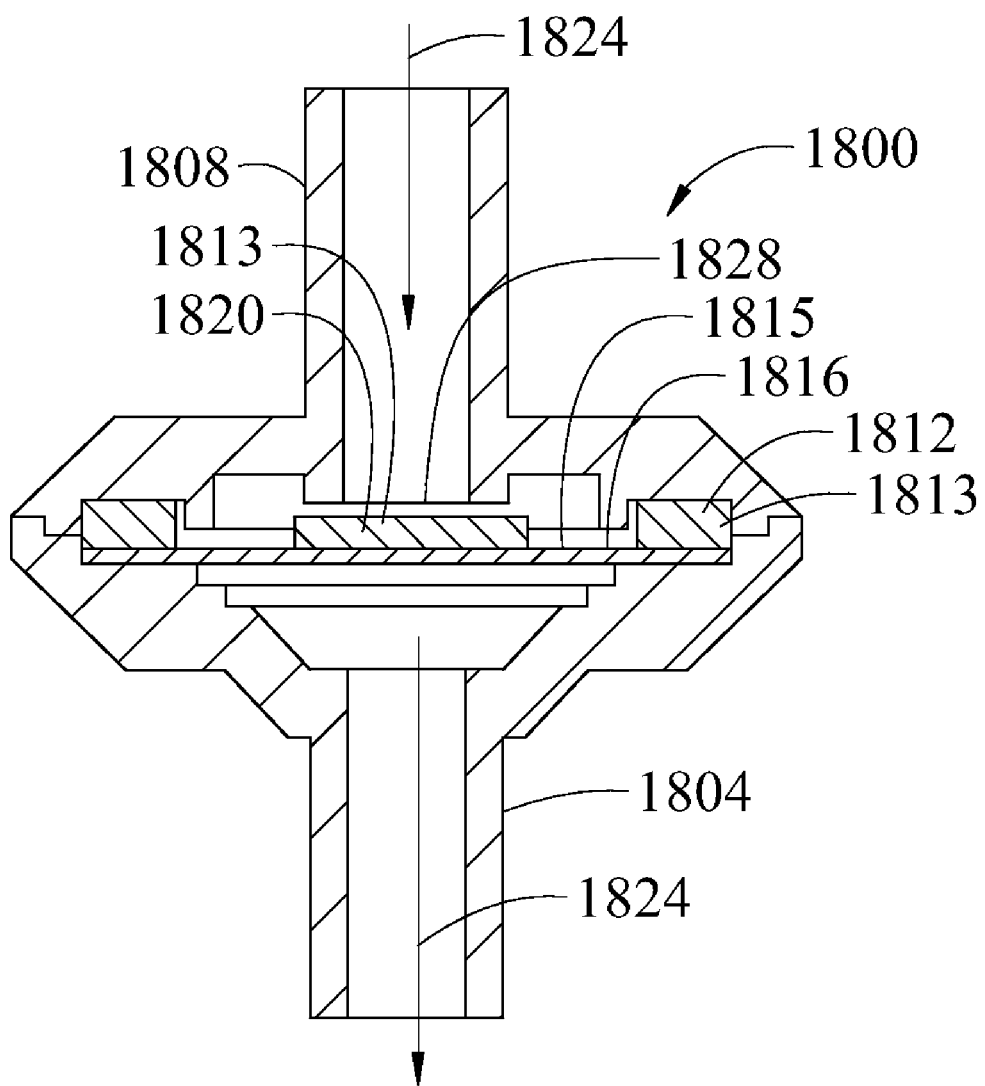
FIG. 33A is a cross-sectional view of an exemplary environment in which a two-piece filter valve apparatus (shown in an open position) can be used between two fluid passages or conduits according to exemplary embodiments.
Figure 33B:
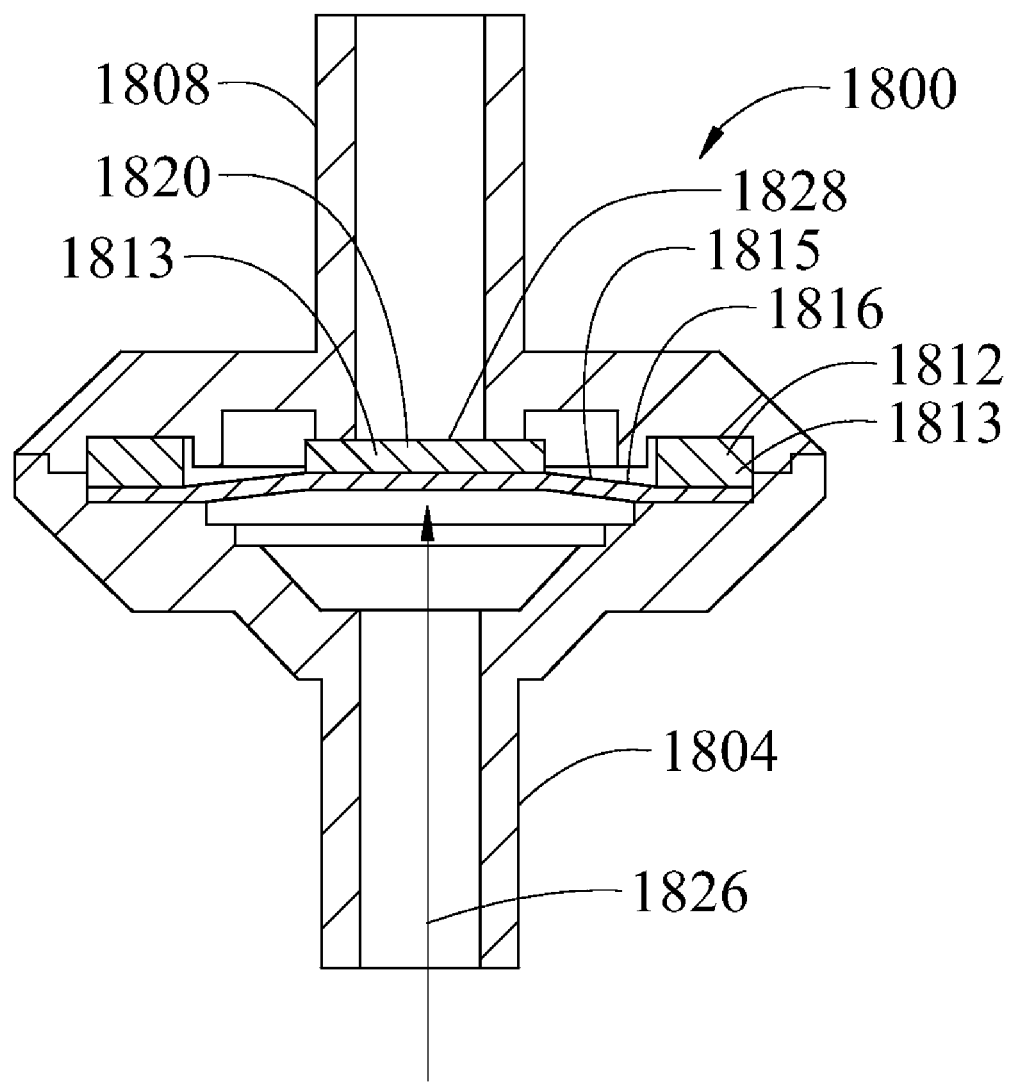
FIG. 33B is another cross-sectional view of the exemplary environment shown in FIG. 33A but now illustrating the two-piece filter valve apparatus in a closed position.
Figure 34:
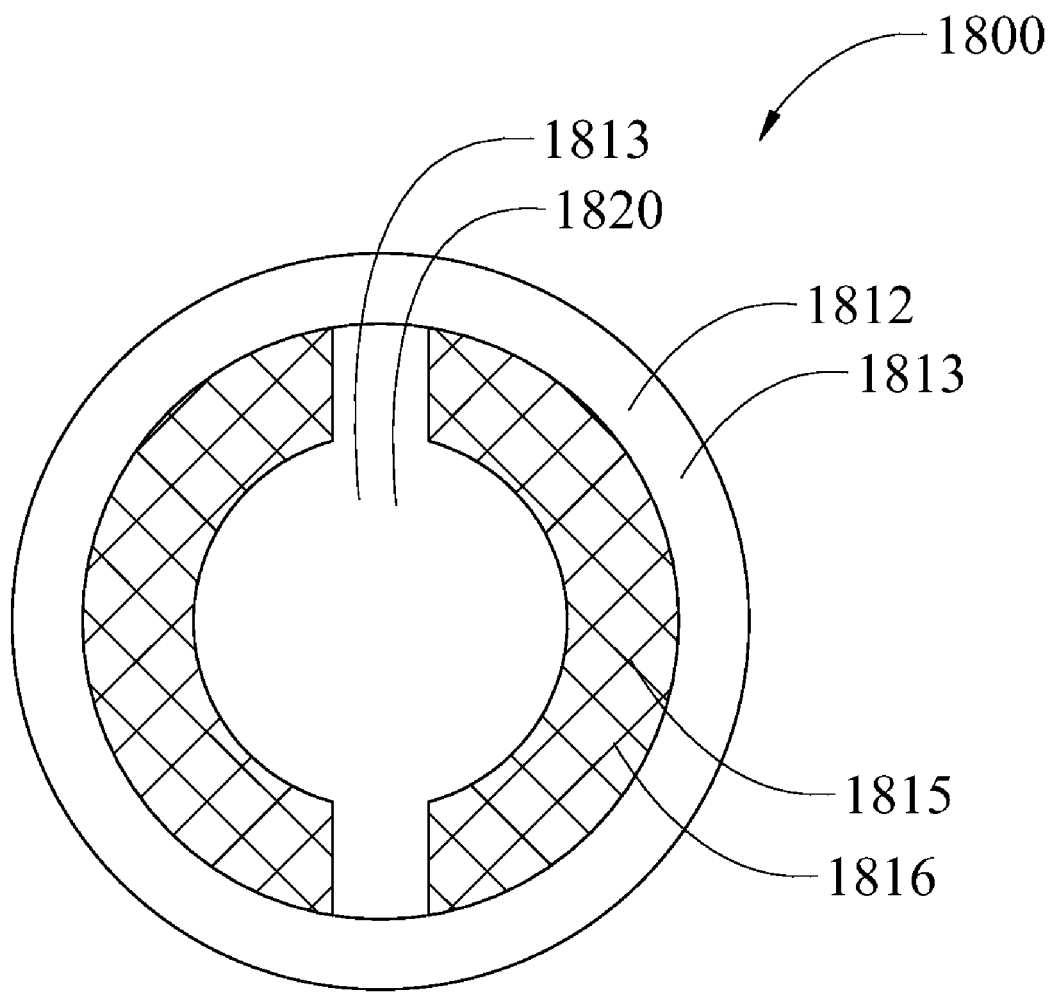
FIG. 34 is a plan view of an exemplary configuration for the two-piece filter valve apparatus shown in FIGS. 33A and 33B according to exemplary embodiments.

FIGS. 33A and 33B illustrate an exemplary environment in which can be used a two-piece filter valve apparatus 1800 embodying one or more aspects of the present disclosure. As shown in FIGS. 33 and 34, the two-piece filter valve apparatus 1800 generally includes first and second pieces 1813 and 1815. The first piece 1813 includes the outer member 1812 and the sealing member 1820. The second piece 1815 includes the filtration media 1816.

The first and second pieces 1813 and 1815 can be attached or coupled to one another in various ways. By way of example, casting or gluing may be used for attaching the filtration media 1816 to the outer member 1812 and to the sealing member 1820. By way of further example, RTV or silicone sealant may be used in some embodiments. Alternatively, any other suitable means (e.g., heat sealing, welding, mechanical fastening, adhesive bonding, chemical bonding, etc.) may also be employed for attaching the first and second pieces 1813, 1815 to one another for forming the two-piece filter valve apparatus 1800. In yet other embodiments, however, the two pieces 1813 and 1815 may be placed within the assembly as two separate components without any bonding (e.g., mechanical bonding, chemical bonding, gluing, adhesive bonding, etc.) of the two pieces 1813 and 1815 to each other.

As shown in FIGS. 33A and 33B, the two-piece filter valve apparatus 1800 may be positioned generally between two fluid conduits or passages 1804 and 1808. In this exemplary embodiment, the filtration media 1816 is configured (e.g., relatively coarse, large pore size, large openings, etc.) for relatively high flow conditions (e.g., high flow conditions suitable for blood flow, etc.) through the filtration media 1816. As shown in FIG. 34, the filtration media 1816 has relatively large fluid flow openings therethrough, which makes this embodiment 1800 particularly suitable for use as a high-flow one-way valve. Accordingly, this embodiment 1800 may be used in the medical profession for controlling blood flow, among other suitable applications.

In FIG. 33A, the filter valve apparatus 1800 is shown in a normally open position that allows fluid flow (as generally represented by arrows 1824) from one conduit 1808 to the other conduit 1804. FIG. 33B illustrates the filter valve apparatus 1800 in a closed position that prevents (or at least inhibits) fluids (e.g., air, gases, liquids, etc.) from passing from the conduit 1808 to the other conduit 1804. By way of example, the filter valve apparatus 1800 may shut off or close automatically without manual user intervention when a back flow creates sufficient pressure (as generally represented by arrow 1826) for causing the sealing member 1820 to move into sealing engagement with the opening 1828 into the conduit 1808. When the back pressure 1826 is removed, the sealing member 1820 may return to its normally open position as shown in FIG. 33A.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. As used herein, the term "fluid" generally refers to and includes liquids (e.g., gasoline, medications, intravenous liquids, transmission oil, etc.) and gases (e.g., air, gas vapors, etc.).

When introducing elements or features and exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order or performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A container including a rollover valve comprising a container body providing an enclosed volume open at a neck;
    a cap releasably attached to the neck and providing:
        an outer member;
        a sealing member; and
        filtration media disposed between the outer member and the sealing member;
        wherein the filtration media is configured to resiliently support the sealing member for resilient movement relative to a fluid flow opening between an open position in which the sealing member is spaced apart from the fluid flow opening to thereby permit the ingress of vapors into or egress of vapor out of the fluid flow opening and a closed position in which the sealing member is in sealing engagement with the fluid flow opening to thereby substantially block the fluid flow opening and inhibit the ingress of fluid into or egress of fluid out of the fluid flow opening;
    wherein the filtration media is configured such that the sealing member is normally in the open position and remains in the open position until a sufficient differential pressure is reached across the filtration media, the sealing member thereafter moving to the closed position and at least one of the filtration media and the outer member is configured for resiliently biasing the sealing member towards the open position, and wherein the sealing member remains in the open position until a sufficient differential pressure is reached across the filtration media for overcoming the biasing force applied by the at least one of the filtration media and the outer member;
    wherein the filtration media is configured to allow vapors to pass therethrough in a first direction out of the container body and restrict liquid flow therethrough in the first direction out of the container body and
    wherein the filtration media is caused to move from a first position in which the sealing member in the open position spaced apart from the container opening to a second position in which the sealing member in the closed position in sealing engagement against the container opening when the container is not upright such that liquid produces a first closing force in the first direction on the filtration media and a second closing force in the first direction on the sealing member and the combined first and second closing forces applies sufficient pressure to the filtration media and the sealing member to move the sealing member to the closed position prior to liquid passing through the filtration media,
    wherein the filtration media further comprises a non-wetting membrane.

2. The container of claim 1, wherein the filtration media is sufficiently flexible for resilient movement between a first position in which the sealing member is in the open position spaced apart from the fluid flow opening and a second position in which the sealing member is in the closed position in sealing engagement against the fluid flow opening.

3. The container of claim 1, wherein the filtration media is less rigid with greater flexibility than the outer member and the sealing member.

4. The container of claim 1, wherein the filtration media includes a generally axial central opening in which the sealing member is positioned.

5. The container of claim 1, wherein the sealing member is attached directly to the filtration media.

6. The container of claim 1, wherein the outer member defines a generally circular annular shape with a central opening in which the filtration media is generally disposed, wherein the filtration media defines a generally circular shape with a central opening in which the sealing member is generally disposed, wherein the sealing member defines a generally solid circular disc, and wherein the outer member, the filtration member, and the sealing member are generally concentric to one another.

7. The container of claim 1, wherein the sealing member includes an outwardly extending frustoconical portion configured for reception within a correspondingly shaped portion of the fluid flow opening.

8. The container of claim 1, wherein the sealing member has a greater diameter than the fluid flow opening.

9. The container of claim 1, wherein the filtration media comprises an elastic material with sufficient resiliency for acting as a spring feature to thereby allow relative movement of the sealing member between the open position and closed position.

10. The container of claim 1, wherein the outer member comprises an elastic material with sufficient resiliency for acting as a spring feature to thereby allow relative movement of the sealing member between the open position and closed position.

11. The container of claim 1, wherein the filtration media comprises a membrane having fluid flow openings configured to restrict flow therethrough.

12. The container of claim 1, wherein the material of the filtration media is composed of strands and the sealing member comprises a compacted sufficiently solid portion of the material forming the filtration media.

13. The container of claim 1, wherein the filtration media is insert molded from a different material than the outer member and the sealing member.

14. The container of claim 1, wherein the filtration media comprises one or more of depth filtration media, a fuel tolerant material, extruded mesh, or a woven screen.

15. The container of claim 1, further comprising a suction line vent connected to the cap, and wherein the filtration media and sealing member are operable as an inline filter and check valve.

* * * * *